United States Patent [19]

Hayashi et al.

[11] Patent Number: 5,157,992
[45] Date of Patent: Oct. 27, 1992

[54] HYDRAULIC CONTROL APPARATUS FOR BELT-AND-PULLEY TYPE CONTINUOUSLY VARIABLE TRANSMISSION, INCORPORATING MEANS FOR OPTIMIZING BELT TENSIONING PRESSURE

[75] Inventors: Takashi Hayashi; Yuji Hattori, both of Susono; Katsumi Kouno; Nobuyuki Kato, both of Toyota, all of Japan

[73] Assignee: Toyota Jidosha Kabushiki Kaisha, Toyota, Japan

[21] Appl. No.: 647,424

[22] Filed: Jan. 29, 1991

[30] Foreign Application Priority Data

| Jan. 2, 1990 | [JP] | Japan | 2-23579 |
| May 24, 1990 | [JP] | Japan | 2-134489 |
| Sep. 12, 1990 | [JP] | Japan | 2-241764 |
| Oct. 29, 1990 | [JP] | Japan | 2-291288 |

[51] Int. Cl.$^5$ .............................. F16H 11/02
[52] U.S. Cl. ................................. 74/866; 74/867; 474/28
[58] Field of Search ............... 74/866, 867; 474/18, 474/28

[56] References Cited

U.S. PATENT DOCUMENTS

| 4,631,043 | 12/1986 | Tokoro et al. | 474/28 X |
| 4,673,378 | 6/1987 | Tokoro et al. | 474/28 X |
| 4,718,306 | 1/1988 | Shigematsu et al. | 74/866 |
| 4,857,034 | 8/1989 | Kouno et al. | 474/28 |
| 4,858,497 | 8/1987 | Kouno | 74/866 |
| 4,867,732 | 9/1989 | Soga et al. | 74/866 X |
| 4,942,783 | 7/1990 | Morimoto | 74/866 |
| 4,967,621 | 11/1990 | Soga et al. | 74/867 |
| 5,006,093 | 4/1991 | Itoh et al. | 74/867 X |

FOREIGN PATENT DOCUMENTS

| 56-134658 | 10/1981 | Japan . |
| 60-95265 | 5/1985 | Japan . |
| 60-194656 | 12/1985 | Japan . |
| 63-30641 | 2/1988 | Japan . |
| 63-67455 | 3/1988 | Japan . |
| 63-176750 | 7/1988 | Japan . |
| 64-49755 | 2/1989 | Japan . |

Primary Examiner—Rodney H. Bonck
Assistant Examiner—Matthew Stavish
Attorney, Agent, or Firm—Oblon, Spivak, McClelland, Maier & Neustadt

[57] ABSTRACT

A hydraulic control apparatus for a vehicle continuously variable transmission including a pressure regulating valve having a valve spool which operates depending upon a determined current speed ratio of the transmission and a currently detected required output of the vehicle engine, to generate a controlled belt tensioning pressure for controlling the tension of a transmission belt at a required minimum level. The apparatus further includes a device responsive to an electric signal, for generating a pilot pressure to be applied to the valve, and an electronic control device for calculating a basic output pressure of the valve, based on the current speed ratio and the currently required output, according to a stored predetermined relationship among these two parameters and the basic output pressure, to determine the electric signal so that the belt tensioning pressure coincides with the optimum value.

35 Claims, 47 Drawing Sheets

FIG. 17

| | HYDRAULIC CONTROL MODE | 3RD SOLENOID VALVE 330 | 4TH SOLENOID VALVE 346 | LOCK-UP CLUTCH 36 (*1) | REVERSE INHIBIT (*2) | 2ND LINE PRESSURE REDUCTION |
|---|---|---|---|---|---|---|
| A | LOCK-UP CLUTCH RELEASE | OFF | OFF | OFF | OFF | OFF |
| B | LOCK-UP CLUTCH RAPID RELEASE | OFF | ON | OFF | OFF | OFF |
| C | ACCUMULATOR BACK PRESSURE CONTROL | OFF | DUTY CYCLE | OFF | OFF | OFF |
| D | REVERSE INHIBIT CONTROL | ON | OFF | ON | ON | OFF |
| E | 2ND LINE PRESSURE REDUCTION | ON | ON | ON | ON | ON |

\*1 WHEN THE SHIFT LEVER 252 IS PLACED IN A POSITION OTHER THAN THE REVERSE POSITION
\*2 WHEN THE SHIFT LEVER 252 IS PLACED IN THE REVERSE POSITION

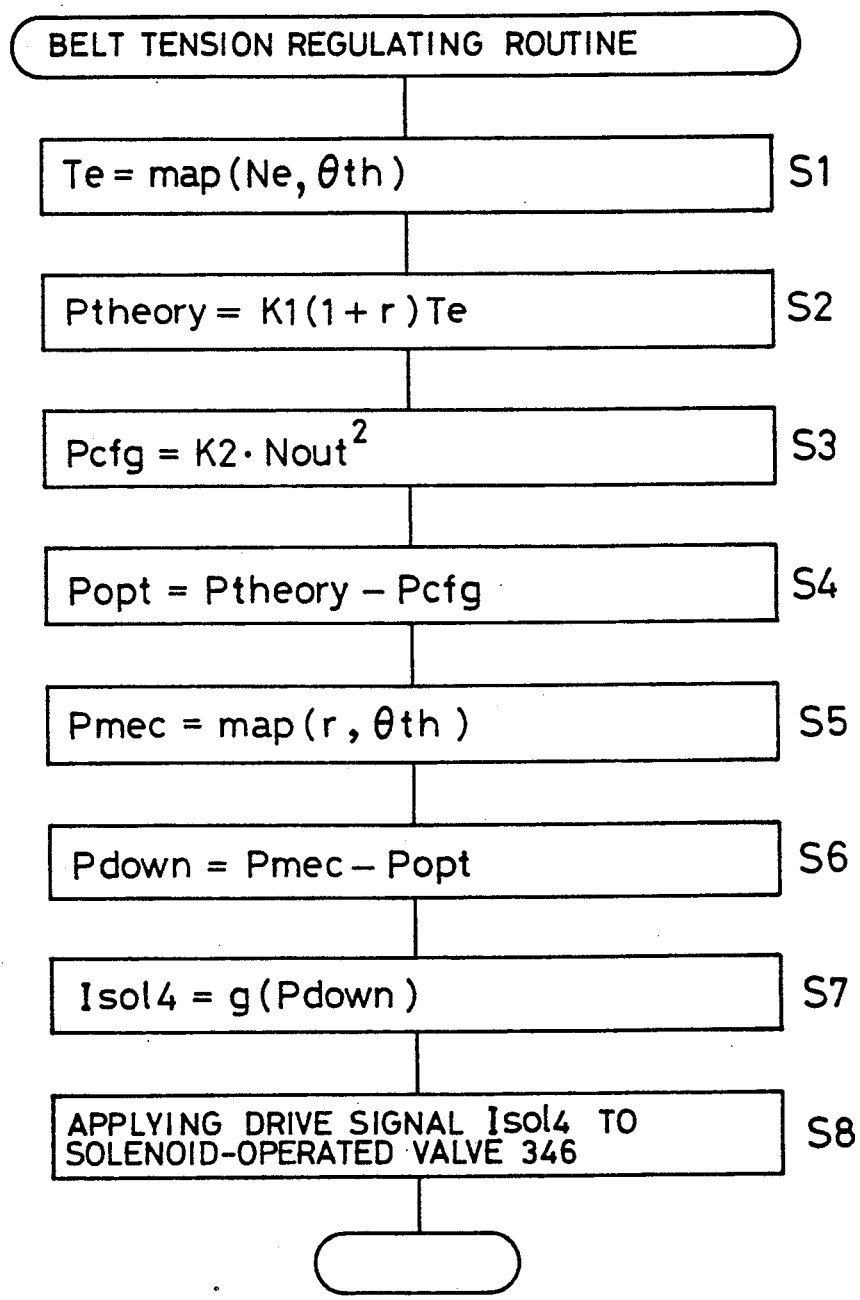

FIG.37

| HYDRAULIC CONTROL MODE | 3RD SOLENOID VALVE 330 | 4TH SOLENOID VALVE 346 | LINEAR SOLENOID VALVE 500 | LOCK-UP CLUTCH 36 | 2ND LINE PRESSURE $P_{L2}$ | CONTROL MODES |
|---|---|---|---|---|---|---|
| A | OFF | OFF | OFF | 1ST RELEASE MODE | NORMAL | |
| B | OFF | OFF | ON (CONSTANT) | 1ST RELEASE MODE | REDUCTION | $P_{L2}$ REDUCTION IN POSITION "N", AND REVERSE INHIBIT |
| C | ON | OFF | ON (VARIABLE) | ENGAGING MODE | REDUCTION TO Popt | LOCK-UP CLUTCH ENGAGEMENT IN POSITION "D" |
| D | ON | OFF | ON (CONSTANT) | ENGAGING MODE | REDUCTION | $P_{L2}$ REDUCTION AT HIGH VEHICLE SPEED |
| E | OFF | ON | OFF | RAPID RELEASE MODE | NORMAL | LOCK-UP CLUTCH RAPID RELEASE |
| F | OFF | ON | ON | RAPID RELEASE MODE | INCREASE | ACCUMULATOR BACK PRESSURE CONTROL UPON N-D AND N-R SHIFTING OPERATIONS |
| G | ON | ON | OFF | 2ND RELEASE MODE | NORMAL | LOCK-UP CLUTCH RELEASE IN POSITION "D" |
| H | ON | ON | ON | 2ND RELEASE MODE | INCREASE | $P_{L2}$ INCREASE UPON RAPID SHIFT-DOWN OF CVT |

HYDRAULIC CONTROL APPARATUS FOR BELT-AND-PULLEY TYPE CONTINUOUSLY VARIABLE TRANSMISSION, INCORPORATING MEANS FOR OPTIMIZING BELT TENSIONING PRESSURE

BACKGROUND OF THE INVENTION

1. Field of the Invention

The present invention relates to a hydraulic control apparatus for controlling a hydraulically operated continuously variable transmission of belt-and-pulley type used for a motor vehicle.

2. Discussion of the Prior Art

A belt-and-pulley type continuously variable transmission whose speed ratio is continuously variable is known as a transmission incorporated in a power transmitting system for a motor vehicle. This continuously variable transmission includes a first and a second shaft, a pair of variable-diameter pulleys provided on the first and second shafts, respectively, a belt connecting the pulleys for transmitting power therebetween, and a pair of hydraulic actuators for changing effective diameters of the pulleys. An example of a hydraulic control apparatus for such a belt-and-pulley type continuously variable transmission is disclosed in laid-open Publication No. 64-49755 of unexamined Japanese Patent Application. In the hydraulic control apparatus disclosed in this publication, the line pressure of the hydraulic system for controlling the tension of the transmission belt of the transmission, i.e., the belt tensioning pressure, is regulated so as to change with the speed ratio of the transmission, by a pressure regulating valve. The pressure regulating valve regulates the belt tensioning pressure, based on a required output pressure and a speed-ratio pressure, such that the rate of change in the belt tensioning pressure varies along a straight line which is bent at a point corresponding to a specific value of the speed ratio of the transmission. Namely, the rate of change in the belt tensioning pressure changes when the speed ratio reaches a certain value. The required output pressure represents the currently required output of the engine, while the speed-ratio pressure represents the currently detected speed ratio of the transmission. The hydraulic control apparatus including such a pressure regulating valve is comparatively economical to manufacture and reliable in operation, while assuring adequate regulation of the belt tensioning pressure such that the belt tensioning pressure almost follows an optimum relationship with a change in the speed ratio.

The above-indicated optimum relationship between the belt tensioning pressure (tension of the belt) and the speed ratio of the transmission is desirably formulated to maintain the belt tension at a required minimum level. In this case, the optimum relationship is represented by a curve, rather than a bent straight line which the pressure regulating valve of the known hydraulic control apparatus substantially follows as described above. When the belt tensioning pressure is regulated along the straight line rather than the optimum curve, the belt tensioning pressure tends to be unnecessarily higher than the optimum level under certain conditions, resulting in a failure to effectively minimize the power loss of the oil pump of the transmission hydraulic system which is driven by the engine of the vehicle.

SUMMARY OF THE INVENTION

It is therefore an object of the present invention to provide a hydraulic control apparatus for controlling a hydraulically operated belt-and-pulley type transmission for a motor vehicle, which permits the belt tensioning pressure to be regulated such that the regulated pressure is kept as close as possible to the nominal optimum level.

The above object may be achieved according to the principle of the present invention, which provides a hydraulic control apparatus for controlling a hydraulically operated continuously variable transmission of a motor vehicle having an engine, said transmission including a first and a second shaft, a pair of variable-diameter pulleys provided on said first and second shafts, respectively, a transmission belt connecting the pair of pulleys, and a pair of hydraulic actuators for changing effective diameters of said pulleys for continuously variably changing a speed ratio of the transmission, the hydraulic control apparatus comprising: (a) speed-ratio determining means for determining a current speed ratio of the transmission; (b) engine-output detecting means for detecting a currently required output of the engine; (c) a pressure regulating valve including a valve spool which operates depending upon the current speed ratio and the currently required output, the pressure regulating valve generating a belt tensioning pressure for controlling a tension of the transmission belt at a required minimum level according to an operation of the valve spool; (d) pilot-pressure generating means responsive to an electric signal, for applying a pilot pressure (Pso14, Pso1L) to the pressure regulating valve to modify the position of the valve spool so as to regulate the belt tensioning pressure; and (e) an electronic control device including a memory for storing a predetermined relationship among the current speed ratio, the currently required output and a basic output pressure of the pressure regulating valve, the electronic control device including means for calculating the basic output pressure, based on the current speed ratio and the currently required output, according to the predetermined relationship, and means for determining the electric signal to be applied to the pilot-pressure generating means to thereby regulate the belt tensioning pressure, based on the basic output pressure and an optimum value of the belt tensioning pressure such that the belt tensioning pressure coincides with the optimum value.

In the hydraulic control apparatus constructed according to the present invention as described above, the electric signal generated by the pilot-pressure generating means is controlled by the electronic control device such that a difference between the basic output pressure of the pressure regulating valve and the optimum value is zeroed, whereby the belt tensioning pressure generated by the pressure regulating valve which receives the pilot pressure generated by the pilot-pressure generating means may be controlled to the optimum value. As a result, the belt tensioning pressure will not rise to an unnecessarily high level at any time during operation of the transmission. Accordingly, the power loss of the vehicle engine is effectively minimized, and the durability or life expectancy of the transmission belt is improved.

The pilot-pressure generating means may be a solenoid-operated valve which is turned on and off with a controlled duty cycle, to change the pilot pressure with the duty cycle. The duty cycle of the solenoid-operated valve is controlled by the drive signal applied to the valve. Alternatively, the pilot-pressure generating means may be a linear solenoid-operated valve which is activated with an analog drive signal such as a drive current. The magnitude of the analog drive signal is changed to change the pilot pressure.

The speed ratio of the transmission may be represented by a speed-ratio pressure generated by a speed-ratio sensing valve, which may be adapted to release the belt tensioning pressure as the speed ratio changes. The currently required output of the engine may be represented by a throttle pressure generated by a throttle sensing valve which detects an angle of opening of the throttle valve of the engine. The valve spool of the pressure regulating valve may be adapted to receive the speed-ratio pressure and the throttle pressure such that the belt tensioning pressure increases with an increase in the throttle pressure and decreases with an increase in the speed-ratio pressure.

The electronic control device may include means for determining an output torque of the engine or an input torque of the transmission based on the speed of the engine and the currently required output of the engine. In this case, the optimum value of the belt tensioning pressure is determined or calculated based on the determined torque of the engine or transmission and the speed ratio of the transmission.

BRIEF DESCRIPTION OF THE DRAWINGS

The above and optional objects, features and advantages of the present invention will become more apparent by reading the following detailed description of presently preferred embodiments of the present invention, when considered in conjunction with the accompanying drawings, in which:

FIG. 17 is a view indicating a relationship between hydraulic control modes A through E of the apparatus of FIG. 1 and different combinations of states of third and fourth solenoid valves;

FIG. 18 is a flow chart illustrating a belt tension regulating routine implemented by an electronic control device used for the hydraulic control apparatus of FIG. 1;

FIG. 37 is a view indicating hydraulic control modes in the embodiment of FIG. 36;

DETAILED DESCRIPTION OF THE PREFERRED EMBODIMENTS

Figure 1:
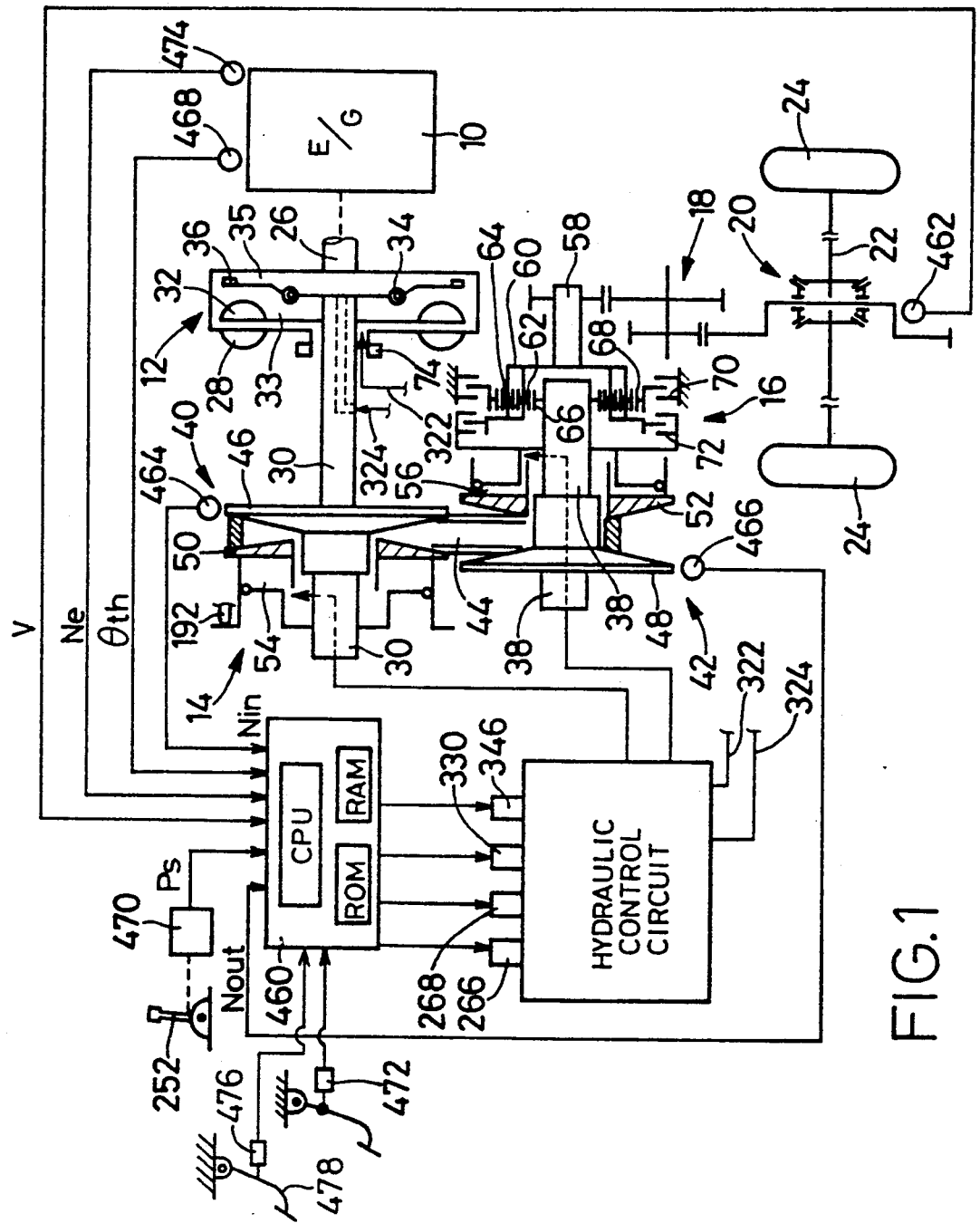
FIG. 1 is a schematic view of a vehicle power transmitting system including a continuously variable transmission, which is equipped with a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid coupling 12 connected to the engine 10 through a crankshaft 26 and equipped with a lock-up clutch 36; a continuously variable transmission (hereinafter referred to as "CVT") 14 connected to the fluid coupling 12; a reversing gear mechanism in the form of a reversing device 16 connected to the CVT 14, for selecting a forward or a reverse running of the vehicle; an intermediate gear device 18 connected to the reversing device 16; a differential gear device 20 connected to the intermediate gear device 18; and a drive axle 22 connected to the differential gear device 20 and drive wheels 24.

The fluid coupling 12 includes a pump impeller 28 connected to the crankshaft 26 of the engine 10; a turbine impeller 32 which is fixed to an input shaft 30 of the CVT 14 and rotated by means of a working fluid from the pump impeller 28; the lock-up clutch 36 indicated above, which is fixed to the input shaft 30 through a damper 34; and means for defining an engaging chamber 33 communicating with an engaging line 322 (which will be described), and a releasing chamber 35 communicating with a releasing line 324 (which will be described). The fluid coupling 12, which is filled with the working fluid, is operated to effect engagement of the lock-up clutch 36 for direct connection of the crankshaft 26 to the input shaft 30, when the speed of the vehicle, engine 10 or turbine impeller 32 exceeds a predetermined value. In this case, the fluid is fed into the engaging chamber 33 while the fluid in the releasing chamber 35 is discharged. When the speed of the vehicle, engine 10 or turbine impeller 32 falls below the predetermined value, on the other hand, the lock-up clutch 36 is disengage or released such that the fluid is fed into the releasing chamber 35 and discharged from the engaging chamber 33.

The CVT 14 has a pair of variable-diameter pulleys 40, 42 having a same diameter which are provided on the input shaft 30 and an output shaft 38, respectively. These pulleys 40, 42 are connected by a transmission belt 44, and have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, whereby the effective widths of V grooves of the pulleys 40, 42, i.e., the effective diameters engaging the belt 44 are changed, to change a speed ratio "r" of the CVT 14 (Nin/Nout, where Nin=speed of the input shaft 30, and Nout=speed of the output shaft 38).

Since the variable-diameter pulleys 40, 42 have the same diameter, the corresponding first and second hydraulic cylinders 54, 56 have a same pressure-receiving area. Generally, the tension of the transmission belt 44 is determined primarily by the pressure in one (hereinafter referred to as "driven side cylinder") of the first and second hydraulic cylinders 54, 56 which corresponds to the driven one of the pulleys 40, 42 (hereinafter referred to as "driven side pulley"). The driven side cylinder 54 or 56 is supplied with a second line pressure Pl2 (belt tensioning pressure) which is adjusted by a second pressure regulating valve 102 (which will be described), whereby the tension of the belt 44 is adjusted to within an optimum range in which the belt 44 does not slip on the pulleys 40, 42.

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which meshes with the inner planetary gear 62; a ring gear 68 meshing with the outer planetary gear 64; a REVERSE brake 70 for stopping the rotation of the ring gear 68; and a FORWARD clutch 72 for connecting the carrier 60 and the input shaft 38.

The REVERSE brake 70 and FORWARD clutch 72 are hydraulically operated, frictionally coupling devices. The reversing device 16 is placed in a neutral position thereof when the brake 70 and the clutch 72 are both in the disengaged or released positions. In this state, the reversing device 16 does not transmit power to the intermediate gear device 18. When the FORWARD clutch 72 is engaged, the output shaft 38 (input shaft of the device 16) of the CVT 14 and the output shaft 58 of the device 16 are connected to each other, whereby power is transmitted from the CVT 14 to the intermediate gear device 18, so as to run the vehicle in the forward direction. When the REVERSE brake 70 is engaged, on the other hand, the direction of rotation of the output shaft 58 of the reversing device 16 is reversed with respect to the direction of rotation of the output shaft 38 of the CVT 14, whereby power is transmitted so as to run the vehicle in the reverse direction.

Figure 2:
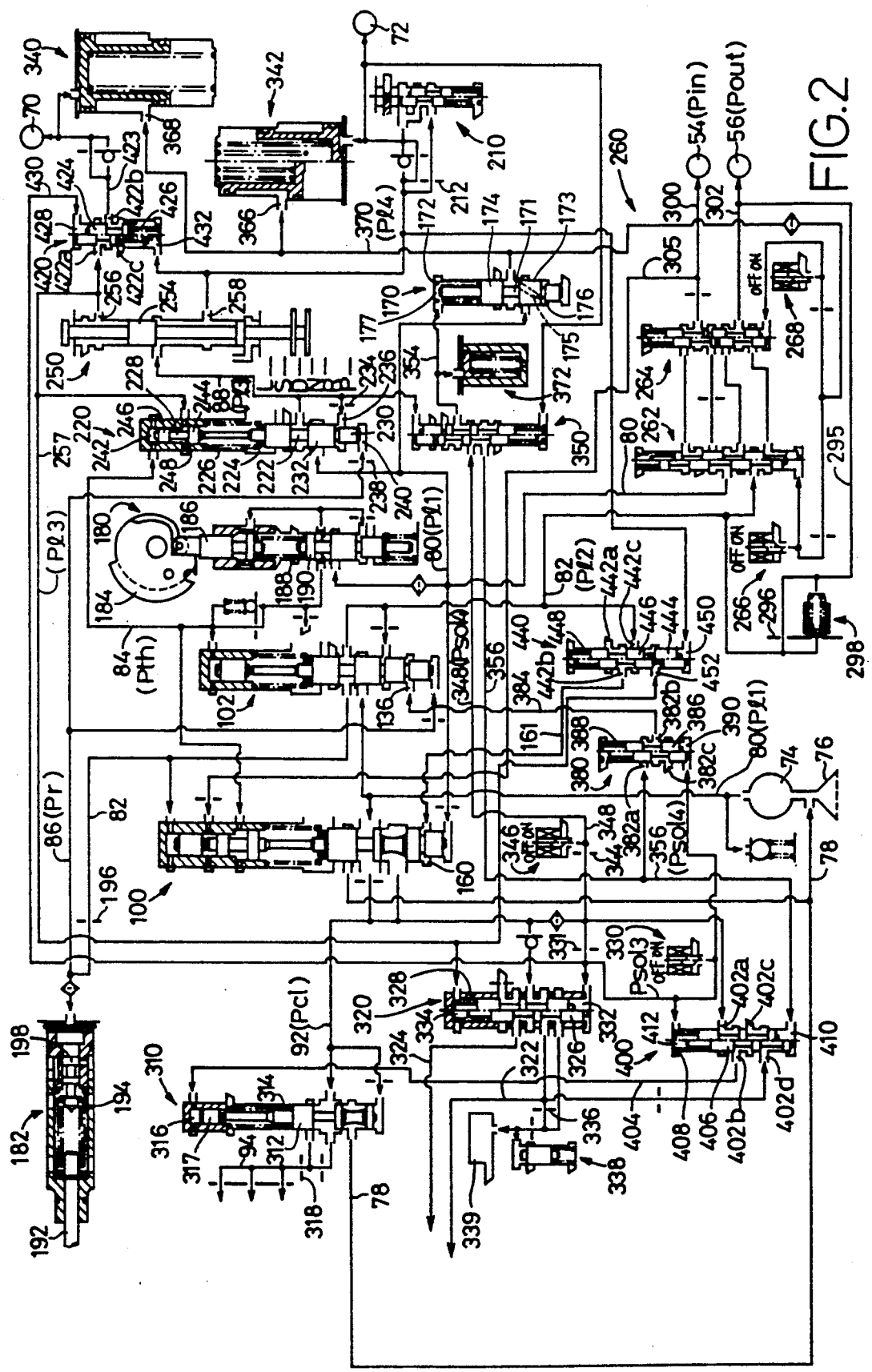
FIG. 2 is a hydraulic circuit diagram showing the hydraulic control apparatus adapted to control the power transmitting system of FIG. 1.

Referring next to FIG. 2 showing a hydraulic control circuit for controlling the vehicle power transmitting system of FIG. 1, reference numeral 74 designates an oil pump serving as a hydraulic power source of the hydraulic system, which constitutes a part of a hydraulic control apparatus constructed according to the instant embodiment of the present invention, which will be described. The oil pump 74 is connected to the pump impeller 28 of the fluid coupling 12, whereby the pump 74 is always rotated with the crankshaft 26 of the engine 10. In operation, the pump 74 pumps up a working fluid through a strainer 76 from a reservoir to which the fluid is returned. The pump 74 also communicates with a return line 78, so that the fluid returned through the return line 78 is sucked into the pump 74. The pressurized fluid produced by the pump 74 is delivered as a first line pressure Pl1 into a first pressure line 80. In the present embodiment, the first line pressure Pl1 is regulated by an overflow or relief type first pressure regulating valve 100, which discharges the fluid in the first pressure line 80 into the return line 78 and a lock-up pressure line 92. The first line pressure Pl1 is lowered by the above-indicated second pressure regulating valve 102, to produce the above-indicated second line pressure Pl2 in a second pressure line 82. The second pressure regulating valve 102 is of a pressure reducing type, contrary to the overflow type of the first pressure regulating valve 100.

Figure 3:
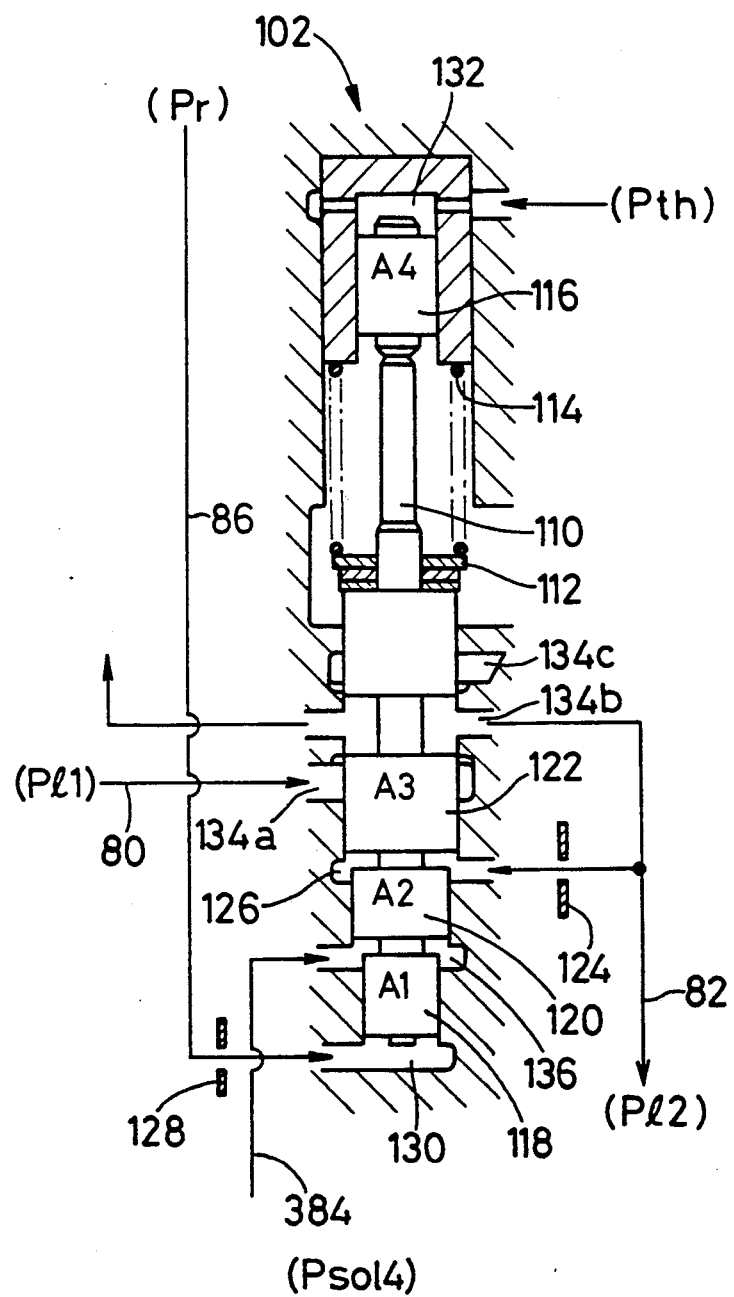
FIG. 3 is a view illustrating in detail a second pressure regulating valve incorporated in the apparatus of FIG. 2.

The second pressure regulating valve 102 will be first described in detail, by reference to FIG. 3.

This pressure regulating valve 102 includes a valve spool 110 for effecting connection and disconnection of the first pressure line 80 to and from the second pressure line 82, a spring sheet 112, a return spring 114, and a plunger 116. The valve spool 110 is provided at one axial end portion thereof remote from the plunger 116, with a first, a second and a third land 118, 120 and 122, which have different diameters. The first land 118 at the extreme end of the spool 110 has the smallest diameter, while the axially innermost third land 122 has the largest diameter. Between the second and third lands 120, 122, there is formed a chamber 126 to which is applied as a feedback pressure the second line pressure Pl2 through a flow restrictor 124, so that the valve spool 110 is biased toward its closed position by the second line pressure Pl2. Another chamber 130 is formed adjacent to the first land 118 at the above-indicated one end of the valve spool 110. To this chamber 130, there is applied a SPEED-RATIO pressure Pr (which will be described) through a flow restrictor 128. This pressure Pr also biases the valve spool 110 toward the closed position. The return spring 114 disposed around the valve spool 110 biases the spool 110 toward its open position, through the spring sheet 112.

Adjacent to one end of the plunger 116 remote from the valve spool 110, there is formed a chamber 132 adapted to receive a THROTTLE pressure Pth (which will be described) which biases the spool 110 toward its open position. The valve spool 110 is positioned under equilibrium of forces according to the following equation (1):

$$Pl2 = (A4 \cdot Pth + W - A1 \cdot Pr)/(A3 - A2) \quad (1)$$

where,
A1: pressure-receiving area of the first land 118
A2: cross sectional area of the second land 120
A3: cross sectional area of the third land 122
A4: cross sectional area of the plunger 116
W: biasing force of the return spring 114

Figure 7:
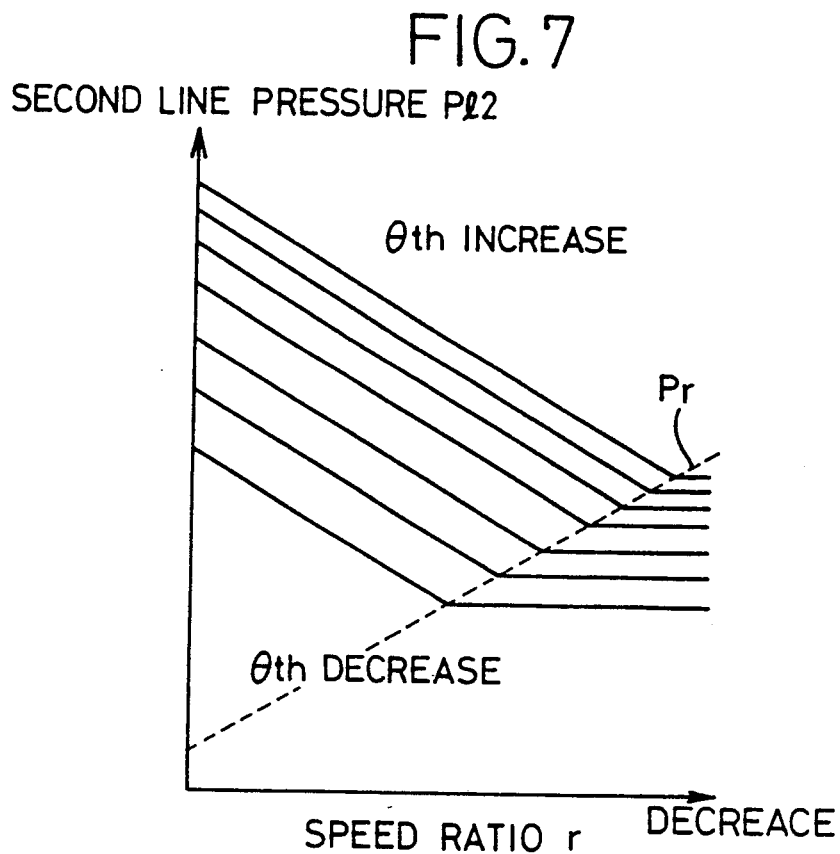
FIG. 7 is a graph showing an output characteristic of the second pressure regulating valve of FIG. 3.

Namely, the valve spool 110 is axially moved according to the equation (1), so as to repeatedly alternately establish communication between a port 134a and a port 134b for permitting a flow of the fluid from the first pressure line 80 into the second pressure line 82, and communication between the port 134b and a drain port 134c for draining the second pressure line 82 through the drain port 134c. As a result, the second line pressure produced. Since the second pressure line 82 is a closed hydraulic circuit, the second line pressure Pl2 can be adjusted by the second pressure regulating valve 102, by lowering the relatively high first line pressure Pl1, as indicated in FIG. 7.

Between the first and second lands 118, 120 of the valve spool 110 of the second pressure regulating valve 102, there is formed a chamber 136 adapted to receive a pilot pressure Pso14 through a second line pressure reducing control valve 380 which will be described. As the valve spool 110 is biased toward its closed position by the pilot pressure Pso14 applied to the chamber 136, the second line pressure Pl2 is accordingly adjusted by the pilot pressure Pso14, as discussed below in detail.

Figure 4:
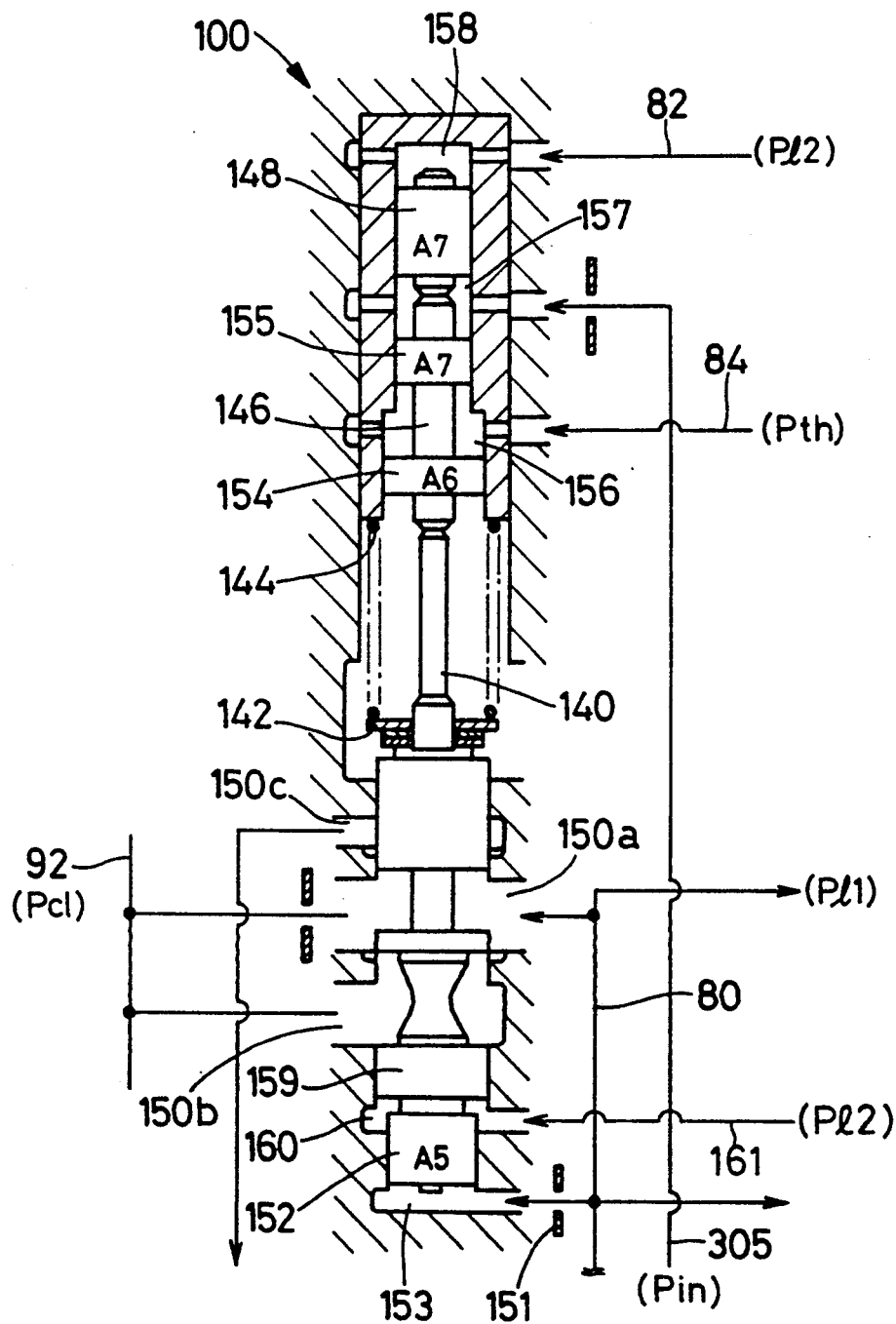
FIG. 4 is a view illustrating in detail a first pressure regulating valve also incorporated in the apparatus of FIG. 2.

Referring next to FIG. 4, the first pressure regulating valve 100 will then be described. This valve 100 includes a valve spool 140, a spring sheet 142, a return spring 144, a first plunger 146, and a second plunger 148 whose diameter is the same as a second land 155 of the first plunger 146. The valve spool 140 is operated to effect selective connection and disconnection of a port 150a communicating with the first pressure line 80, to and from a drain port 150b or 150c. The valve spool 140 has a first land 152 at one axial end thereof remote from the first and second plungers 146, 148. Adjacent to the first land 152 of the spool 140, there is formed a chamber 153 which receives as a feedback pressure the first line pressure P(1 through a flow restrictor 151. The valve spool 140 is biased toward its open position by this first line pressure Pl1. The first plunger 146, which is coaxial with the valve spool 140, has a first land 154 which cooperates with the above-indicated second land 155 to define a chamber 156 adapted to receive the THROTTLE pressure Pth. Between the second land 155 of the first plunger 146 and the second plunger 148, there is formed a chamber 157 adapted to receive a pressure Pin in the first hydraulic cylinder 54, through a branch line 305. Further, a chamber 158 is formed adjacent to the end face of the second plunger 148. The chamber 158 receives the second line pressure Pl2. The biasing force of the above-indicated return spring 144 acts on the valve spool 140 through the valve sheet 142 so as to bias the spool 140 toward its closed position. The valve spool 140 is positioned under equilibrium of forces according to the following equation (2):

$$Pl1 = [(Pin \text{ or } Pl2) \cdot A7 + Pth(A6 - A7) + W]/A5 \quad (2)$$

where,
- A5: pressure-receiving area of the first land 152 of the valve spool 140
- A6: cross sectional area of the first land 154 of the first plunger 146
- A7: cross sectional area of the second land 155 of the first plunger 146 (second plunger 148)
- W: biasing force of the return spring 144

In the first pressure regulating valve 100, the first and second plungers 146, 148 are separated from each other and a thrust due to the pressure Pin in the first cylinder 54 acts on the valve spool 140 in the direction toward the closed position, when the pressure Pin is higher than the second line pressure Pl2 (which is normally equal to the pressure Pout in the second cylinder 56). When the pressure Pin is lower than the second line pressure P(2, the first and second plungers 146, 148 are held in abutting contact with each other, whereby a thrust due to the second line pressure Pl2 acting on the end face of the second plunger 148 acts on the valve spool 140 in the direction toward its closed position. That is, the second plunger 148 receiving the pressure Pin and the second line pressure Pl2 applies to the spool 140 a force based on the higher one of the pressures Pin and Pl2, so that the spool 140 is biased toward its closed position. Between the first and second lands 152 and 159 of the valve spool 140, there is formed a chamber 160 which is adapted to receive through a line 161 the second line pressure Pl2 from a first line pressure reducing control valve 440 (which will be described). The second line pressure Pl2 applied to the chamber 160 acts on the valve spool 140 in a direction to reduce the first line pressure Pl1. When a shift lever 252 of the vehicle is operated to a NEUTRAL or PARKING position "N", "P", the first line pressure reducing control valve 440 is operated to apply the second line pressure Pl2 to the chamber 160, to reduce the first line pressure Pl1, as described below in detail.

Figure 5:
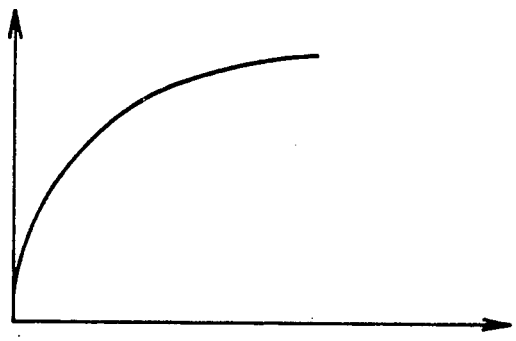
FIG. 5 is a graph indicating an output characteristic of a throttle sensing valve incorporated in the apparatus of FIG. 2.

Referring back to FIG. 2, the THROTTLE pressure Pth representing an actual opening angle θth of a throttle valve of the engine 10 is generated by a flow restrictor sensing valve 180. Further, the SPEED-RATIO pressure Pr representing an actual speed ratio "r" of the CVT 14 is generated by a speed-ratio sensing valve 182. Described specifically, the throttle sensing valve 180 includes: a cam 184 rotated as the throttle valve is operated; a plunger 186 which engages a cam surface of the cam 184 and which is axially moved by a distance corresponding to an angle of rotation of the cam 184; a spring 188; and a valve spool 190 which receives a thrust through the spring 188 from the plunger 186, and a thrust due to the first line pressure Pl1. These two thrust forces act on the spool 190 in the opposite directions. The valve spool 190 is moved to a position of equilibrium of the above two thrust forces, whereby the first line pressure Pl1 is reduced so as to produce the THROTTLE pressure Pth corresponding to the actual opening angle θth of the throttle valve. The relationship between the THROTTLE pressure Pth and the opening angle θth is indicated in the graph of FIG. 5. The THROTTLE pressure Pth is applied through a line 84 to the above-described first and second pressure regulating valves 100, 102 and a third pressure regulating valve 220.

Figure 6:
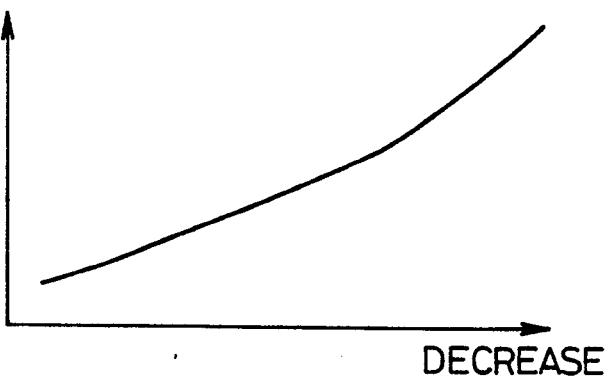
FIG. 6 a graph indicating an output characteristic of speed-ratio sensing valve incorporated in the apparatus of FIG. 2.

The speed-ratio sensing valve 182 includes: a sensing rod 192 which slidably contacts the axially movable rotor 50 on the input shaft 30 of the CVT 14 and which is axially displaced by a distance equal to an amount of axial movement of the movable rotor 50; a spring 194 whose biasing force varies as the axial position of the rod 192 is changed; and a valve spool 198 which receives the biasing force of the spring 194 and the second line pressure Pl2. The valve spool 198 is moved to a position of equilibrium of the biasing force of the spring 194 and a thrust force based on the second line pressure Pl2, whereby the amount of discharge flow of the fluid from the second pressure line 82 into the drain is adjusted depending upon the speed-ratio "e" of the CVT 14. For example, as the movable rotor 50 is moved toward the stationary rotor 46 so as to reduce the effective width of the V-groove of the pulley 40 and thereby decrease the speed ratio "r", the sensing rod 192 is moved in a direction to compress the spring 194, thereby reducing the rate of flow of the fluid which is supplied from the second pressure line 82 through an orifice 196 and discharged into the drain by a resulting movement of the valve spool 198. As a result, the pressure in a portion of the line 82 downstream of the orifice 196 is increased. This pressure is utilized as the SPEED-RATIO pressure Pr, which increases with a decrease in the speed ratio "r" of the CVT 14 (so as to shift-up the CVT 14 for increasing the vehicle speed), as indicated in the graph of FIG. 6. The pressure Pr is applied through a line 86 to the second and third pressure regulating valves 102 and 220.

Figure 8:
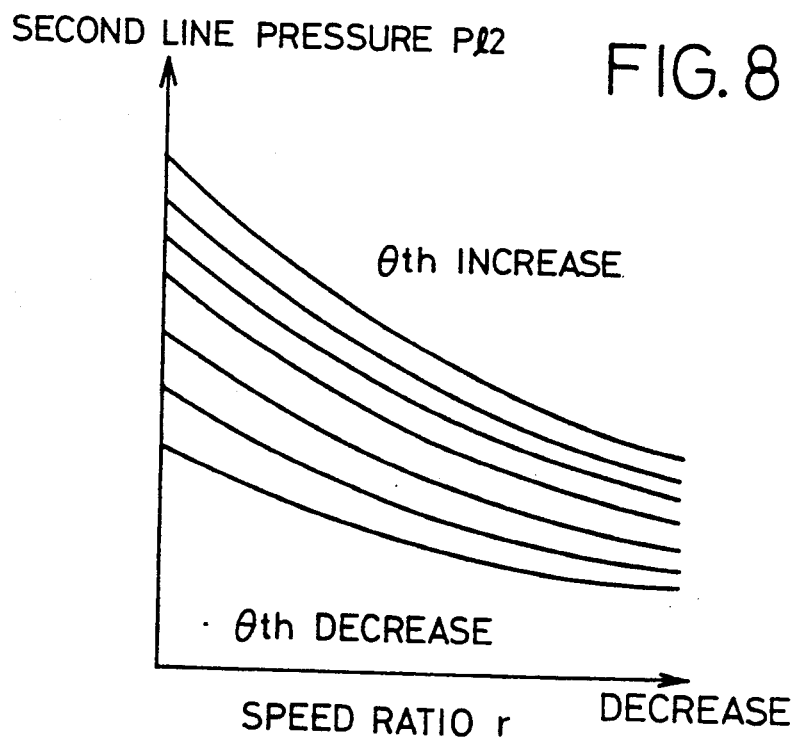
FIG. 8 is a graph showing an ideal relationship of a second line pressure of the apparatus of FIG. 2 with a speed ratio of a CVT of the power transmitting system and an opening angle of a throttle valve of the vehicle.
Figure 21:
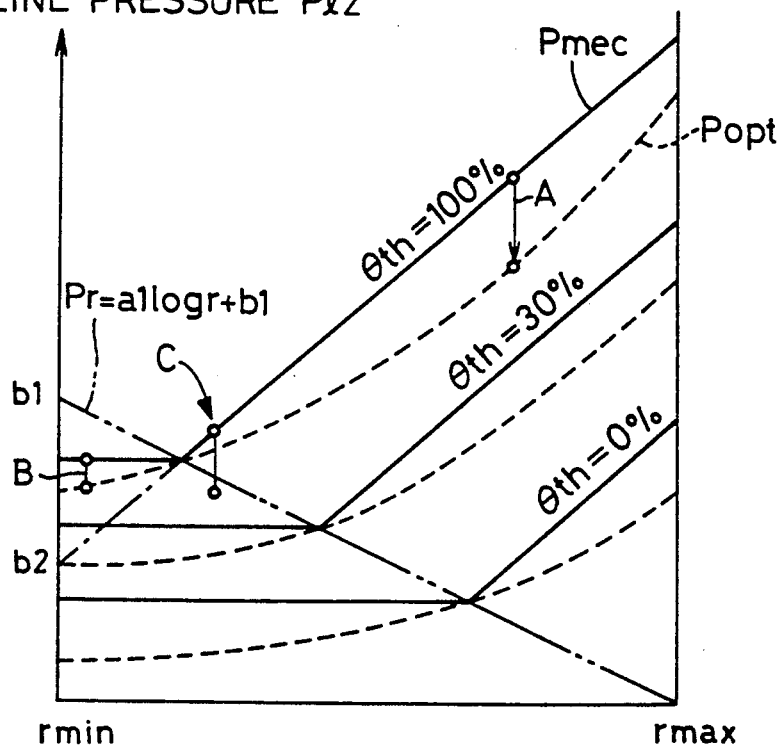
FIG. 21 is a view indicating the basic output pressure of the second pressure regulating valve and the optimum belt tensioning pressure, in relation to the speed ratio of the transmission and the throttle opening angle.

It will be understood from the above description of the speed-ratio sensing valve 182 that since the SPEED-RATIO pressure Pr is produced by changing the amount of discharge of the fluid supplied from the second pressure line 82 through the orifice 196, the pressure Pr will not exceed the second line pressure Pl2. Further, the second line pressure Pl2 is lowered with an increase in the pressure Pr, by the second pressure regulating valve 102 according to the equation (1) indicated above. Therefore, when the pressure Pr increases up to the level of the second line pressure Pl2, both of the pressures Pr and Pl2 are held constant, as indicated in the graph of FIG. 7, which shows the basic output characteristic of the second pressure regulating valve 102 that the lower limit of the second line pressure Pl2 adjusted by the second pressure regulating valve 102 is determined by the SPEED-RATIO pressure Pr, i.e., the speed ratio "r" of the CVT 14. The basic output characteristic of the second pressure regulating valve 102 is obtained when the pilot pressure Pso14 (fourth pilot pressure) applied to the chamber 136 is zero or constant. Namely, the second line pressure Pl2 according to the basic output characteristic of the valve 102 is constant until the speed ratio "r" of the CVT 14 increases from the minimum value to a certain value. After the speed ratio "r" reaches the certain value, the pressure Pl2 linearly increases with the speed ratio "r", along a straight line as indicated in FIG. 7. FIG. 8 shows an ideal curve of the second line pressure Pl2 in relation to the speed ratio "r", for maintaining the tension of the belt 44 at a required minimum level. The bent line of FIG. 7 according to the basic output characteristic of the valve 102 is approximate to the ideal curve of FIG. 8. However, the basic output pressure Pl2 of the valve 102 according to the basic output characteristic as indicated at Pmec in solid line in FIG. 21 is considerably and unnecessarily higher than the optimum value as indicated at Popt in dashed line in FIG. 21, under some conditions.

For controlling the second line pressure Pl2 to change following the ideal curve, the duty cycle of a fourth solenoid-operated valve 346 which generates the fourth pilot pressure Pso14 is controlled by an electronic control device 460 (FIG. 1), so that the pilot pressure Pso14 is regulated to maintain the tension of the belt 44 at the required minimum level, while the vehicle is running in the forward direction with the lock-up clutch 36 placed in the engaged position, as discussed below in greater detail.

The third pressure regulating valve 220 is adapted to produce a third line pressure Pl3 suitable for operating the REVERSE brake 70 and FORWARD clutch 72 of the reversing device 16. This valve 220 includes a valve spool 222 for effecting selective connection and disconnection of the first pressure line 80 to and from a third pressure line 88, a spring sheet 224, a return spring 226, and a plunger 228. The valve spool 222 has a first and a second land 230, 232, between which is formed a chamber 236, which is adapted to receive the third line pressure Pl3 as a feedback pressure through a flow restrictor 234, so that the spool 222 is biased toward its closed position by the pressure Pl3. Adjacent to the first land 230 of the spool 222, there is formed another chamber 240 which receives the SPEED-RATIO pressure Pr, so that the spool 222 is biased toward the closed position by the pressure Pr. In the third pressure regulating valve 220, a biasing force of the return spring 226 acts on the spool 222 through the spring sheet 224, so that the spool 222 is biased toward its open position by the spring 226. Adjacent to the end face of the plunger 228, there is formed a chamber 242 adapted to receive the THROTTLE pressure Pth, so that the spool 222 is biased toward the open position by the pressure Pth. The plunger 228 has a first land 244, and a second land 246 having a smaller diameter than the first land 244. Between these first and second lands 244, 246, there is formed a chamber 248 adapted to receive the third line pressure Pl3 only when the vehicle runs in the reverse direction with the REVERSE brake 70 placed in the engaged position. In the third pressure regulating valve 220 constructed as described above, the valve spool 222 is moved to a position of equilibrium of forces according to an equation similar to the equation (1), so that the third line pressure Pl3 is controlled to an optimum level based on the SPEED-RATIO and THROTTLE pressures Pr and Pth. The optimum level is a permissible lowest value required to permit the reversing device 16 to transmit received input torque without slipping of the brake 70 or clutch 72.

When the REVERSE brake 70 is placed in the engaged position, the third line pressure Pl3 is applied to the chamber 248, whereby the force biasing the spool 222 toward the open position is increased, to thereby increase the third line pressure Pl3. This arrangement assures optimum torque transmitting capacity of the FORWARD clutch 72 and REVERSE brake 70 during engagement of the clutch 72 or brake 70 to run the vehicle in the forward or reverse direction.

The thus regulated third line pressure Pl3 is applied to the FORWARD clutch 72 or REVERSE brake 70 by means of a shift lever valve 250. This shift lever valve 250 has a valve spool 254 which is moved in response to an operation of the shift lever 252, which has six operating positions, i.e., NEUTRAL "N", PARKING "P", LOW "L", SECOND "S", DRIVE "D" and REVERSE "R". The shift lever valve 250 has an output port 256 and an output port 258. When the shift lever 252 is placed in the NEUTRAL position "N", the third line pressure Pl3 is not generated by the shift lever valve 250. When the shift lever 252 is placed in one of the LOW, SECOND and DRIVE positions "L", "S" and "D", the third line pressure P(3 is supplied primarily through the output port 258 to the FORWARD clutch 72 and to a chamber 432 of a REVERSE INHIBIT valve 420, while at the same time the fluid is discharged from the REVERSE brake 70. When the shift lever 252 is placed in the REVERSE position "R", the third line pressure Pl3 is supplied through the output port 256 to the third pressure regulating valve 220, lock-up clutch control valve 320, a chamber 452 of the first line pressure reducing control valve 440 and a port 422a of the REVERSE INHIBIT valve 420 and to the REVERSE brake 70 through the REVERSE INHIBIT valve 420, while at the same time the fluid is discharged from the FORWARD brake 70. When the shift lever 252 is placed in the PARKING position "P", the fluid is discharged from the brake 70 and clutch 72 at the same time.

Accumulators 340 and 342 are connected to the brake 70 and clutch 72, respectively, for the purpose of slowly raising the pressure applied to the brake and clutch 70, 72, so that the frictionally coupling devices of the brake and clutch may be smoothly engaged. A shift timing valve 210 connected to the clutch 72 functions to prevent a transient excessively high rate of flow of the fluid to the clutch 72, such that a flow restrictor 212 is closed with a rise in the pressure in the cylinder of the clutch 72.

The first and second line pressures P(1 and P(2 adjusted by the first and second pressure regulating valves 100, 102, respectively, are applied to the one and the other of the first and second hydraulic cylinders 54, 56 of the CVT 14 through a shift control valve assembly 260, for controlling the speed ratio "r" of the CVT 14. The shift control valve assembly 260 has a directional control valve 262 and a flow control valve 264. These control valves 262, 264 receive through a fourth pressure line 370 a fourth line pressure Pl4 which is produced by a fourth pressure regulating valve 170 based on the first line pressure Pl1.

Figure 9:
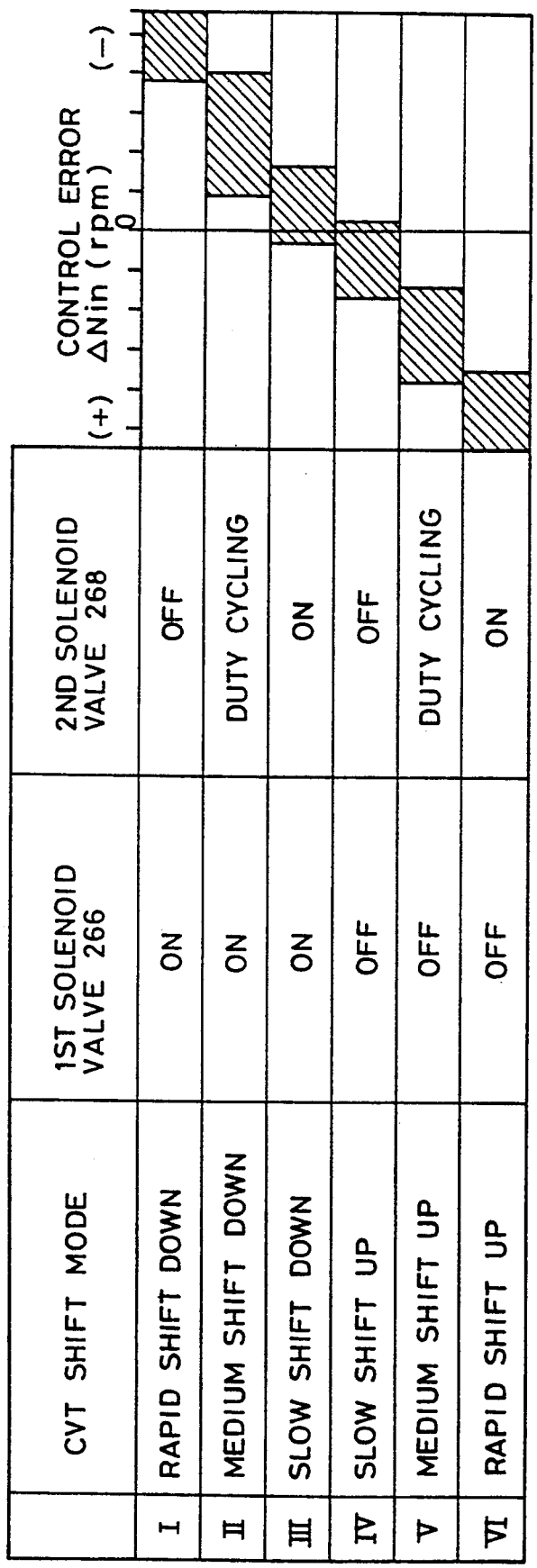
FIG. 9 is a view indicating a relationship between on-off states of a first and a second solenoid valve of the valve assembly of FIG. 2 and a shifting mode of the CVT.

The directional control valve 262 is a spool valve controlled by a first solenoid-operated valve 266, while the flow control valve 264 is a spool valve controlled by a second solenoid-operated valve 268. When the first solenoid-operated valve 266 is on while the second solenoid-operated valve 268 is off, the CVT 14 is placed in a rapid shift-down mode I as indicated in FIG. 9. In this mode I, the fluid in the first pressure line 80 is fed into the second hydraulic cylinder 56 through the directional control valve 262, flow control valve 264 and second cylinder line 302, while the fluid in the first hydraulic cylinder 54 is discharged to the drain through the first cylinder line 300, flow control valve 264 and directional control valve 262. Consequently, the CVT 14 is rapidly shifted down with the speed ratio "r" being reduced to lower the vehicle speed V. When the first solenoid-operated valve 266 is off while the second solenoid-operated valve 268 is on, the CVT 14 is placed in a rapid shift-up mode VI as indicated in FIG. 9. In this mode VI, the fluid in the first pressure line 80 is fed into the first hydraulic cylinder 54 through the directional and flow control valves 262, 264 and first cylinder line 300, while the fluid in the second hydraulic cylinder 56 is discharged to the second pressure line 82 through the second cylinder line 302 and the flow and directional control valves 264, 262. Consequently, the CVT 14 is rapidly shifted up with the speed ratio "r" being increased so as to increase the vehicle speed V.

FIG. 9 indicates the other modes of the CVT 14 which are established by appropriate combinations of the operating states of the first and second solenoid-operated valves 266, 268. When the first and second solenoid-operated valves 266, 268 are both on, the CVT 14 is placed in a slow shift-down mode III. In this mode III, the fluid in the second pressure line 82 is fed into the second hydraulic cylinder 56 through a by-pass line 295 in which a flow restrictor 296 and a check valve 298 are disposed in parallel with each other. At the same time, the fluid in the first hydraulic cylinder 54 is discharged through a small clearance which is purposely formed or inherently left between the piston and the mating sliding surface of the cylinder 54. Consequently, the CVT 14 is slowly shifted down with the speed ratio "r" being slowly increased.

The by-pass line 295 provided between the second hydraulic cylinder 56 and the second pressure line 82 functions to prevent or minimize a phenomenon of pulsation of the pressure Pout in the second hydraulic cylinder 56 which would occur in synchronization with the duty cycling operation of the flow control valve 264. Described more specifically, the upper peak of the spike of the pressure Pout is released through the flow restrictor 296, while the lower peak of the pressure Pout is compensated for by the check valve 298.

Figure 10:
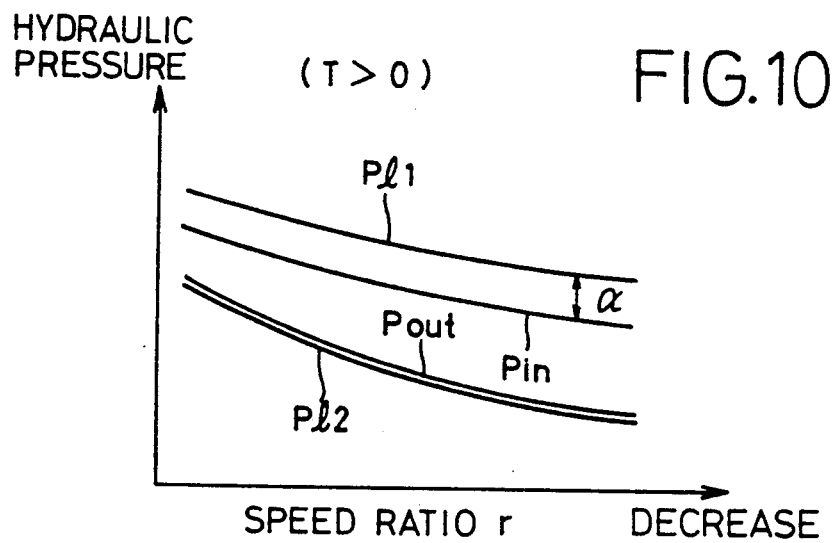
FIGS. 10, 11 and 12 are graphs indicating relationships between the speed ratio of the CVT and hydraulic pressures at different locations of the apparatus of FIG. 1, where the vehicle is running in normal, engine-brake and non-load running conditions, respectively.
Figure 11:
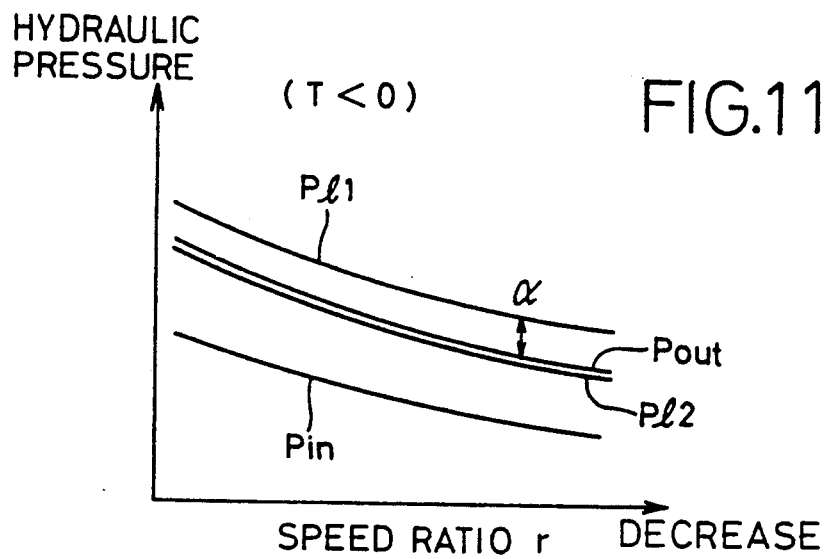
Figure 12:
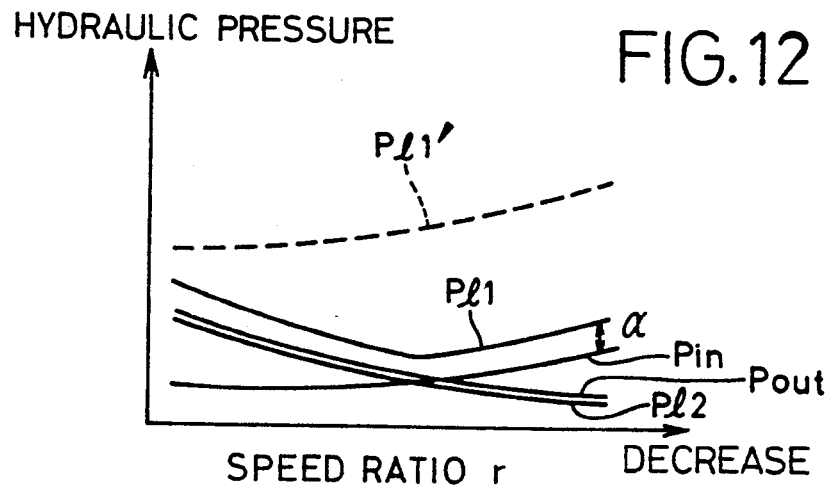

In the CVT 14, it is desirable that the first line pressure P(1 has an optimum value with respect to the second line pressure Pl2 and the cylinder pressures Pin and Pout, as indicated in FIG. 10 when torque T is transmitted through the CVT 14 in the forward direction from the input shaft 30 toward the output shaft 38 (when the torque T is positive), and as indicated in FIG. 11 when the torque T is transmitted in the reverse direction from the output shaft 30 toward the input shaft 30 as in an engine-brake running of the vehicle (when the torque T is negative). The optimum value of the first line pressure Pl1 as shown in FIGS. 10 and 11 varies with the speed ratio "r" of the CVT 14, with the torque of the input shaft 30 being constant at a given level. In the present embodiment wherein the first and second hydraulic cylinders 54, 56 have the same pressure-receiving area, the pressure Pin in the first cylinder 54 is higher than the pressure Pout in the second cylinder 56 during the positive-torque running of the vehicle, as indicated in FIG. 10. On the other hand, the pressure Pout is higher than the pressure Pin during the negative-torque running (engine-brake running) of the vehicle, as indicated in FIG. 11. That is, the pressure in the driving side cylinder 54, 56 is higher than the pressure in the driven side cylinder 54, 56. In the positive-torque running of FIG. 10, the pressure Pin in the driving side cylinder 54 provides a thrust which determines the speed ratio "r" of the CVT 14. In view of this, the first line pressure Pl1 is desirably adjusted so as to be higher than the pressure Pin by an extra amount which is a minimum value required to establish the desired speed ratio "r" with a minimum power loss. However, it is impossible to adjust the first line pressure Pl1 based on one of the pressures Pin and Pout of the two cylinders 54, 56. In view of this, the first pressure regulating valve 100 is provided with the second plunger 148, so that the valve spool 140 of the valve 100 receives a biasing force based on a higher one of the pressure Pin and the second line pressure Pl2. According to this arrangement, the first line pressure Pl1 is determined based on the higher one of the pressures Pin and Pl2 whose curves intersect each other as indicated in FIG. 12, i.e., based on the higher pressure Pin or Pl2 while the vehicle is running with no load applied to the CVT 14. More precisely, the optimum first line pressure Pl1 is determined by adding the above-indicated required minimum extra value $\alpha$, so that the first line pressure Pl1 is a minimum level required to obtain the desired speed ratio "r" with a minimum power loss. A curve indicated in broken line in FIG. 12 represents the first line pressure Pl1 where the first pressure regulating valve 100 is not provided with the second plunger 148. This curve indicates that the first line pressure Pl1' is unnecessarily high when the desired speed ratio "r" is relatively low.

Figure 13:
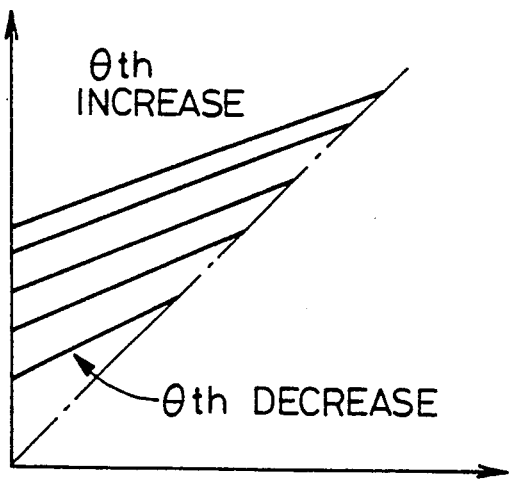
FIG. 13 is a graph indicating an output characteristic of the first pressure regulating valve of FIG. 4, i.e., a relationship between a first line pressure and a second line pressure or a pressure in a first hydraulic cylinder of the CVT.

As indicated above, the extra value $\alpha$ is a minimum value which is required to change the speed ratio "r" of the CVT 14 over its entire range available. It will be understood from the above equation (2) that the first line pressure Pl1 increases in relation to the THROTTLE pressure Pth, since the pressure-receiving areas of the relevant elements of the first pressure regulating valve 100 and the biasing force of the spring 144 are so determined. Although the first line pressure Pl1 adjusted by the first pressure regulating valve 100 increases with the pressure Pin or Pl2 and the THROTTLE pressure Pth, the pressure Pl1 is saturated at a highest value which varies with the THROTTLE pressure Pth ($\theta$th), as indicated in FIG. 13. This arrangement prevents an excessive rise in the first line pressure Pl1 (higher than the pressure Pin in the first cylinder 54 by the extra value $\alpha$), even if the pressure Pin increases while the speed ratio "r" is the lowest value with the minimum width of the V-groove of the first pulley 40 (while the movement of the movable rotor 50 is mechanically prevented).

Referring back to FIG. 2, the fluid discharged from the port 150b of the first pressure regulating valve 100 is fed into the lock-up pressure line 92, and directed to a lock-up pressure regulating valve 310 for producing as a LOCK-UP CLUTCH pressure Pcl suitable for operating the lock-up clutch 36 of the fluid coupling 12. The lock-up pressure regulating valve 310 has a valve spool 312 which receives as a feedback pressure the LOCK-UP CLUTCH pressure Pcl. The spool 312 is biased by this feedback pressure Pcl toward its open position. The valve 310 further has a spring 314 for biasing the spool 312 to the closed position, a chamber 316 to which is applied the LOCK-UP CLUTCH pressure Pcl through a lock-up clutch rapid release valve 400 upon rapid releasing of the lock-up clutch 36, and a plunger 317 which receives the pressure in the chamber 316 to thereby bias the spool 312 toward the closed position. The valve spool 312 is moved to a position of equilibrium between a thrust based on the feedback pressure Pcl and a biasing force of the spring 314, whereby the LOCK-UP CLUTCH pressure Pcl in the lock-up pressure line 92 is suitably released through the valve 310 and is thereby suitably adjusted. When the LOCK-UP CLUTCH pressure Pcl is applied to the chamber 316, the pressure Pcl is increased to more rapidly release the lock-up clutch 36. The fluid discharged from the lock-up pressure regulating valve 310 is supplied to various portions of the power transmitting system through a flow restrictor 318 and a lubrication line 94, and is returned to the return or suction line 78 connected to the oil pump 74.

The thus adjusted LOCK-UP CLUTCH pressure Pcl is supplied through a lock-up clutch control valve 320 selectively to the engaging line 322 or releasing line 324 of the fluid coupling 12, for engaging or releasing the lock-up clutch 36. More specifically described, the lock-up clutch control valve 320 includes a valve spool 326 having an engaging and a releasing position for selective communication of the lock-up pressure line 92 with the engaging and releasing lines 322, 324, and a spring 328 for biasing the spool 326 toward the releasing position. Adjacent to the upper end face of the valve spool 326 (on the side of the spring 328), there is formed a chamber 334 to which is applied the third line pressure Pl3 from the output port 256 of the shift lever valve 250 through the line 257, only when the shift lever 252 is placed in the REVERSE position "R". The chamber 334 is drained when the shift lever 252 is placed in the other positions. Adjacent to the lower end of the spool 326 (remote from the spring 328), there is formed a chamber 332 which receives a third pilot pressure Pso13 generated by a normally open third solenoid-operated valve 330 when the valve 330 is placed in the ON or closed position. With the valve 330 placed in the ON position, the third pilot pressure Pso13 equal to the LOCK-UP CLUTCH pressure Pcl is generated downstream of a flow restrictor 331. When the third solenoid-operated valve 330 is in the OFF or open position, the pilot pressure Pso13 is released through the valve 330 downstream of the flow restrictor 331. It will therefore be understood that the flow restrictor 331 and the third solenoid-operated valve 330 constitute means for generating the third pilot pressure Pso13. This pilot pressure Pso13 is applied to the second line pressure reducing control valve 380, lock-up clutch rapid release valve 400 and REVERSE INHIBIT valve 420, as well as the lock-up clutch control valve 320.

When the third solenoid-operated valve 330 is in the ON position while the shift lever 252 is placed in any position other than the REVERSE position "R", the third pilot pressure Pso13 is applied to the chamber 332 of the lock-up clutch control valve 320, but the chamber 334 is drained and held at the atmospheric pressure, whereby the valve spool 326 is moved toward the spring 328. As a result, the fluid in the lock-up pressure line 92 is supplied to the engaging line 322 to bring the lock-up clutch 36 to the engaged position. When the third solenoid-operated valve 330 is off, on the other hand, the chamber 332 is exposed to the atmosphere, whereby the valve spool 326 is moved downward as seen in FIG. 2, under the biasing action of the spring 328. Consequently, the fluid in the lock-up pressure line 92 is supplied to the releasing line 324 to thereby release the lock-up clutch 36. When the shift lever 252 is operated to the REVERSE position "R", the third line pressure Pl3 is applied to the chamber 334, whereby the thrust acting on the spool 326 based on the third line pressure Pl3 and the biasing force of the spring 328 becomes larger than the thrust based on the third pilot pressure Pso13. Accordingly, the spool 326 is moved downward (in FIG. 2) to release the lock-up clutch 36, irrespective of the operating state (on or off state) of the third solenoid-operated valve 330.

The fluid discharged through the flow restrictor 336 upon engagement of the lock-up clutch 36, and the fluid discharged from the lock-up clutch 36 through the engaging line 322 and the lock-up clutch control valve 320 upon releasing of the clutch 36, are fed to a cooler pressure control valve 338 so that the pressure of the fluid is lowered to a suitable level by the valve 338. The fluid is then fed through an oil cooler 339 and is returned to an oil reservoir (not shown).

Figure 14:
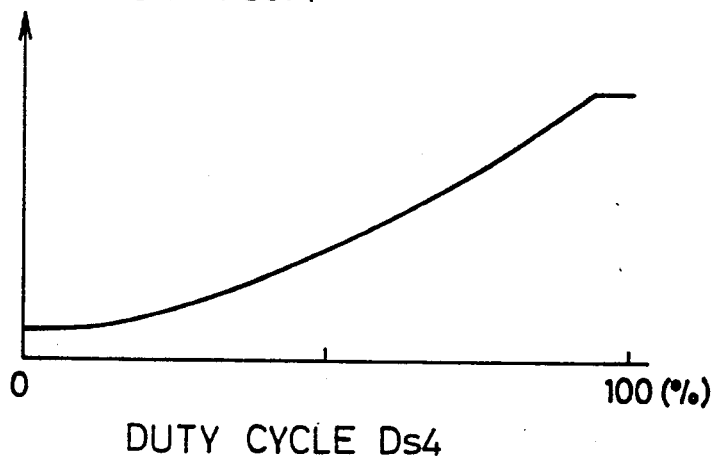
FIG. 14 is a graph indicating a relationship between the duty cycle of a fourth solenoid-operated valve of the apparatus of FIG. 2 and a pilot pressure continuously changed with the duty cycle.

The back pressures of the accumulators 342, 340 for the FORWARD clutch 72 and the REVERSE brake 70 are regulated in the following manner. The lock-up pressure line 92 is connected to a normally open fourth solenoid-operated valve 346 through a flow restrictor 344, so that the fourth pilot pressure Pso14 (described above with respect to the second pressure regulating valve 102) obtained downstream of the flow restrictor 344 is regulated by controlling a duty cycle Ds4 of the solenoid-operated valve 346, as indicated in FIG. 14. Namely, the flow restrictor 344 and the fourth solenoid-operated valve 346 constitute means for generating the fourth pilot pressure Pso14. This pilot pressure Pso14, which is regulated by the controlled duty cycle Ds4 of the fourth solenoid-operated valve 346, is applied to a pilot pressure switch valve 350 through a line 348. When the shift lever 252 is placed in any one of the PARKING, REVERSE and NEUTRAL positions "P", "R" and "N", the hydraulic cylinder of the FORWARD clutch 72 is drained by the shift lever valve 250. In this condition, the pilot pressure switch valve 350 permits the pilot pressure Pso14 to be applied to the fourth pressure regulating valve 170 through a line 354, and a line 356 is drained by the pilot pressure switch valve 350. When the shift lever 252 is operated from the NEUTRAL position "N" to the DRIVE, SECOND or LOW position "D", "S" or "L", the pressure in the cylinder of the FORWARD clutch 72 is slowly raised at a suitably determined rate as a function of time due to the pressure absorbing function of the accumulator 342, until the pressure reaches the level of the third line pressure Pl3, whereby the clutch 72 is fully engaged. That is, the fourth pilot pressure Pso14 in the line 348 is applied to the fourth pressure regulating valve 170 through the pilot pressure switch valve 350 and line 354, until the FORWARD clutch 72 is fully engaged. When the engagement of the clutch 72 is completed, the pilot pressure switch valve 350 connects the line 354 to the drain, and applies the pilot pressure Pso14 to the second line pressure reducing control valve 380 and the lock-up clutch rapid release valve 400.

The back pressures of the accumulators 340, 342 are regulated to reduce engaging shocks of the brake 70 and clutch 72 when the shift lever 252 is operated from the NEUTRAL position "N" to the DRIVE or REVERSE position "D" or "R". For this purpose, the fourth line pressure Pl4 regulated by the fourth pressure regulating valve 170 is applied through a fourth pressure line 370 to back pressure ports 366, 368 of the accumulators 342, 340 for the clutch 72 and brake 70, so that the accumulators 342, 340 restrict rates of increase in the pressure of the cylinders of the clutch and brake 72, 70 for an initial period of the engaging action of the brake and clutch 70, 72. Namely, the shock absorbing effects of the accumulators 340, 342 may be controlled by regulating the fourth line pressure Pl4.

Figure 15:
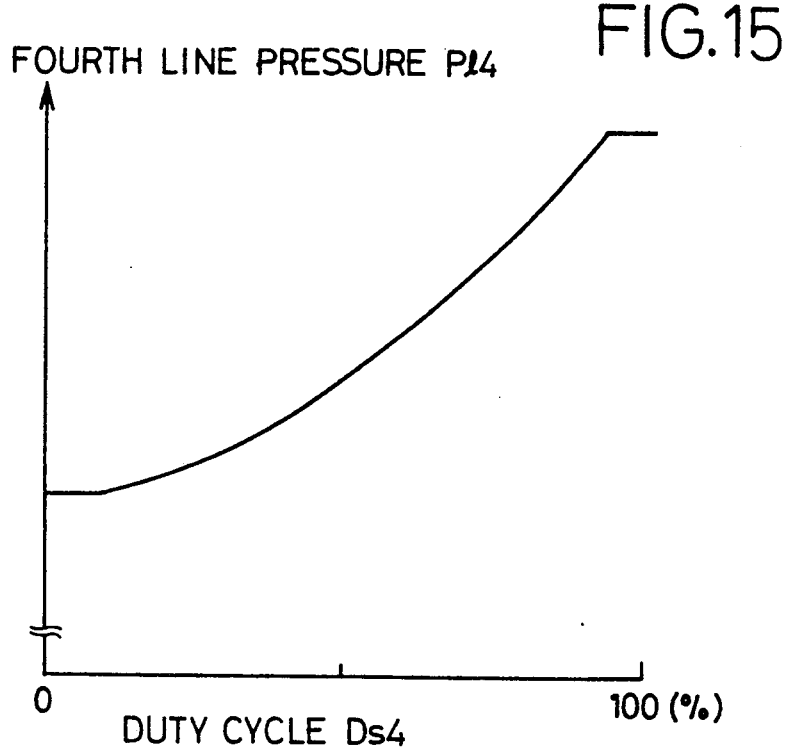
FIG. 15 is a view indicating a relationship between the duty cycle of the fourth solenoid valve and a fourth line pressure continuously changed with the duty cycle.

The fourth pressure regulating valve 170 includes a valve spool 171 for connection and disconnection between the first pressure line 80 and the fourth pressure line 370, and a spring 172 for biasing the spool 171 toward its open position. Between a first and a second land 173, 174 of the spool 171, there is formed a chamber 176 which receives the fourth line pressure Pl4 as the feedback pressure through a restrictor orifice 175. Adjacent to the end face of the spool 171 on the side of the spring 172, there is formed a chamber 177 adapted to receive the fourth pilot pressure Pso14, which biases the spool 171 toward its open position. The other end face of the spool 171 remote from the spring 172 is exposed to the atmosphere. In the thus constructed fourth pressure regulating valve 170, the valve spool 171 is positioned for equilibrium between the valve closing biasing force based on the fourth line pressure Pl4 and the valve opening force based on the fourth pilot pressure Pso14. As a result, the fourth line pressure Pl4 is adjusted depending upon the pilot pressure Pso14. More specifically, when the shift lever 252 is operated from the NEUTRAL position "N" to the DRIVE or REVERSE position "D", "R", the fourth solenoid-operated valve 346 is operated in the duty cycling manner, so as to change the fourth line pressure Pl4 with the duty cycle Ds4 of the fourth solenoid-operated valve 346, as indicated in FIG. 15, with the pilot pressure Pso14 being applied to the fourth pressure regulating valve 170 through the pilot pressure switch valve 350. The duty cycle Ds4 is determined so that the back pressures of the accumulators 340, 342 determined by the fourth line pressure Pl4 minimize the engaging shocks of the clutch 72 and brake 70. When the pressure in the cylinder of the clutch 72 rises to the third line pressure Pl3, the pilot pressure Pso14 which has been applied to the fourth pressure regulating valve 170 is cut off by the pilot pressure switch valve 350, whereby the chamber 177 is exposed to the atmosphere, and the fourth line pressure Pl4 is regulated to a relatively low level in the neighborhood of 4 kg/cm$^2$, which corresponds to the biasing force of the spring 172 biasing the spool 171 toward the open position. The thus regulated fourth line pressure Pl4 is used primarily as a pilot pressure for controlling the directional and flow control valves 262, 264 of the shift control valve assembly 260. The accumulators 372 connected to the line 348 functions to absorb the pulsation of the pilot pressure Pso14 which would arise in relation to the frequency of the duty cycling drive pulses to activate the fourth solenoid-operated valve 346.

Referring back to FIG. 2, there will be described the second line pressure reducing control valve 380, which operates to apply the pilot pressure Pso14 generated by the fourth solenoid-operated valve 346 to the chamber 136 of the second pressure regulating valve 102, for regulating the second line pressure Pl2 so as to be close to an optimum value Popt, or for lowering the second line pressure Pl2 to prevent a pressure rise in the driven side cylinder 54, 56, which pressure rise is caused by a centrifugal force during rotation of the driven side pulley 40, 42. The second line pressure reducing control valve 380 has a port 382a communicating with the line 356, a port 382b communicating with the chamber 136 of the second pressure regulating valve 102 through a line 384, a drain port 382c, a valve spool 386 slidably movable between a first and a second position corresponding to the upper and lower stroke ends thereof, and a spring 388 biasing the spool 386 toward the second position. The lower end face of the spool 386 partially defines a chamber 390 adapted to receive the third pilot pressure Pso13 generated by the third solenoid-operated valve 330. When the valve 330 is in the off or open position, the pilot pressure Pso13 is not applied to the chamber 390, and the spool 386 is located in its second position for fluid communication between the ports 382b and 382c, whereby the chamber 136 of the second pressure regulating valve 102 is drained, and the second line pressure Pl2 is regulated according to the equation (1) indicated above. When the third solenoid-operated valve 330 is turned on or closed, the third pilot pressure Pso13 (LOCK-UP CLUTCH pressure Pcl) is applied to the chamber 390 of the second line pressure reducing control valve 380, and the spool 386 is moved to its first position for fluid communication between the ports 382a and 382b. If the FORWARD clutch 72 is in the engaged position at this time, the fourth pilot pressure Pso14 regulated by the duty cycle Ds4 of the fourth solenoid-operated valve 346 is applied to the chamber 136 of the second pressure regulating valve 102 through the lines 348, 356, ports 382a, 382b and line 384. Since the pilot pressure Pso14 (LOCK-UP CLUTCH pressure Pcl) applied to the chamber 136 acts on the spool 110 of the second pressure regulating valve 102 toward its closed position, the second line pressure Pl2 is regulated according to the following equation (3):

$$Pl2 = [A4 \cdot Pth + W - A1 \cdot Pr - (A2 - A1) \cdot Pcl]/(A3 - A2) \qquad (3)$$

Figure 16:
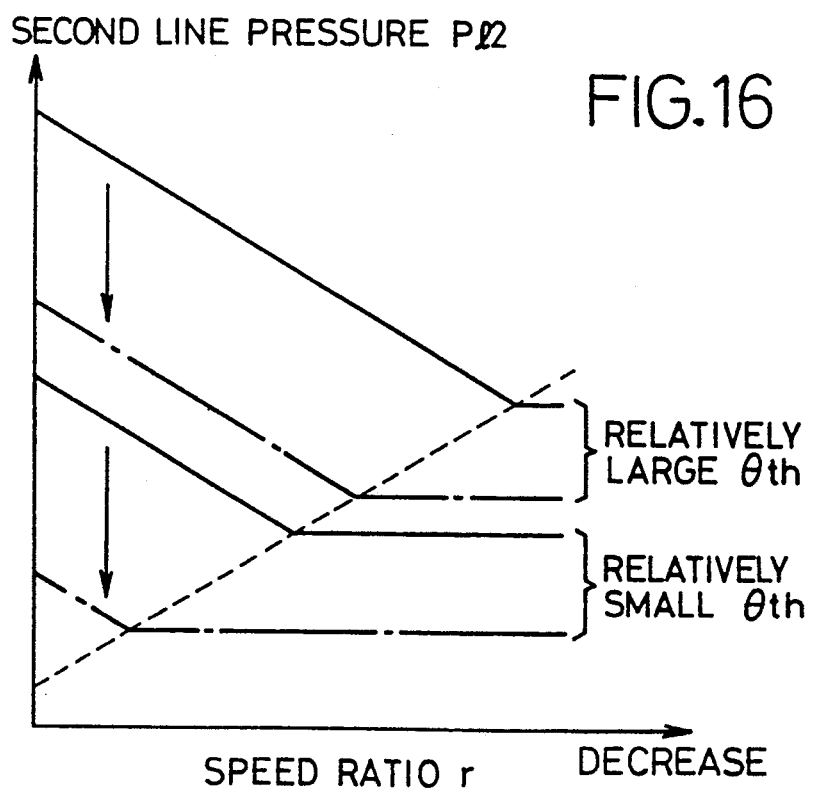
FIG. 16 is a view indicating the second line pressure which varies with the running speed of the vehicle (centrifugal hydraulic pressure increase of the hydraulic actuator)
Figure 19:
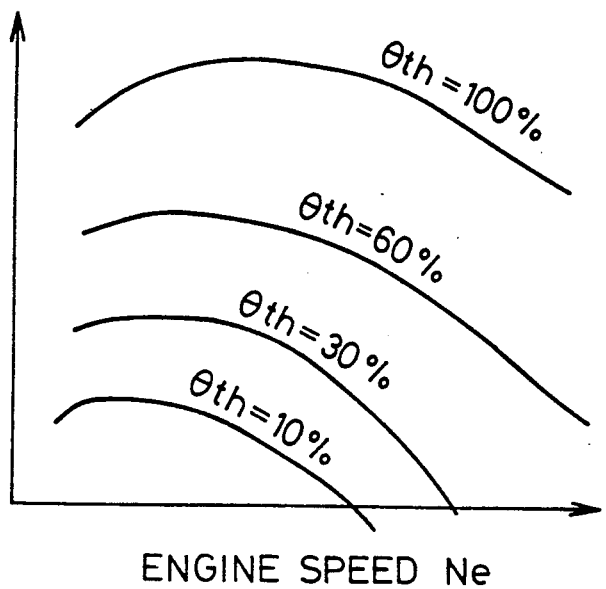
FIG. 19 a view indicating a relationship stored in the electronic control device, between the engine output torque and speed.

Accordingly, the second line pressure Pl2 is reduced as indicated in one-dot chain line in FIG. 16, as compared with the normally regulated value as indicated in solid line in FIG. 16. If the fourth solenoid-operated valve 346 is off, the second line pressure Pl2 is normally regulated according to the equation (1).

There will next be described the lock-up clutch rapid release valve 400 for rapidly releasing the lock-up clutch 36. The lock-up clutch rapid release valve 400 includes a port 402a communicating with the lock-up pressure line 92, a port 402b communicating with the chamber 316 of the lock-up pressure regulating valve 310 through a line 404, a drain port 402c, a port 402d communicating with the engaging line 322 of the lock-up clutch 36, a valve spool 406 slidably movable between a first and a second position corresponding to the upper and lower stroke ends thereof, and a spring 408 biasing the spool 406 toward the second position. Adjacent to the lower end face of the spool 406, there is formed a chamber 410 adapted to receive the LOCK-UP CLUTCH pressure Pcl when the fourth solenoid-operated valve 346 is on with the FORWARD clutch 72 fully engaged. The chamber 410 is drained when the valve 346 is off. Adjacent to the upper end face of the spool 406 (on the side of the spring 408), there is formed a chamber 412 adapted to receive the third pilot pressure Pso13 (pressure Pcl) when the third solenoid-operated valve 330 is on. The chamber 412 is drained when the valve 330 is off. The lock-up clutch rapid release valve 400 is controlled by the third and fourth solenoid-operated valves 330, 346. When the valve 330 is off while the valve 346 is on, the spool 406 is located at the first position, so that the LOCK-UP CLUTCH pressure Pcl is applied to the chamber 316 of the lock-up pressure regulating valve 310 through the ports 402a, 402b and line 404, whereby the pressure Pcl is increased. At the same time, the fluid discharged from the engaging chamber 33 of the fluid coupling 12 through the engaging line 322 is fed to the drain through the ports 402d, 402c and through the oil cooler 339. Consequently, the lock-up clutch 36 is rapidly released. When the third and fourth solenoid-operated valves 330, 346 are placed in the other combinations of operating states, the spool 406 of the valve 400 is placed in the second position. In this condition, the resistance of the valve 400 to the flow of the fluid discharged from the engaging chamber 33 of the fluid coupling 12 is relatively low, and the LOCK-UP CLUTCH pressure Pcl applied to the releasing chamber 35 is made relatively high by the lock-up pressure regulating valve 310, so that the lock-up clutch 36 may be rapidly released.

The REVERSE INHIBIT valve 420 is provided to inhibit the reversing device 16 from being placed in the reverse position with the REVERSE brake 70 engaged, when the vehicle is running in the forward direction. This valve 420 has a port 422a adapted to receive the third line pressure Pl3 from the output port 256 of the shift lever valve 250 when the valve 250 is placed in the REVERSE position "R". The REVERSE INHIBIT valve 420 further has a port 422b communicating with the cylinder of the REVERSE brake 70 through a line 423, and a drain port 422c. The valve 420 includes a valve spool 424 slidably movable between a first or non-inhibit position corresponding to one end (upper end) of the operating stroke and a second or reverse inhibit position corresponding to the other end (lower end) of the operating stroke. The spool 424 is biased by a spring 426 toward the first position. Adjacent to the upper end face of the spool 424, there is formed a chamber 428 adapted to receive the third pilot pressure Psol3 (pressure Pcl) through a line 430 when the third solenoid-operated valve 330 is on. The chamber 428 is drained when the valve 330 is off. Adjacent to the other or lower end face of the spool 424, there is formed a chamber 432 adapted to receive the third line pressure Pl3 from the output port 258 of the shift lever valve 250 when the shift lever 252 is placed in the DRIVE, SECOND or LOW position "D", "S", "L".

In the thus constructed REVERSE INHIBIT valve 420, the spool 424 is moved to the second position (lower stroke end) when the chamber 432 is drained and the third pilot pressure Psol3 (pressure Pcl) is applied to the chamber 428. In the second position, the ports 422a and 422b are disconnected from each other, and the ports 422c and 422b are connected to each other, whereby the hydraulic cylinder of the REVERSE brake 70 is drained to inhibit the reversing device 16 from being placed in the reverse position. That is, when the shift lever 252 is operated from the DRIVE position "D" to the REVERSE position "R" past the NEUTRAL position "N" during a forward running of the vehicle, the third solenoid-operated valve 330 is turned on by the electronic control device 460, so that the reversing device 16 is placed in its neutral position.

The first line pressure reducing control valve 440 is provided to lower the first line pressure Pl1 by a suitable amount to reduce the operating noise of the transmission belt 44 when the shift lever 252 is placed in the NEUTRAL or PARKING position "N", "P". This valve 440 has a drain port 442a, a port 442b communicating through the line 161 with the chamber 160 between the first and second lands 152, 159 of the first pressure regulating valve 100, a port 442c communicating with the second pressure line 82, a plunger 444, a spool 446 for selective connection and disconnection between the second pressure line 82 and the chamber 160 of the valve 100, and a spring 448 biasing the spool 446 toward the open position. Adjacent to the lower end face of the plunger 444, there is formed a chamber 450 adapted to receive the third line pressure Pl3 generated from the output port 258 of the shift lever valve 250 when the shift lever 252 is placed in any one of the forward drive positions. Between the plunger 444 and the spool 446, there is formed a chamber 452 adapted to receive the third line pressure from the output port 256 of the shift lever valve 250 when the shift lever 252 is placed in the REVERSE position "R".

In the thus constructed first line pressure reducing control valve 440, the first line pressure Pl1 is normally regulated according to the above equation (2) with the chamber 160 of the first pressure regulating valve 100 exposed to the atmosphere through the drain port 442a with the valve spool 446 placed in the upper position, when the shift lever 252 is placed in one of the DRIVE, SECOND, LOW and REVERSE positions. When the shift lever 252 is placed in the NEUTRAL or PARKING position, however, the valve spool 446 is moved to the lower position, and the second line pressure Pl2 is applied to the chamber 160 of the valve 100. Consequently, the spool 140 of the valve 100 is biased toward the open position by the second line pressure Pl2 applied to the chamber 160, whereby the first line pressure Pl1 is lowered. Accordingly, the tension of the belt 44 is reduced to a minimum level required to operate the CVT 14 without slipping of the belt 44. Thus, the operating noise of the belt 44 is reduced, and the life expectancy of the belt is prolonged.

Referring back to FIG. 1, there is indicated the above-indicated electronic control device 460, which serves to control the first, second, third and fourth solenoid-operated valves 266, 268, 330, 346 incorporated in the hydraulic circuit shown in FIG. 2. These valves are selectively energized or turned on by the control device 460, for controlling the speed ratio "r" of the CVT 14 and the operating state of the lock-up clutch 36 of the fluid coupling 12, and so forth. The electronic control device 460 includes a so-called microcomputer which incorporates a central processing unit (CPU), a random-access memory (RAM) and a read-only memory (ROM), as well known in the art.

The control device 460 receives various signals from various sensors, such as: a VEHICLE speed sensor 462 disposed to detect the rotating speed of the drive wheels 24, and generating a vehicle speed signal representative of the speed of the drive wheels 24, i.e., the running speed V of the vehicle; an INPUT SHAFT speed sensor 464 disposed to detect the rotating speed of the input shaft 30 of the CVT 14, and generating an input shaft speed signal representative of the detected speed Nin of the input shaft 30; an OUTPUT SHAFT speed sensor 466 disposed to detect the speed of the output shaft 38 of the CVT 14, and generating an output shaft speed signal representative of the detected speed Nout of the output shaft 38; a THROTTLE sensor 468 disposed to detect an angle of opening of the throttle valve disposed in a suction pipe of the engine 10, and generating a throttle signal representative of the opening angle $\theta$th of the throttle valve; a SHIFT LEVER sensor 470 disposed to detect the currently selected operating position of the shift lever 252, and generating a signal representative of the currently selected position Ps of the shift lever 252; a BRAKE switch 472 disposed to detect an operation of a brake pedal of the vehicle, and generating a signal indicative of the operation of the brake pedal; an ENGINE SPEED switch 474 disposed to detect a speed Ne of the engine 10, and generating a signal indicative of the engine speed Ne; and an ENGINE IDLING switch 476 disposed to generate a signal LL indicating that an accelerator pedal 478 of the vehicle is in the released position. The CPU of the electronic control device 460 processes these input signals according to control programs stored in the ROM, while utilizing a temporary data storage function of the RAM, and applies appropriate drive or control signals to the first, second, third and fourth solenoid-operated valves 266, 268, 330 and 346.

Upon application of power to the control device 460, a main control routine is executed after the initialization of the device. In the main control routine, the speeds Nin and Nout of the input and output shafts 30, 38, speed ratio "r" of the CVT 14, the vehicle running speed V and other running parameters of the vehicle are calculated based on the input signals received from the various sensors indicated above. Based on the received input signals, the control device 460 operates to control the lock-up clutch 36 and the CVT 14, and effect the control operations such as the operation to regulate the second line pressure Pl2 for maintaining the tension of the belt 44 at the optimum level under any operating condition of the CVT 14.

In controlling the lock-up clutch 36, the third solenoid-operated valve 330 is turned on to engage the lock-up clutch when the vehicle speed V exceeds a predetermined reference value, for example. The valve 330 is turned off to release the lock-up clutch 36 when the vehicle speed V falls below the reference value, or when the other predetermined condition or conditions is/are satisfied, for example, when the brake pedal is depressed.

In controlling the CVT 14, the electronic control device 460 calculates a desired or target speed Nin* of the input shaft 30 from the currently detected throttle opening angle $\theta$th and vehicle speed V, according to a predetermined relationship among these parameters Nin*, $\theta$th and V, which relationship is determined for minimum fuel consumption by the engine 10 and maximum drivability of the vehicle. The control device 460 selects one of the modes of the CVT 14 indicated in FIG. 9 to operate the CVT 14 so that the actual speed Nin of the input shaft 30 coincides with the determined desired value Nin*. Depending upon the selected mode of the CVT 14, the first and second solenoid-operated valves 266 and 268 are controlled. Further, the electronic control device 460 operates to control the third and fourth solenoid-operated valves 330, 346 for establishing an adequate one of hydraulic control modes as indicated in the table of FIG. 17.

The tension of the belt 44 is controlled by execution of a belt tension regulating routine illustrated in the flow chart of FIG. 18. Initially, step S1 is implemented to calculate an output torque Te of the engine 10, based on the engine speed Ne and the throttle opening angle $\theta$th, according to a predetermined relationship among these parameters Te, Ne and $\theta$th, as indicated in FIG. 18 by way of example. This relationship is stored in the ROM of the electronic control device 460. Step S1 is followed by step S2 to calculate a theoretically optimum value Ptheory of the second line pressure Pl2 which provides a minimum tension of the belt 44 for permitting the belt 44 to transmit the calculated torque Te without slipping of the belt on the pulleys 40, 42. The calculation of the theoretically optimum value Ptheory is effected based on the calculated torque Te and the speed ratio "r" (Nin/Nout) of the CVT 14, according to a predetermined relationship represented by the following equation (4) also stored in the ROM of the control device 460. The speed ratio "r" is calculated based on the speeds Nin and Nout represented by the signals from the INPUT SHAFT and OUTPUT SHAFT speed sensors 464, 466.

$$Ptheory = K1 \cdot (1+r) \cdot Te \tag{4}$$

where, K1: constant

The above equation (4) is similar to an equation disclosed in laid-open publication No. 60-53258 of an unexamined Japanese Patent Application, and is derived from the following equation (4') stored in the ROM of the control device 460 to calculate an optimum thrust Wout of the second hydraulic cylinder 56 for establishing the optimum belt tension without slipping of the belt 44:

$$Wout = \frac{Tin \cdot r \cdot (\cos\alpha - \mu\sin\alpha)}{Dout \cdot \mu} \cdot K' \tag{4'}$$

where,
Tin: input torque of the CVT 14
$\mu$: friction coefficient of the belt 44
$\alpha$: angle of groove inclination of the pulleys 40, 42
Dout: effective diameter of the pulley 42
K': extra margin factor The value Wout of the equation (4') is approximated, and the approximated Wout is divided by the pressure-receiving area of the second hydraulic cylinder 56, to obtain the equation (4) for the theoretically optimum value Ptheory of the second line pressure Pl2.

Then, the control flow goes to step S3 to calculate an amount of increase Pcfg in the pressure in the second hydraulic cylinder 56 due to a centrifugal force generated during rotation of the cylinder 56. The calculation is effected based on the speed Nout of the output shaft 38 of the CVT 14, according to a predetermined relationship as represented by the following equation (5) also stored in the ROM of the device 460:

$$Pcfg = K2 \cdot Nout^2 \tag{5}$$

where, K2: constant

Figure 20:
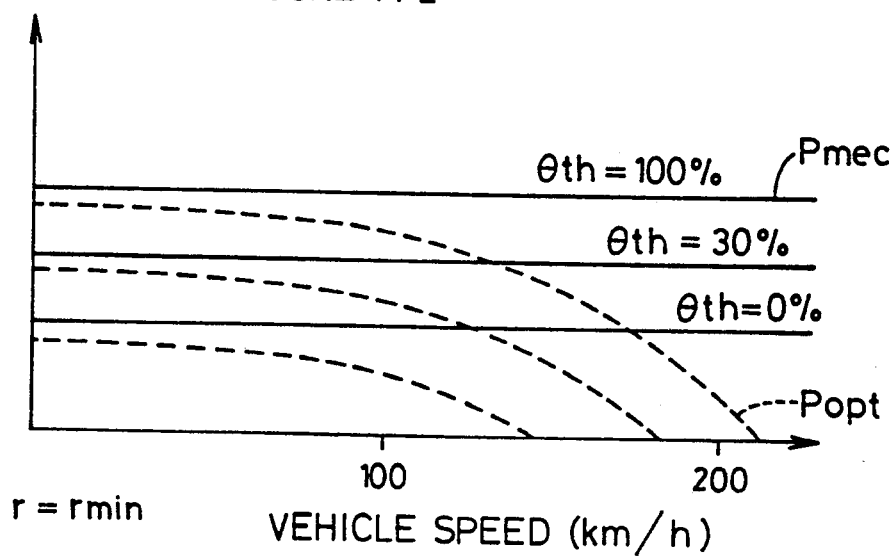
FIG. 20 is a view indicating a basic output pressure of the second pressure regulating valve of FIG. 2, and an optimum belt tensioning pressure which is lowered due to the centrifugal hydraulic pressure increase of the hydraulic actuator, in relation to the vehicle running speed.

FIG. 20 shows in solid lines a basic output pressure Pmec of the second pressure regulating valve 102 when the speed ratio "r" is the minimum value $r_{min}$ and also shows in dashed lines an optimum pressure Popt as the second line pressure Pl2 which should be applied to the second hydraulic cylinder 56 for establishing the optimum tension of the belt 44. The optimum pressure Popt is calculated in step S4 according to a predetermined stored relationship as represented by the following equation (6):

$$Popt = Ptheory - Pcfg \tag{6}$$

It will be understood that the optimum pressure Popt is obtained by subtracting the centrifugal pressure increase Pcfg calculated in step S3 from the theoretically optimum value Ptheory calculated in step S2. Namely, the optimum value Popt is lower than the theoretically optimum pressure Ptheory by the amount equal to the centrifugal pressure increase Pcfg, which is an unnecessary and undesired surplus added to the optimum value Popt for the optimum tension of the belt 44.

Step S4 is followed by step S5 to calculate the basic output pressure Pmec, which is the second line pressure Pl2 mechanically determined by the construction of the second pressure regulating valve 102 when the fourth pilot pressure Pso14 is not applied to the chamber 136 of the valve 102. The calculation of this basic output pressure Pmec is effected based on the calculated speed ratio "r" and the currently detected throttle opening angle $\theta$th, according to a predetermined relationship as indicated by solid lines in FIG. 21, for example, which is represented by the following equation (7) stored in the form of a data map in the ROM of the control device 460.

$$Pmec = map\ (r,\ \theta th) \tag{7}$$

Figure 22:
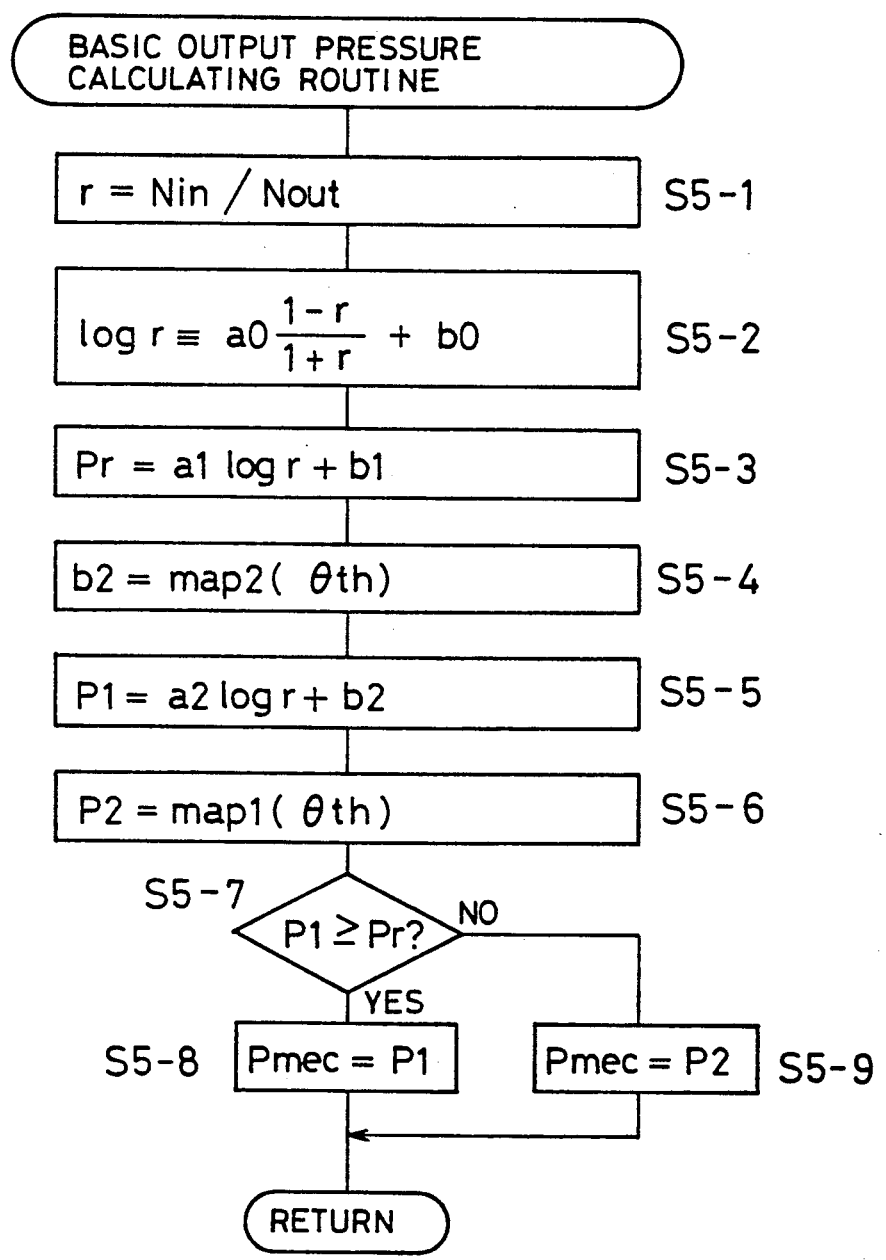
FIG. 22 is a flow chart illustrating a routine for estimating the basic output pressure used in the belt tension regulating routine of FIG. 18.

An example of a routine for calculating the basic output pressure Pmec of the second pressure regulating valve 102 in step S2 of the belt tension regulating routine is illustrated in FIG. 22. The routine of FIG. 22 is formulated for accurate calculation of the basic output pressure Pmec, with a relatively small amount of program data. Initially, step S5-1 is implemented to determine the current speed ratio "r" of the CVT 14, based on the currently detected speeds Nin and Nout of the input and output shafts 30, 38 of the CVT 14. Step S5-1 is followed by step S5-2 to calculate a value log. r of the speed ratio "r", according to a predetermined stored relationship as represented by the following approximate equation (8):

$$\log \cdot r = a_0 \frac{1-r}{1+r} + b_0 \tag{8}$$

Figure 23:
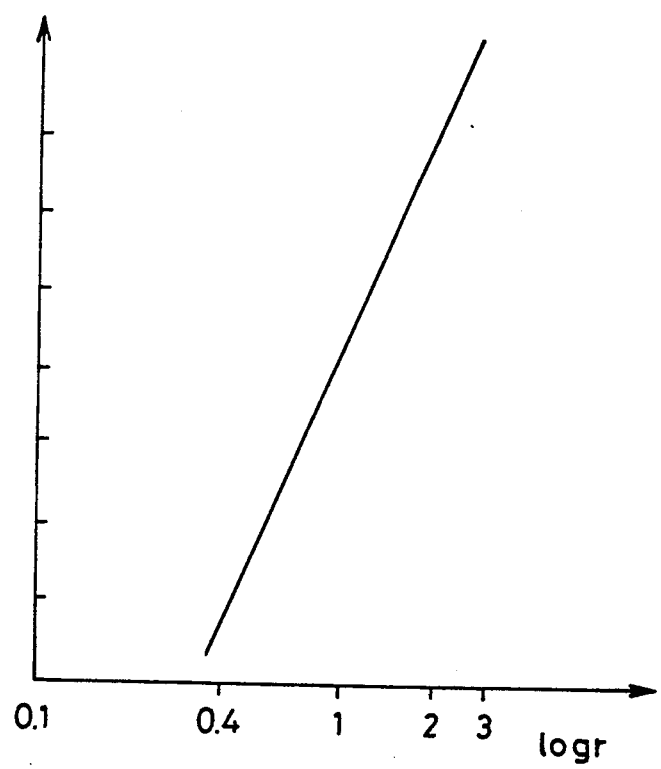
FIG. 23 is a view indicating a relationship between the logarithm of the speed ratio and a value obtained from a corresponding equation of approximation.

A straight line in FIG. 23 indicates a linear relationship between the value log. r and the approximated value obtained from the equation (8).

The control flow then goes to step S5-3 to calculate the SPEED-RATIO pressure Pr which determines points at which the solid lines of Pmec of FIG. 21 are bent, i.e., the values log. r below which the value Pmec is constant. The pressure Pr is indicated by a two-dot chain line in FIG. 21. The calculation of the pressure Pr is effected according to a predetermined stored relationship as represented by the following equation (9). This equation (9) reflects the characteristic indicated in FIG. 6.

$$Pr = a_1 \log. r + b_1 \tag{9}$$

Figure 25:
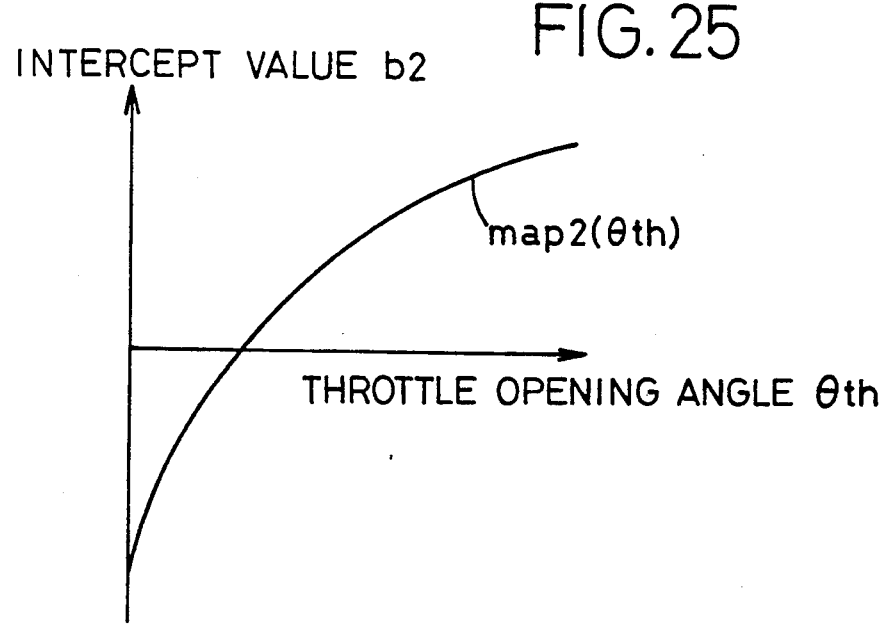

Step S5-3 is followed by steps S5-4 and S5-5 to determine a pressure P1 which corresponds to the actual running condition of the vehicle, according to a predetermined stored relationship as represented by the following equation (10) which represents the solid inclined straight lines in FIG. 21. More specifically, step S5-4 is implemented to calculate a y-axis intercept value $b_2$ of the equation (10), which corresponds to the actual vehicle running condition. The intercept value $b_2$ is indicated along the y-axis of the graph of FIG. 21 wherein the SPEED-RATIO pressure Pr is taken along the y-axis. The calculation in step S5-4 is effected based on the throttle opening angle $\theta$th, according to a predetermined stored relationship as represented by the following equation (11). This relationship is indicated by a curve in FIG. 25, for example. In the next step S5-5, the pressure P1 is calculated based on the calculated value log. r of the determined speed ratio "r" and the calculated y-axis intercept value $b_2$, according to the following equation (10). The calculated pressure P1 is the basic output pressure of the second pressure regulating valve 102 as represented by the solid inclined lines of FIG. 21.

$$P1 = a_2 \log. r + b_2 \tag{10}$$

$$b_2 = map2\ (\theta th) \tag{11}$$

Figure 24:
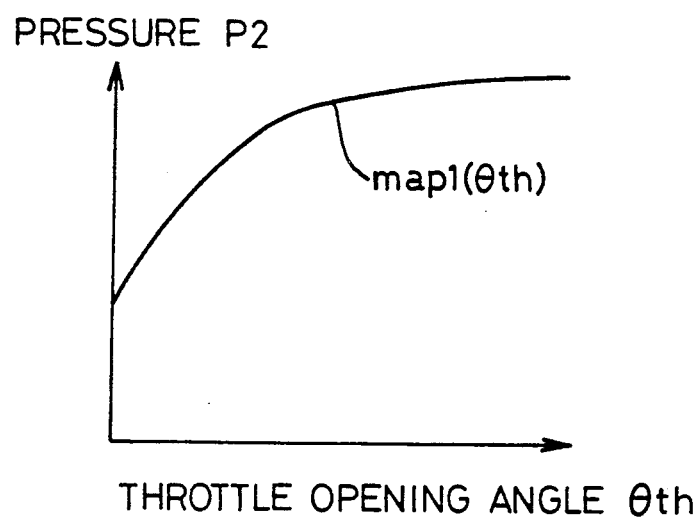
FIGS. 24 and 25 are views showing relationships $map_1(\theta th)$ and $map_2(\theta th)$ used in the basic output pressure estimating routine of FIG. 22.

Step S5-5 is followed by step S5-6 to calculate a pressure P2 corresponding to the actual running condition of the vehicle, which pressure P2 is the basic output pressure of the valve 102 as represented by the solid straight lines parallel to the x-axis of the graph of FIG. 21. The calculation is effected based on the currently detected throttle opening angle $\theta$th, according to a predetermined stored relationship as represented by the following equation (12). This relationship is indicated by a curve of FIG. 24, for example.

$$P2 = map1\ (\theta th) \tag{12}$$

Then, the control flow goes to step S5-7 to determine whether the pressure P1 calculated in step S5-5 is equal to or higher than the SPEED-RATIO pressure Pr calculated in step S5-3, or not. If an affirmative decision (YES) is obtained in step S5-7, the control flow goes to step S5-8 to determine the basic output pressure Pmec of the second pressure regulating valve 102 to be equal to the pressure P1. If a negative decision (NO) is obtained in step S5-7, the control flow goes to step S5-9 to determine the basic output pressure Pmec to be equal to the pressure P2.

Referring back to the belt tension regulating routine of FIG. 18, step S5 for calculating the basic output pressure Pmec is followed by step S6 to calculate a difference between the basic output pressure Pmec and the optimum value Popt, i.e., an amount of pressure reduction Pdown by which the basic output pressure Pmec should be lowered to obtain the optimum tension of the belt 44. This calculation is effected according to a predetermined stored relationship as represented by the following equation (13):

$$Pdown = Pmec - Popt \tag{13}$$

Namely, step S6 is implemented to calculate the pressure reducing amount Pdown which is the difference between the pressures Pmec and Popt which are indicated by the solid and dashed lines in FIG. 21, respectively.

Figure 26:
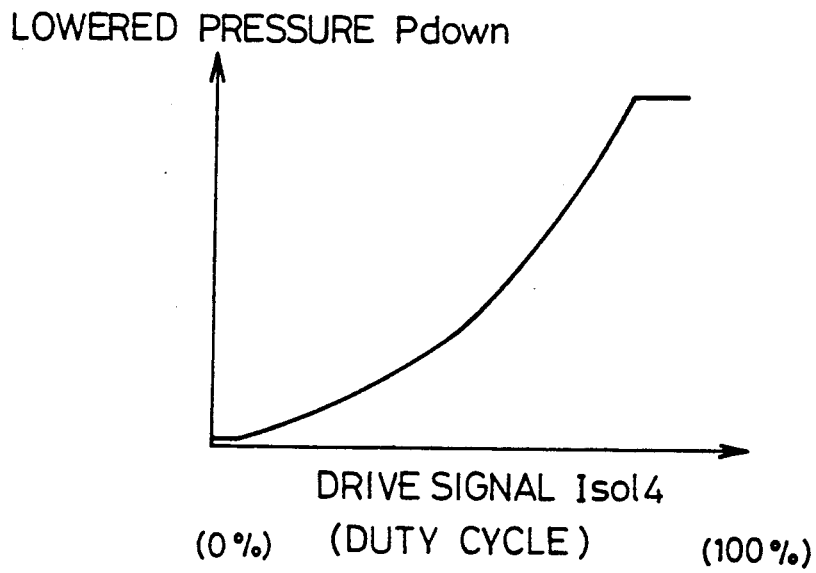
FIG. 26 is a view showing a relationship between a drive signal Iso14 applied to the fourth solenoid-operated valve of FIG. 2, and a lowered pressure Pdown of the second line pressure which varies with a pilot pressure generated by this solenoid-operated valve.

Then, step S7 is implemented to determine the drive signal Iso14 applied to the fourth solenoid-operated valve 346, which signal determines the duty cycle Ds4 of the valve 346. The determination of the drive signal Iso14 is effected based on the calculated pressure reducing amount Pdown, according to a predetermined relationship as represented by the following equation (14). The relationship is indicated by a curve of FIG. 26, for example.

$$Iso14 = g\ (Pdown) \tag{14}$$

Then, step S8 is implemented to apply the calculated drive signal Iso14 to the fourth solenoid-operated valve 346.

The belt tension regulating routine of FIG. 18 is repeatedly executed while the vehicle is running in the forward direction with the lock-up clutch 36 held in the engaged state. As a result, the second line pressure Pl2 produced by the second pressure regulating valve 102 is kept considerably close to the optimum value Popt indicated by the dashed lines in FIG. 21, depending upon the speed ratio "r" and the throttle opening angle θth. Therefore, the oil pump 74 as the hydraulic power source for the power transmitting system is operated with a minimum amount of power loss.

According to the present hydraulic control apparatus using the electronic control device 460 incorporating means for executing the belt tension regulating routine of FIG. 18, the drive signal Iso14 to be applied to the fourth solenoid-operated valve 346 to generate the fourth pilot pressure Pso14 is determined by the electronic control device 460 so that the second line pressure Pl2 produced as the belt tensioning pressure by the second pressure regulating valve 102 coincides with the optimum value Popt (=Ptheory−Pcfg), i.e., so that the second line pressure Pl2 is positively lowered from the mechanically established basic output pressure Pmec of the valve 102 by the calculated pressure reducing amount Pdown, by the controlled pilot pressure Pso14 applied to the chamber 136 of the valve 102. Thus, the second line pressure Pl2 is regulated so as to substantially follow the curve of the optimum value Popt suitable for maintaining the tension of the belt 44 at the required minimum level, so that the oil pump 74 is operated without a considerable power loss while preventing slipping of the belt 44 on the pulleys 40, 42. It will be understood that the second pressure regulating valve 102 functions to generate the belt tensioning pressure Pl2 depending upon the current speed ratio "r" of the CVT 14 and the currently required output of the engine 10 in the form of the throttle opening angle θth detected by the THROTTLE sensor 468.

Figure 27:
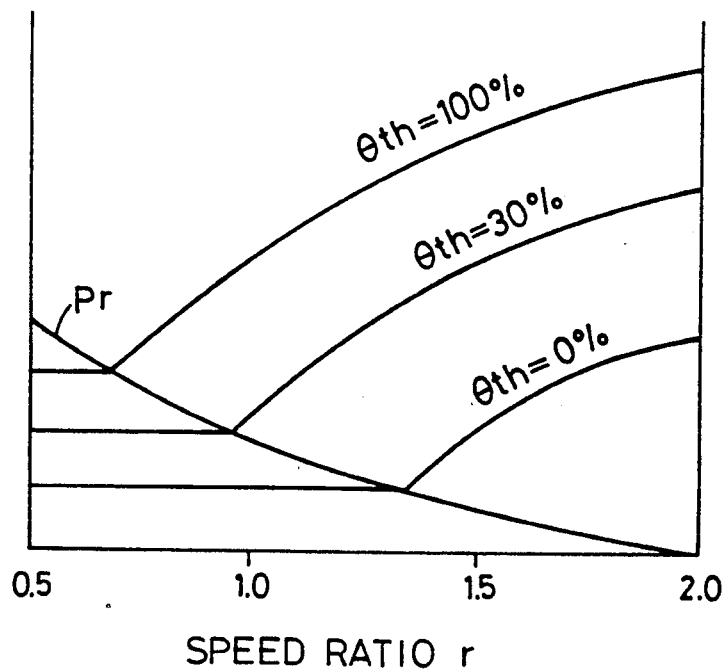
FIG. 27 is a view indicating the basic output pressure in relation the transmission speed ratio.

It is also noted that the electronic control device 460 calculates the value log. r of the speed ratio "r", and calculates the basic output pressure Pmec of the valve 102 based on the value log. r of the currently determined speed ratio "r" and the currently detected throttle opening angle θth (currently required output of the engine 10), according to the predetermined relationship among the three values log. r, θth and Pmec. This manner of calculating the Pmec requires a considerably reduced amount of program data, as compared with the conventional manner which requires interpolation of two-dimensional maps for improving the calculating accuracy. Suppose the speed ratio is taken along an evenly calibrated axis, the belt tensioning pressure Pl2 produced by the second pressure regulating valve 102 is represented by a straight line where the belt tensioning pressure is lower than the SPEED-RATIO pressure Pr, but is represented by a curved line where the belt tensioning pressure is higher than the pressure Pr. When this curved line is estimated by the conventional interpolation of two-dimensional data map, a tremendously large number of interpolated points must be obtained. In the example of FIG. 27, the speed ratio "r" is taken along the evenly calibrated x-axis, and the basic output pressure Pmec of the second pressure regulating valve 102 is indicated by solid lines. As is apparent from the figure, the basic output pressure Pmec higher than the SPEED-RATIO pressure Pr is represented by logarithmic curves. When these logarithmic curves are approximated by ordinary interpolation of a two-dimensional map, the curves of the basic output pressure Pmec must be represented by an extremely large number of interpolated points (data points), which requires an accordingly large data storage capacity and complicated arithmetic operations of a control device. According to the control device 460 used in the present embodiment, the value log. r of the speed ratio "r" is taken along the x-axis as indicated in FIG. 21, and the basic output pressure Pmec is represented by two straight lines which are connected at the point of intersection with the straight line representing the pressure Pr. The stored map (r, θth) used in step S5 is represented by a relatively small number of data points, and the memory capacity of the ROM of the control device 460 can be made considerably small, and the required arithmetic operations may be simplified.

In the present embodiment, the fourth solenoid-operated valve 346 is a normally open valve, so that a failure of the valve 346 due to an electric defect simply causes an increase in the second line pressure Pl2 by the amount Pdown, namely, merely causes the pressure Pl2 to remain equal to the basic output pressure Pmec, permitting the transmission belt 44 to operate without slipping and assuring a continuing safe running of the vehicle.

Referring to the flow chart of FIG. 28, there will be described a manner of determining the drive signal Iso14 applied to the fourth solenoid-operated valve 346. Initially, step S7-1 is implemented to determine whether the optimum value Popt calculated in step S5-3 is equal to or higher than the SPEED-RATIO pressure Pr, or not. If a negative decision (NO) is obtained in step S7-1, step S7-2 is implemented to determine whether the basic output pressure Pmec of the second pressure regulating valve 102 is equal to or smaller than the SPEED-RATIO pressure Pr, or not. If an affirmative decision (YES) is obtained in step S7-1, the control flow goes to step S7-3 in which the pilot pressure Pso14 is calculated according to the following equation (15):

$$Pso14 = (A3'/A2') Pdown \qquad (15)$$

where,
$A3' = A3 - A2$
$A2' = A2 - A1$

If the pressure Popt is lower than the pressure Pr and the pressure Pmec is equal to or lower than the pressure Pr, an affirmative decision (YES) is obtained in step S7-2, and the control flow goes to step S7-4 in which the pilot pressure Pso14 is calculated according to the following equation (16):

$$Pso14 = [(A1+A3')/A2'] Pdown \qquad (16)$$

If the pressure Popt is lower than the pressure Pr and the pressure Pmec is higher than the pressure Pr, a negative decision (NO) is obtained in step S7-2, and the control flow goes to step S7-5 in which the pilot pressure Pso14 is calculated according to the following equation (17):

$$Pso14 = (A3'/A2') Pdown + (A1/A2') (Pr-Popt) \qquad (17)$$

The second pressure regulating valve 102 is operated so as to satisfy the following equation (18):

$$Pl2 = [(A4 \cdot Pth + W - A1 \cdot Pr) - (A2-A1) \cdot Pso14]/(A3-A2) \qquad (18)$$

Therefore, the relationship between the pilot pressure Pso14 and the pressure reducing amount Pdown obtained from the pilot pressure Pso14 to lower the basic output pressure Pmec to the desired belt tensioning pressure Pl2 is derived from the above equation (18). In the case where the optimum pressure Popt is equal to or higher than the SPEED-RATIO pressure Pr, as indicated at "A" in FIG. 21, the pilot pressure Pso14 is calculated according to the above equation (15). In the case where the basic output pressure Pmec is lower than the pressure Pr, as indicated at "B" in FIG. 21, the pilot pressure Pso14 is calculated according to the above equation (16). In the case where the pressure Popt is lower than the pressure Pr and the pressure Pmec is higher than the pressure Pr, as indicated at "C" in FIG. 21, the pilot pressure Pso14 is calculated according to the above equation (17), whose right member consists of two terms to be added to each other, the two terms representing the two components of the pilot pressure Pso14 which correspond to the portions above and below the two-dot chain line Pr in FIG. 21.

Figure 29:
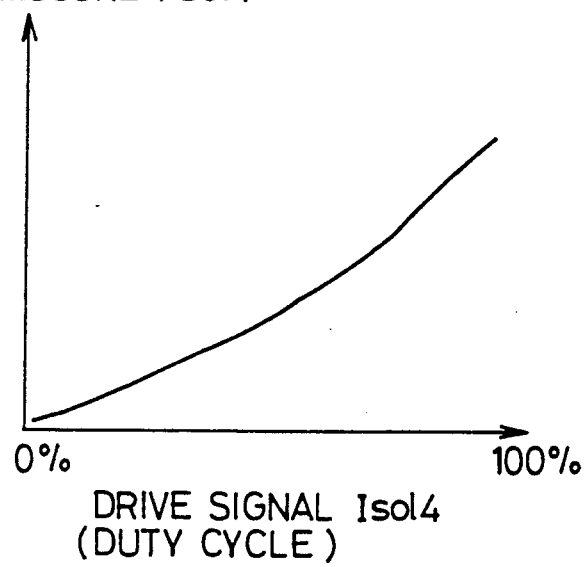
FIG. 29 is a view indicating a relationship used in the routine of FIG. 28.

Steps S7-3, S7-4 and S7-5 are followed by step S7-6 in which the drive signal Iso14 (duty cycle Ds4) of the fourth solenoid-operated valve 346 is determined based on the calculated pilot pressure Pso14, according to a predetermined stored relationship as represented by a curve of FIG. 29. In step S8 of the belt tension regulating routine of FIG. 18, the determined drive signal Iso14 is applied to the fourth solenoid-operated valve 346 to operate the valve 346 with the corresponding duty cycle Ds4, so that the second line pressure Pl2 generated by the second pressure regulating valve 102 provides a suitable belt tensioning pressure for maintaining the tension of the belt 44 at the required minimum level.

Figure 28:
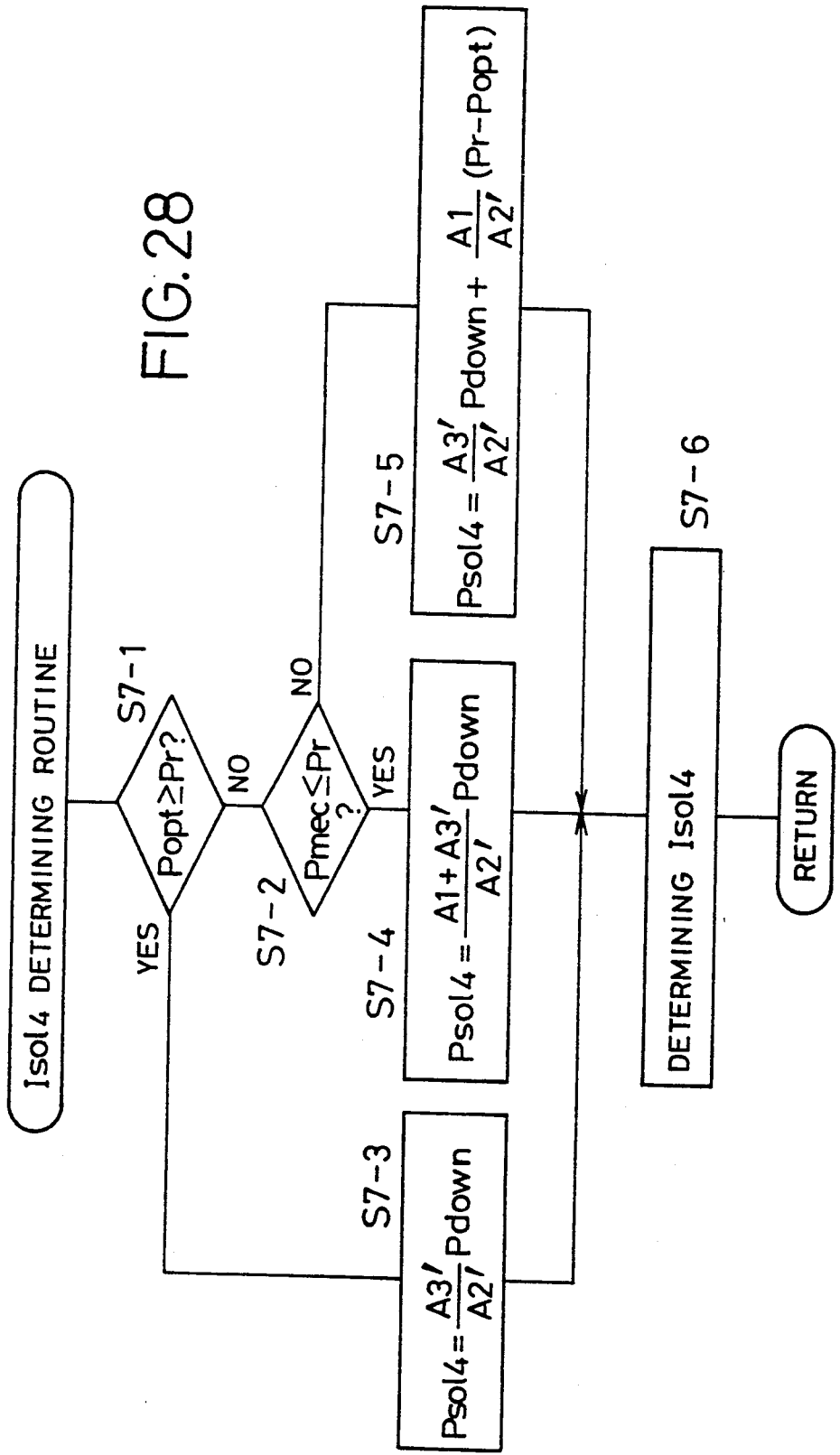
FIG. 28 is a flow chart illustrating a routine for determining the drive signal Iso14 applied to the fourth solenoid-operated valve of FIG. 2.

As explained above, the present embodiment is adapted to determine the drive signal Iso14 to be applied to the fourth solenoid-operated valve 346, according to the equations (15), (16) and (17) which are selected depending upon the specific running condition of the vehicle, as indicated in FIG. 28, i.e., depending upon the specific combination of the speed ratio "r" and the throttle opening angle θth, so that the second line pressure Pl2 actually generated by the second pressure regulating valve 102 is approximate to the optimum value Popt, by lowering the calculated basic output pressure Pmec of the valve 102 by the amount Pdown. This arrangement assures improved accuracy in adjusting the tension of the belt 44.

Other embodiments of the present invention will be described. For easy understanding, the same reference numerals and characters as used in the preceding embodiment will be used in the following description, to identify the functionally corresponding components, and no redundant description of these elements will be provided in the interest of brevity and simplification.

Figure 30:
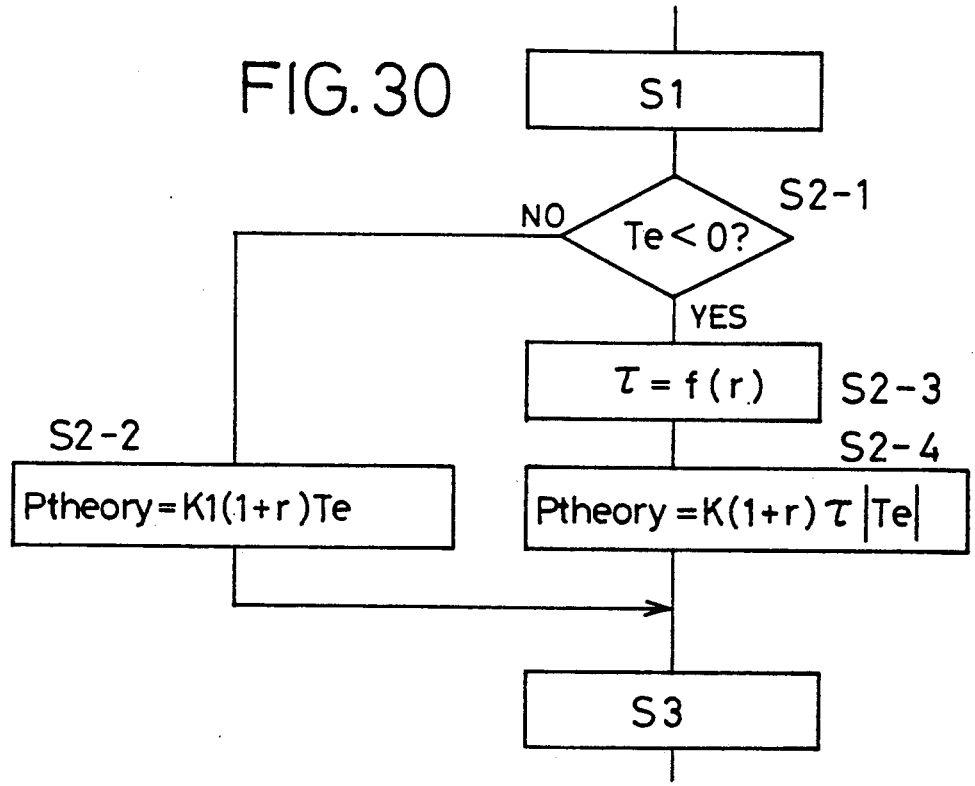
FIG. 30 is a flow chart illustrating a routine for determining the basic output pressure of the second pressure regulating valve in another embodiment of the invention, when the vehicle is running with a negative engine torque.
Figure 31:
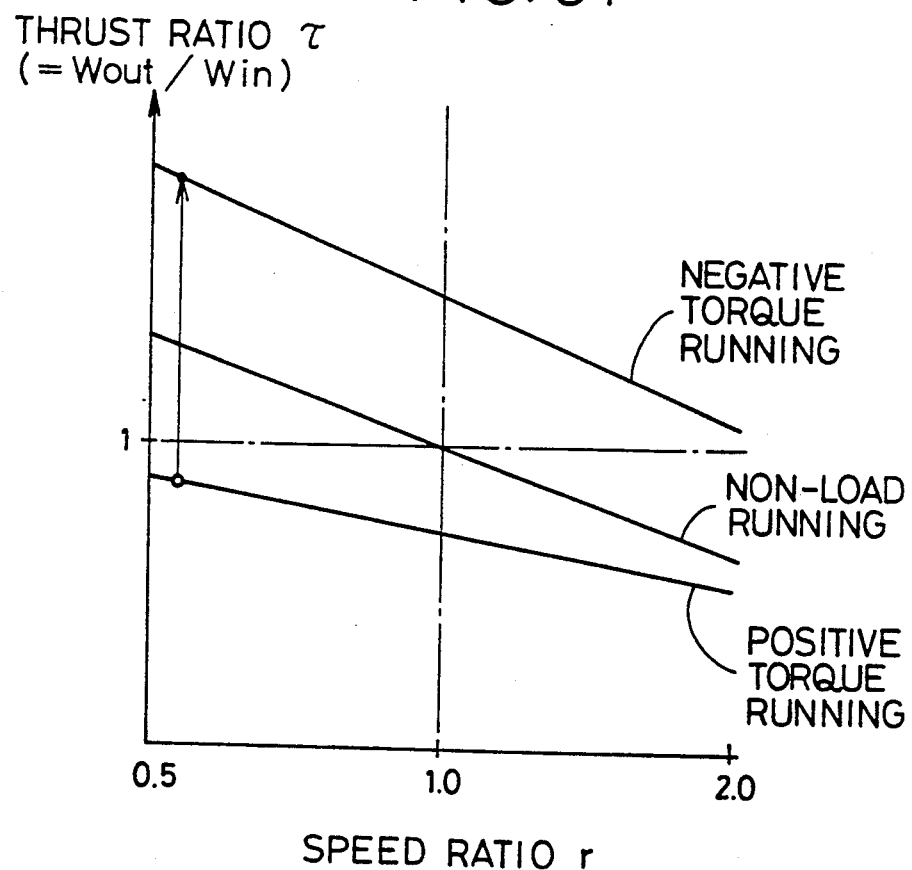
FIG. 31 is a view indicating a relationship used in the routine of FIG. 30.

Referring to FIG. 30, there is shown a modified belt tension regulating routine alternative to that of FIG. 18. In this embodiment, steps S2-1 through S2-4 are substituted for step S2 of FIG. 18, so that the theoretically optimum value Ptheory of the second line pressure Pl2 is calculated for the negative-torque running of the vehicle, as well as for the positive-torque running. The negative-torque running is interpreted to mean the running of the vehicle in a negative-torque mode in which an engine brake is applied to the vehicle so that the torque is transmitted from the drive wheels 24 to the engine 10. More specifically, step S1 is followed by step S2-1 to determine whether the output torque Te calculated in step S1 is negative or not. If the calculated output torque Te of the engine 10 is not negative, this means that the vehicle is normally running in a positive-torque with the torque being transmitted from the engine 10 to the drive wheels 24. In this case, step S2-1 is followed by step S2-2 identical to step S2 of FIG. 18, in which the theoretically optimum value Ptheory is calculated according to the above equation (4). If the calculated engine output torque Te is positive, this means the negative-torque running of the vehicle with an engine brake being applied, step S2-1 is followed by step S2-3 in which a thrust ratio of the first and second hydraulic cylinders 54, 56 during the negative-torque running, based on the currently determined speed ratio "r" of the CVT 14, according to a predetermined stored relationship as represented by the uppermost straight line in FIG. 31. This figure also indicates the relationships between the thrust ratio τ and the speed ratio "r" during the non-load running and the positive-torque running. The thrust ratio τ is a ratio Wout/Win where Wout and Win represent the thrust forces that are required to be generated by the respective first and second hydraulic cylinders 54, 56, for the CVT 14 to transmit the negative torque Tin received from the drive wheels 24 to the engine 10, without slipping of the belt 44. Step S2-3 is followed by step S2-4 in which the theoretically optimum value Ptheory is calculated according to the following equation (19):

$$Ptheory = K(1 + r \cdot \tau | Te |) \qquad (19)$$

In the present modified embodiment of FIG. 30, the second line pressure Pl2 as the pressure for tensioning the belt 44 can be accurately regulated so as to coincide with the optimum value Popt even when the vehicle is running in the negative-torque or engine-braking mode, whereby the power loss of the oil pump 74 is further minimized. In addition, the present embodiment is advantageous for reduced operating noise of the belt 44 during the engine-braking running, and further improvement in the durability or life expectancy of the belt 44.

Figure 32:
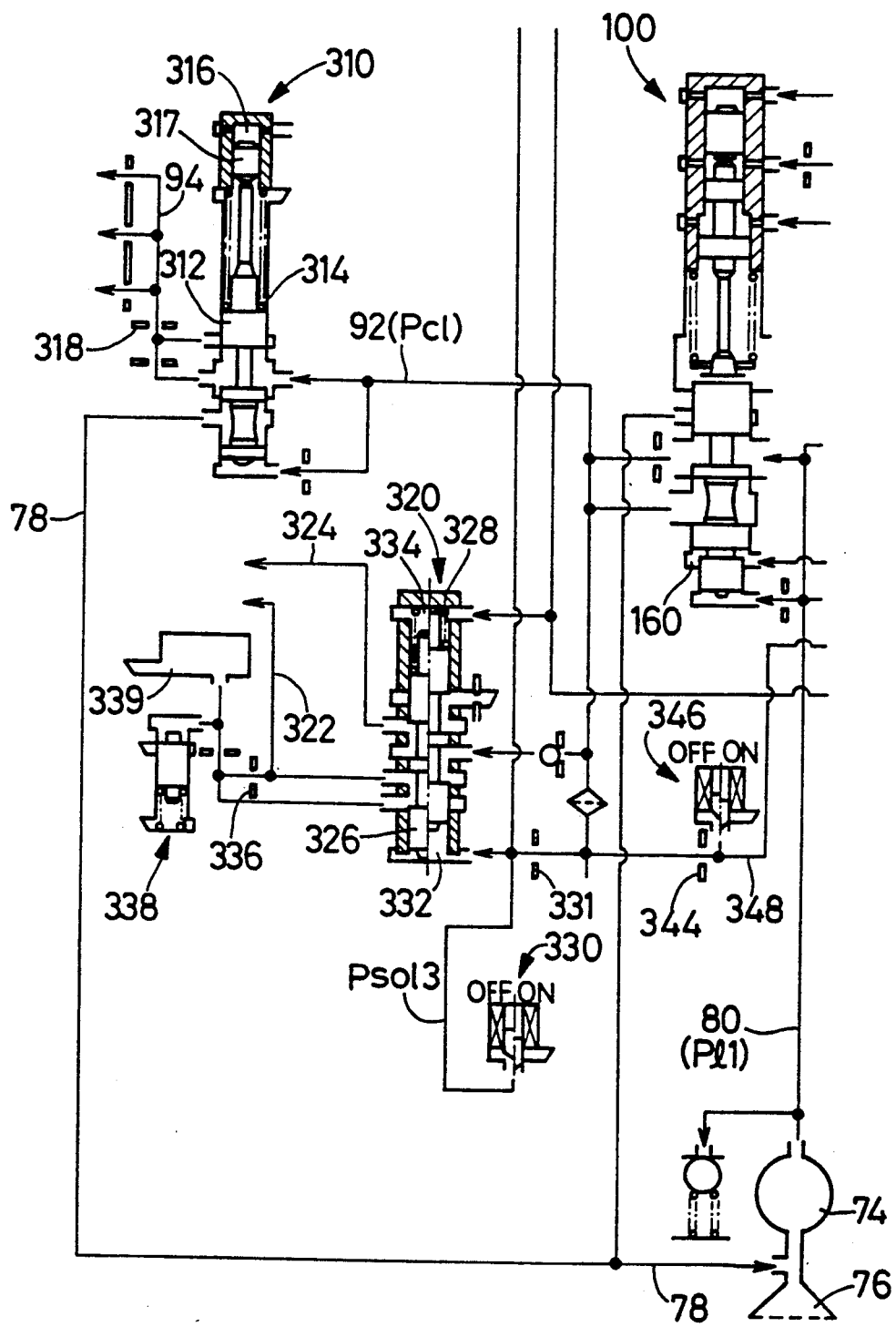
FIG. 32 is a portion of a hydraulic circuit diagram illustrating another embodiment of the invention.
Figure 33:
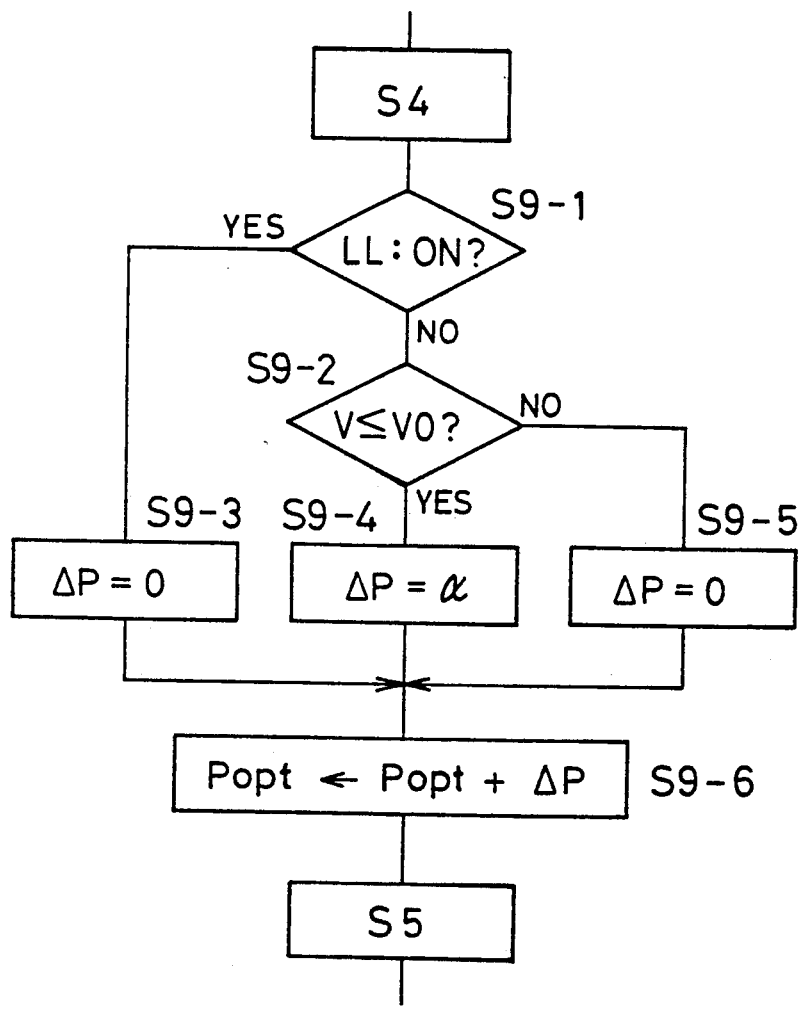
FIG. 33 is a flow chart illustrating a routine for adjusting the belt tensioning pressure in the embodiment of FIG. 32.

Referring next to FIG. 32, there is shown a part of the hydraulic system in which the third solenoid-operated valve 330 is used exclusively for controlling the lock-up clutch 36. In this case, a routine consisting of steps S9-1 through S9-6 as indicated in FIG. 33 may be inserted between steps S4 and S5 of the flow chart of FIG. 18, so that the optimum value Popt is increased by a suitable amount to accordingly increase the second line pressure Pl2 during or upon starting of the vehicle, so as to permit the vehicle to start without slipping of the belt 44. Namely, step S4 of FIG. 18 for calculating the optimum value Popt is followed by step S9-1 to determine whether the signal LL generated by the ENGINE IDLING switch 476 is ON or not. The signal LL indicates that the accelerator pedal is in the released position, i.e., the engine 10 is in the idling condition. If the signal LL is not ON, this means that the accelerator pedal is depressed, step S9-1 is followed by step S9-2 to determine whether the vehicle speed V is equal to or lower than a predetermined positive reference value Vo, or not. This reference value Vo is determined to check in step S9-2 whether the vehicle is in the process of starting. For this purpose, the reference value Vo is usually selected within a range between 2 km/h and 5 km/h, below which it is determined that the vehicle is in the process of starting and the second line pressure Pl2 should be increased to prevent slipping of the belt 44. If the signal LL is ON with the accelerator pedal placed in the released position, step S9-1 is followed by step S9-3 in which a compensation value ΔP for the optimum value Popt is set to "0". If the signal LL is ON (if the vehicle is stopped with the engine 10 in the idling condition) but the vehicle speed V is higher than the reference value Vo, step S9-2 is followed by step S9-5. In this case, the vehicle is running at a relatively high speed, or the vehicle has been started, and the compensation value ΔP is also set to "0" in step S9-5. If the signal LL is ON and the vehicle speed V is equal to or lower than the reference value Vo, the vehicle is in the process of starting, and step S9-4 is implemented to set the compensation value ΔP to a predetermined value α. Steps S9-3, S9-4 and S9-5 are followed by step S9-6 in which the set compensation value ΔP is added to the optimum value Popt calculated in step S4. That is, the calculated optimum value Popt is increased by the predetermined compensation value α only when the vehicle is in the process of starting.

Figure 34:
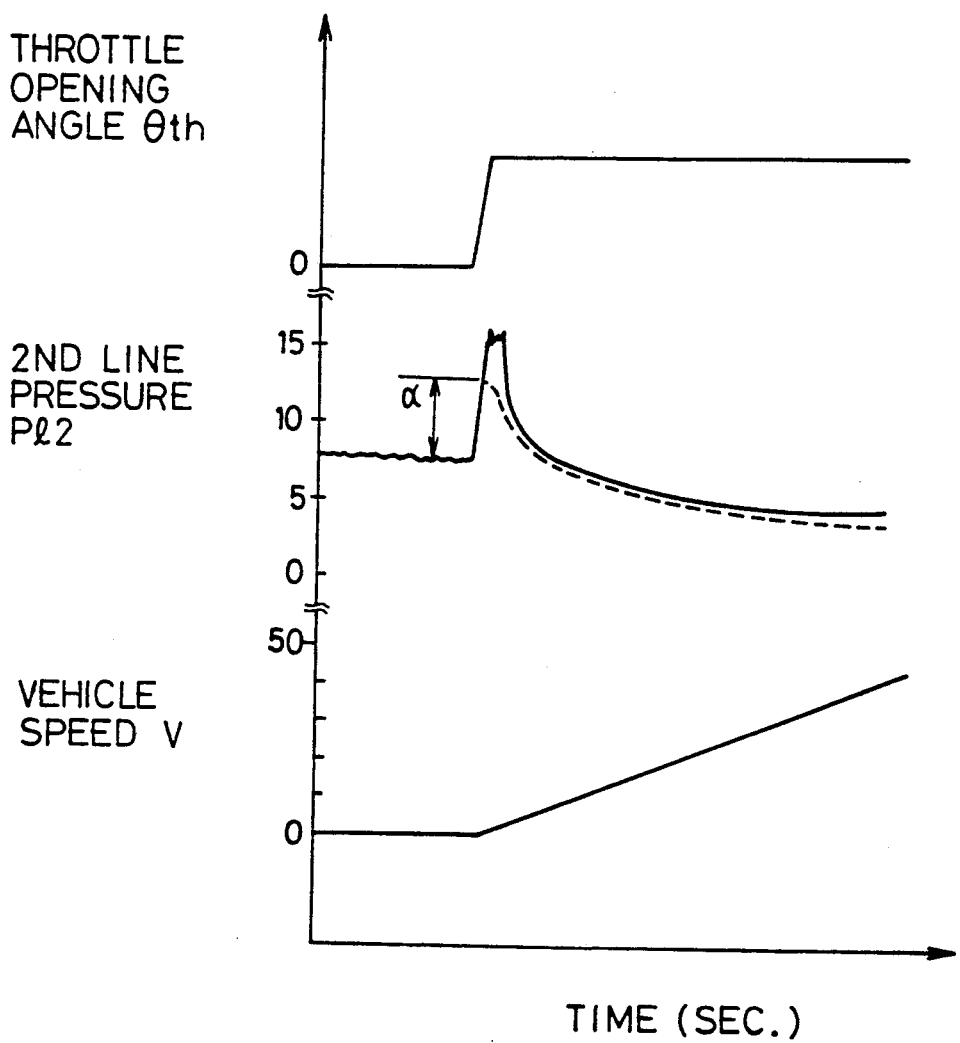
FIG. 34 is a timing chart explaining the routine of FIG. 33.

In the present modified embodiment of FIG. 33, the second line pressure Pl2 is made higher during starting of the vehicle than in the preceding embodiments, so that the vehicle can be started without otherwise possible slipping of the belt 44. In this respect, it is noted that the optimum value Popt as calculated according to the above equation (4) is suitable as long as the pulleys 40, 42 are rotating at a relatively high speed, but is lower than required when the pulleys 40, 42 are in the process of rotating from the standstill condition, since the friction coefficient of the belt 44 with respect to the pulleys is insufficient in that process. According to the present embodiment, however, the tension of the belt 44 is increased due to an increase in the second line pressure Pl2 by the amount α until the vehicle speed has reached the predetermined reference value Vo. Accordingly, the present embodiment is effective to prevent slipping of the belt 44 during starting of the vehicle. The timing chart of FIG. 34 shows changes in the throttle opening angle θth, second line pressure Pl2 and vehicle running speed V. As is apparent from the timing chart, the optimum value Popt indicated by dashed line is increased by α upon starting of the vehicle or upon depression of the accelerator pedal to start the vehicle.

Figure 35:
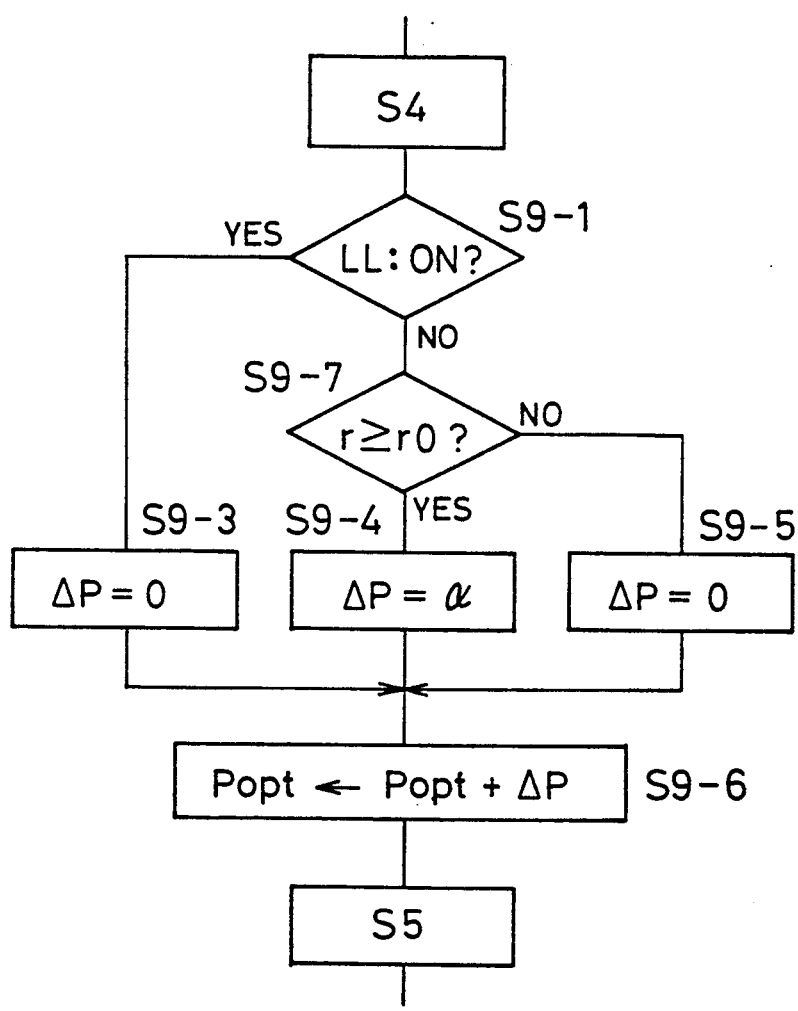
FIG. 35 is a view corresponding to that of FIG. 33, illustrating a further embodiment of the invention.

Referring to FIG. 35, there is illustrated a further modified embodiment alternative to that of FIG. 33. Namely, step S9-7 is substituted for step S9-2 of FIG. 33, to determine whether the speed ratio "r" is equal to or higher than a predetermined reference value "ro", or not, to determine whether the vehicle is in the process of starting. If the speed ratio "r" is lower than the reference value "ro", step S9-7 is followed by step S9-5, since the vehicle has been started. If the speed ratio "r" is equal to or higher than the reference value, step S9-7 is followed by step S9-4, since the vehicle is in the process of starting. It is noted that the speed ratio "r" of the CVT 14, which is controlled based on the throttle opening angle θth and the vehicle speed V according to the predetermined stored relation as described above, decreases from the maximum value $r_{max}$ when the vehicle is started from the standstill condition. In this respect, the reference value "ro" is determined to be a lower limit above which the belt 44 may slip on the pulleys 40, 42 if the second line pressure Pl2 is controlled to coincide with the normally calculated optimum value Popt, that is, if the optimum value Popt is not increased by the compensating value ΔP in step S9-6.

Figure 36:
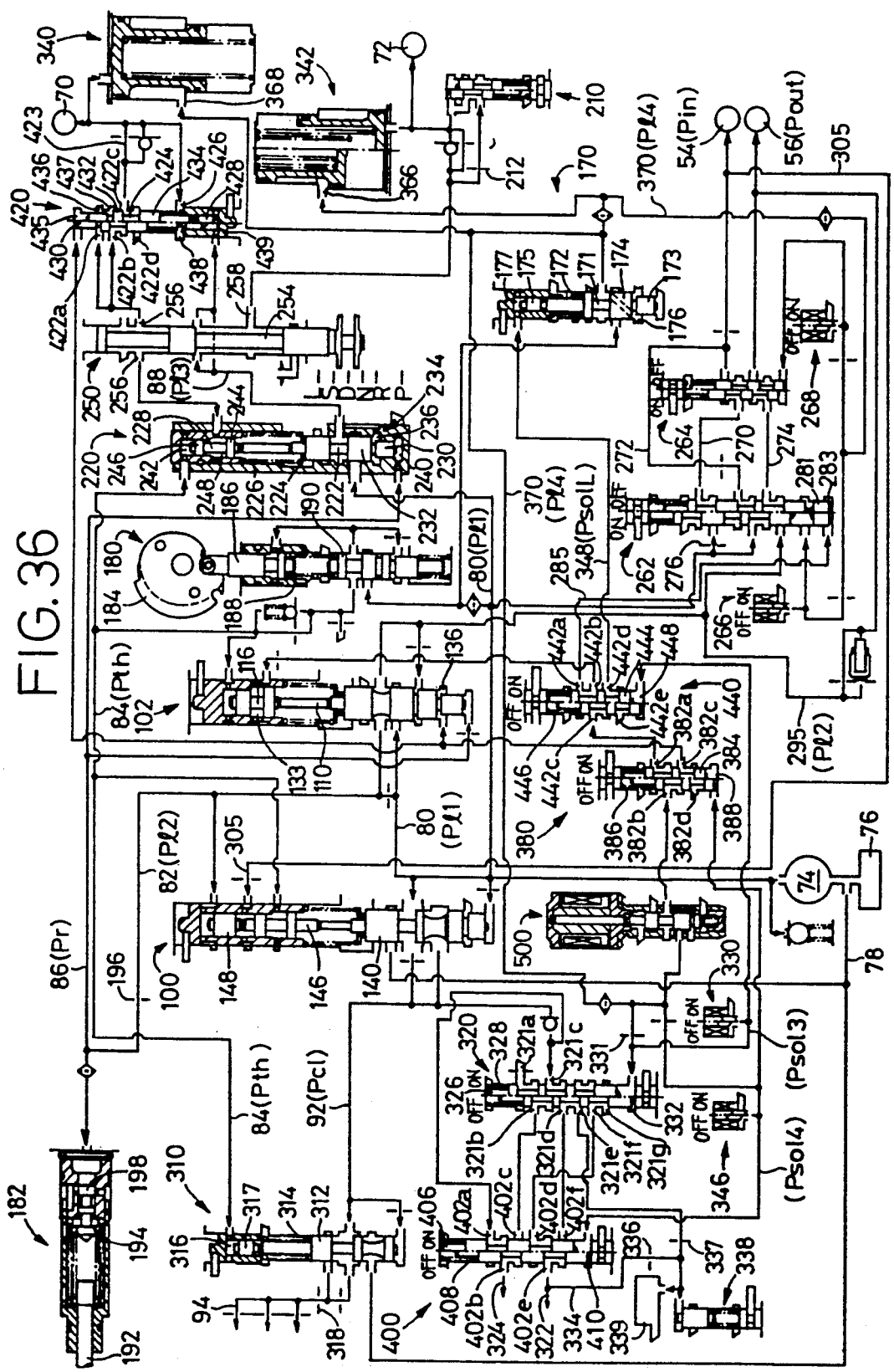
FIG. 36 is a view corresponding to that of FIG. 2, showing a still further embodiment of this invention.

Referring next to FIG. 36, there will be described a still further embodiment of the hydraulic control apparatus of the present invention.

Briefly, the present embodiment is different from the first embodiment, in that the second line pressure reducing control valve 380 and the first line pressure reducing control valve 440 function in the present embodiment as a first and a second relay valve to be controlled by the fourth and third solenoid-operated valve 346, 330, respectively. Further, the first and second pressure regulating valves 100, 102, lock-up clutch control valve 320, lock-up clutch rapid release valve 400 and REVERSE INHIBIT valve 420 are partially modified, and the pilot pressure switch valve 350 and the accumulator 372 are eliminated. The present embodiment is also characterized by a linear solenoid-operated valve (proportioning valve) 500 which is provided to generate a pilot pressure PsolL in place of the pilot pressure Pso14 in the preceding embodiments. The electronic control device 460 is adapted to selectively establish one of eight hydraulic control modes A through H indicated in FIG. 37, depending upon the running condition of the vehicle.

Figure 38:
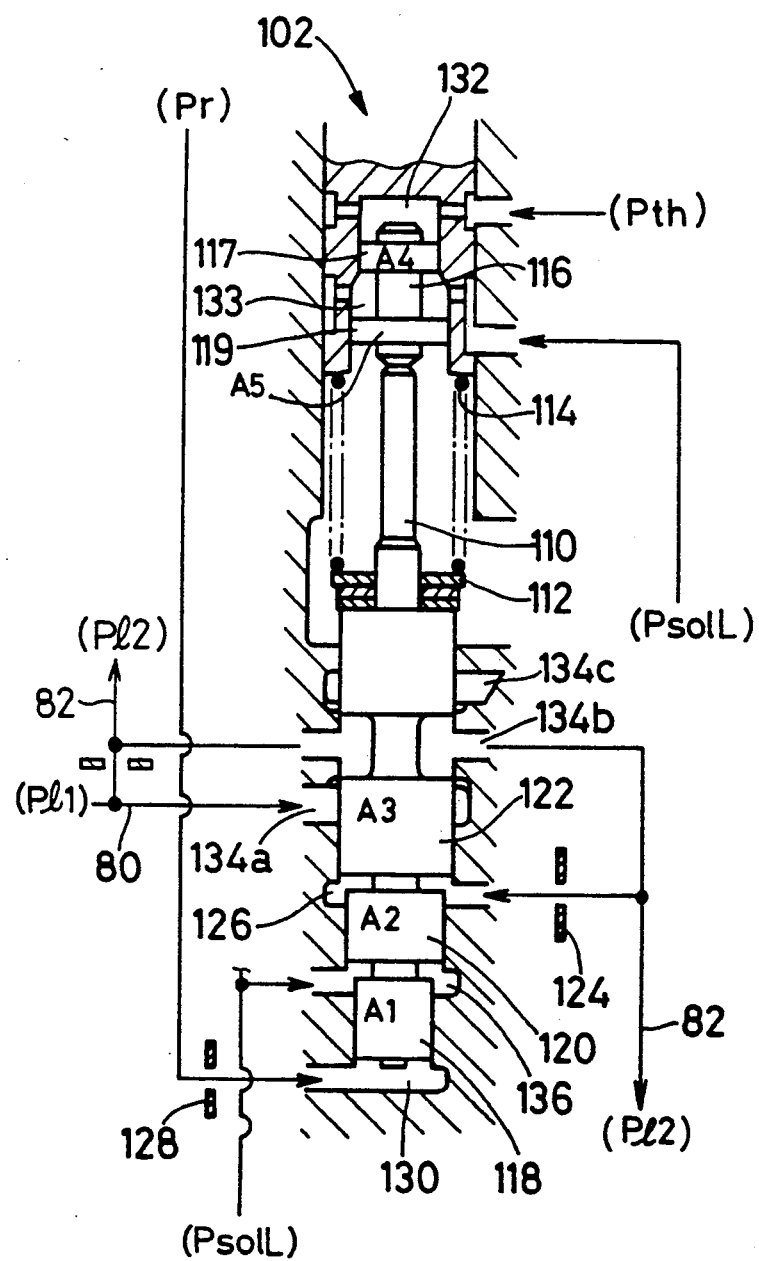
FIG. 38 is a view showing the second pressure regulating valve used in the embodiment of FIG. 36.

As shown in FIG. 38, the plunger 116 of the second pressure regulating valve 102 used in the present embodiment has a land 117 having a cross sectional area A4 adapted to receive the THROTTLE pressure Pr, and a land 119 having a cross sectional area A4' larger than the area A4. Between these two lands, 117, 119, there is formed a chamber 133 adapted to receive the pilot pressure PsolL from the port 442b of the second relay valve 440, to increase the second line pressure Pl2. The pilot pressure PsolL is also applied to the chamber 136 of the valve 102, from the part 382c of the first relay valve 380. In the present embodiment, the second line pressure Pl2 is lowered by the pilot pressure PsolL generated by the linear solenoid-operated valve 500, according to the following equation (20):

$$Pl2 = [A4 \cdot Pth + W - A1 \cdot Pr - (A2 - A1) \cdot PsolL]/(A3 - A2) \quad (20)$$

Figure 39:
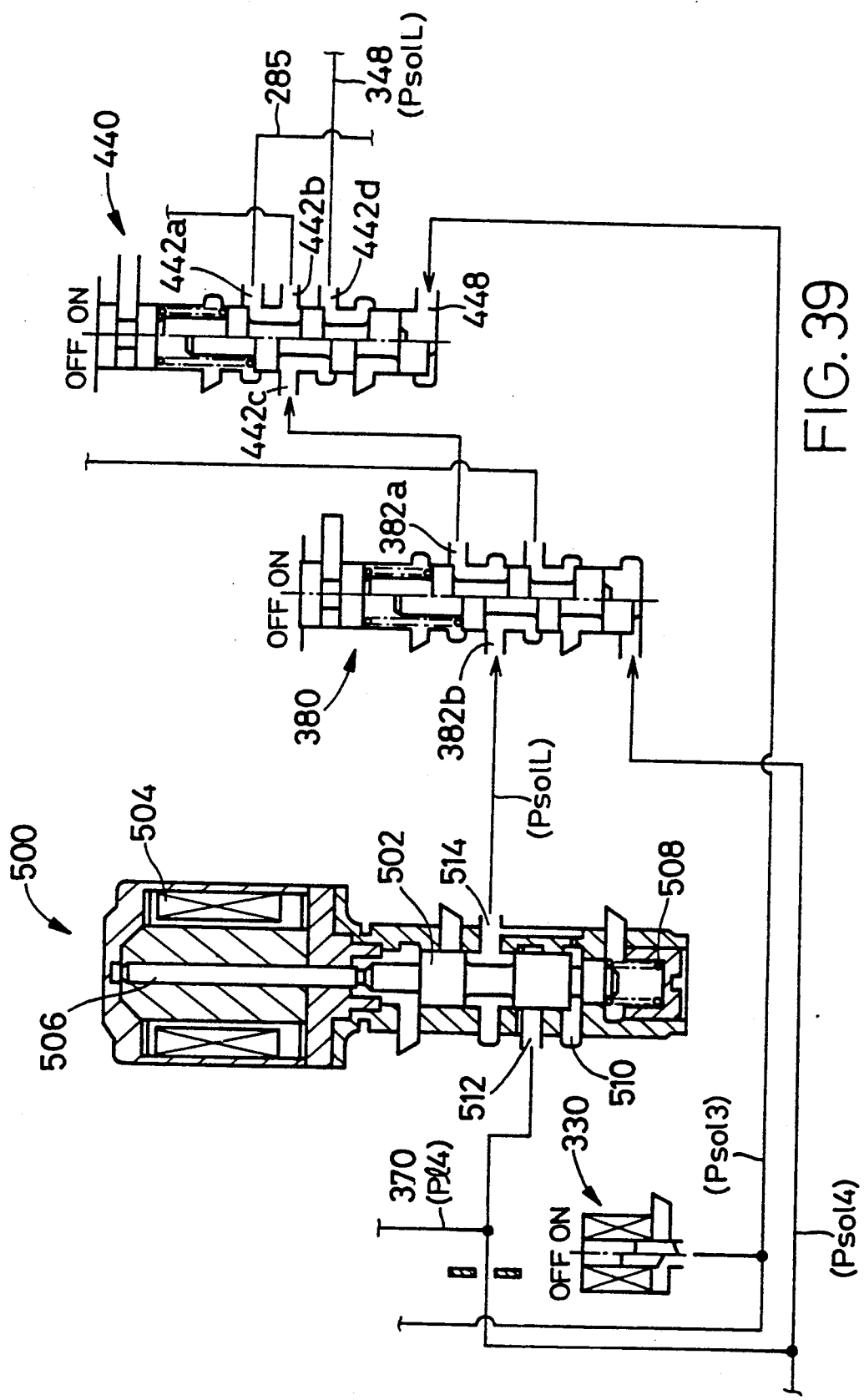
FIG. 39 is a view showing in enlargement a linear solenoid valve used in the embodiment of FIG. 36.

The linear solenoid-operated valve 500 is adapted such that the pilot pressure PsolL is continuously changed with a change in the drive signal (voltage or current) applied thereto from the electronic control apparatus 460. The valve 500 is a pressure reducing valve which, as shown in detail in FIG. 39, has a spool 502 operated to regulate the fourth line pressure P(4 into the pilot pressure PsolL, a linear solenoid coil 504 which is energized by the drive signal received from the control device 460, a core 506 for biasing the spool 502 toward a pressure-increase position upon energization of the coil 504, a spring 508 for biasing the spool 502 toward a pressure-decrease position, and a feedback chamber 510 adapted to receive the output pressure PsolL for biasing the spool 502 toward the pressure-decrease position. The spool 502 is positioned for equilibrium of forces acting in the opposite directions, namely, moved to a position at which the force produced by the core 506 to bias the spool 502 toward the pressure-increase position is equal to a sum of the biasing force of the spring 508 and the force produced by the pilot pressure PsolL in the feedback chamber 510 to bias the spool 502 toward the pressure-decrease position. As a result, the output pilot pressure PsolL is changed in relation to the drive signal, for example, drive current IsolL applied to the coil 504 from the control device 460, as indicated by a characteristic curve shown in FIG. 40. The fourth line pressure Pl4 received by an input port 512 of the valve 500 is reduced to the output pilot pressure PsolL at an output port 514, which is connected to the port 382b of the first relay valve 380. Therefore, when the fourth solenoid-operated valve 346 is ON, namely, when the first relay valve 380 is ON, the pilot pressure PsolL is applied to the chamber 133 of the second pressure regulating valve 102 through the second relay valve 440, whereby the second line pressure Pl2 is increased depending upon the pilot pressure PsolL. When the fourth solenoid-operated valve 346 is OFF, namely, when the first relay valve 380 is OFF, the pilot pressure PsolL is applied to the chamber 136 of the valve 102, whereby second line pressure Pl2 is lowered depending upon the pilot pressure PsolL. In the present embodiment, the fourth line pressure Pl4 or the second line pressure Pl2 is regulated according to the pilot pressure PsolL generated by the linear solenoid-operated valve 500, when the back pressures of the accumulators 340, 342 are controlled in the back-pressure control mode F, when the second line pressure Pl2 is lowered in the high-speed running mode D or in the neutral shifting mode B, or when the second line pressure Pl2 is increased in the rapid shift-down mode H. In the table of FIG. 37, "ON" state of the linear solenoid-valve 500 is a state in which the pilot pressure PsolL is present.

Figure 41:
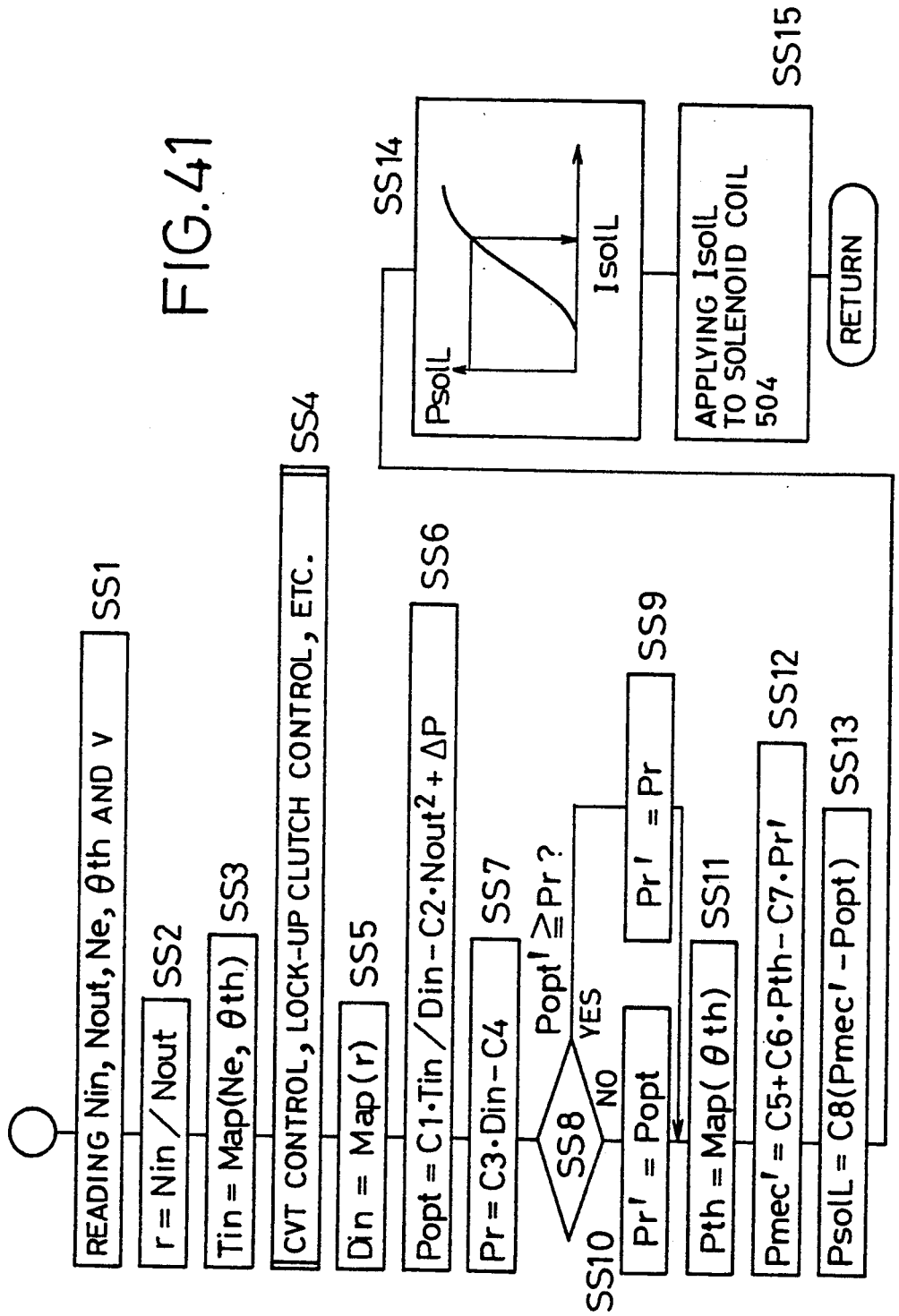
FIG. 41 is a flow chart illustrating an operation of the embodiment of FIG. 36.

Referring to FIG. 41, there will be described an operation of the electronic control device 460 when the vehicle is running in the lock-up clutch engagement mode C of FIG. 37.

Figure 42:
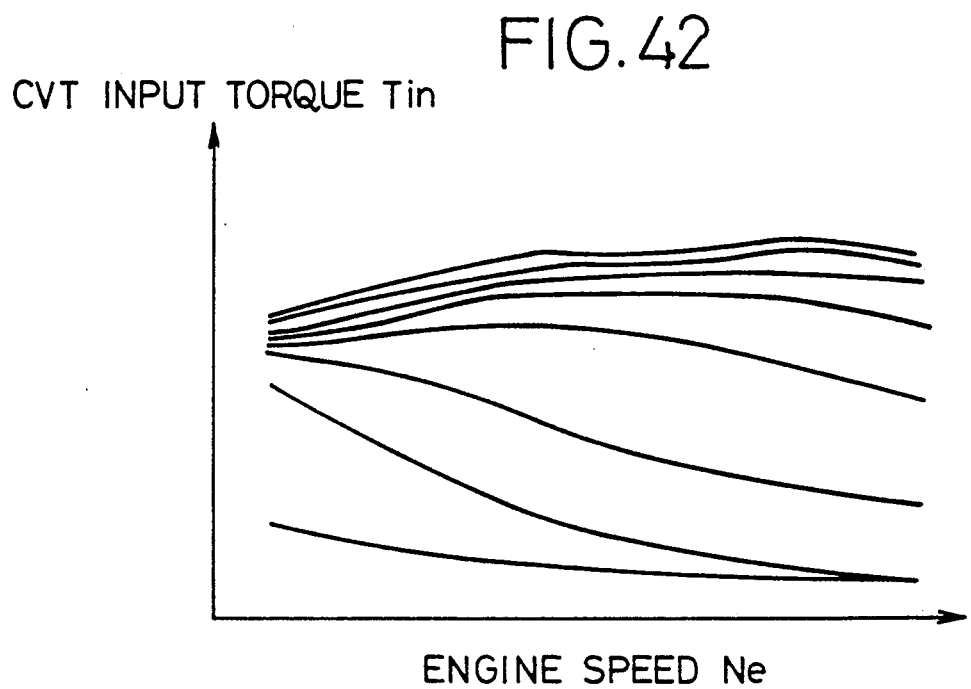
FIGS. 42 and 43 are views indicating relationships used in the flow chart of FIG. 41.

Initially, step SS1 is implemented to read the speeds Nin and Nout of the input and output shafts 30, 38, speed Ne of the engine 10, throttle opening angle $\theta$th, and vehicle running speed V. Step SS1 is followed by step SS2 to determine the speed ratio "r" of the CVT 14. Then, the control flow goes to step SS3 to calculate the output torque of the engine 10, i.e., the input torque Tin of the CVT 14, based on the engine speed Ne and throttle opening angle $\theta$th, according to a predetermined stored relationship as represented by curves of FIG. 42. Step SS3 is followed by step SS4 to control the speed ratio "r" of the CVT 14 based on the calculated input torque Tin and the detected vehicle speed V, so as to operate the engine 10 with minimum fuel consumption and maximum drivability of the vehicle. In step SS4, the control device 460 selects the lock-up clutch engagement control mode C of FIG. 37 if a predetermined condition for engaging the lock-up clutch 36 is satisfied. The determination as to whether the condition is satisfied or not is effected based on a selected parameter or parameters such as the vehicle speed V.

Figure 43:
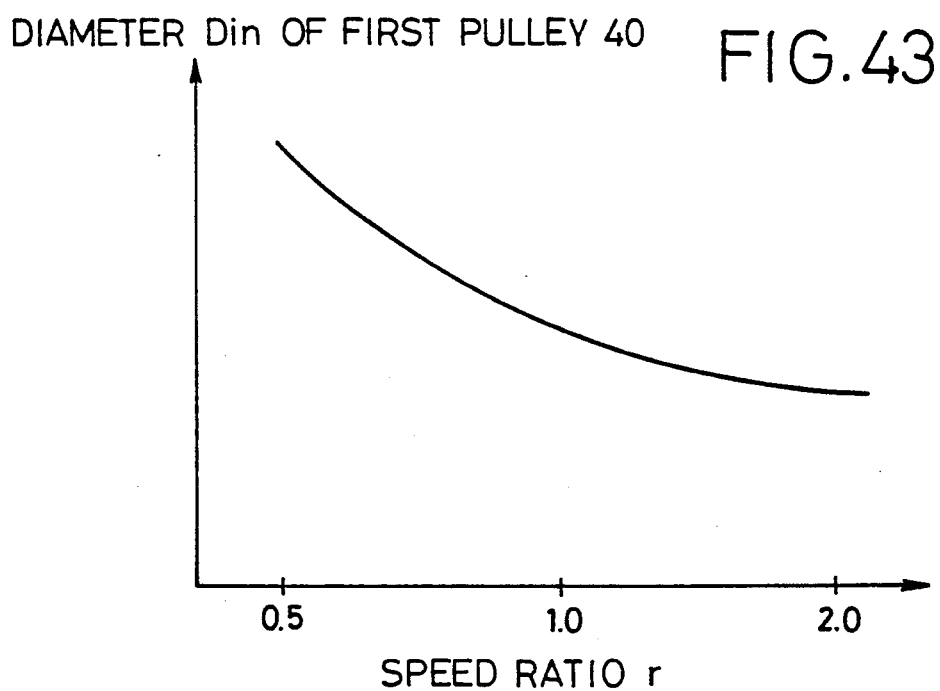

Then, the control flow goes to step SS5 and subsequent steps for regulating the second line pressure P(2 while the fourth solenoid-operated valve 346 is OFF. Namely, step SS5 is implemented to calculate an effective diameter Din of the pulley 40 of the first hydraulic cylinder 54, i.e., the diameter Din of the pulley 40 engaging the belt 44, based on the speed ratio "r", according to a predetermined stored relation as represented by a curve indicated in FIG. 43. Step SS5 is followed by step SS6 to calculate the optimum value of the second line pressure Pl2, based on the calculated diameter Din and the speed Nout of the output shaft 38, according to a predetermined stored relation as represented by the following equation (21):

$$Popt = C1 \cdot Tin/Din - C2 \cdot Nout^2 + \Delta P \tag{21}$$

where, C1 and C2 are constants.

The second term of the right member of the above equation (21) is provided for compensating the optimum value Popt for an increase in the pressure in the second hydraulic cylinder 56 due to a centrifugal force produced by rotation of that cylinder, and the third term is for adding an extra amount to the theoretically optimum value.

Then, the control flow goes to step SS7 to calculate the SPEED-RATIO pressure Pr, based on the calculated diameter Din, according to the following equation (22):

$$Pr = C3 \cdot Din - C4 \tag{22}$$

where, C3 and C4 are constants.

Figure 44:
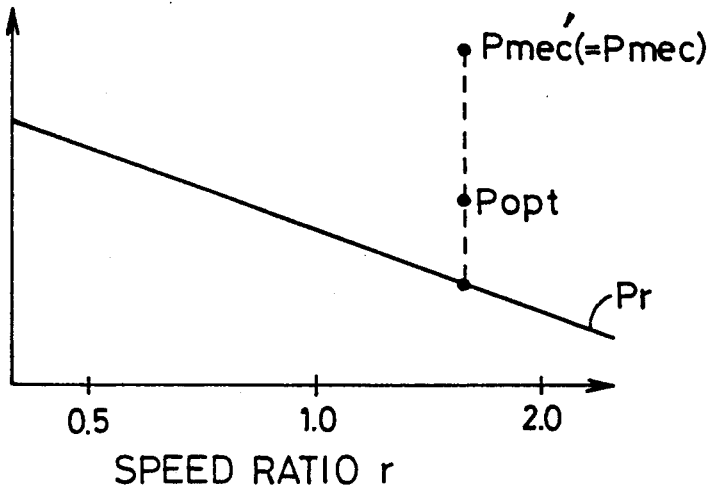
FIGS. 44, 45 and 46 are views explaining the operation of FIG. 41, FIG. 44 relating to a case where an ideal belt tensioning pressure Popt is above an inclined straight line indicative of the speed ratio pressure, and FIGS. 45 and 46 relating to cases where the ideal belt tensioning pressure is below the inclined straight line.
Figure 45:
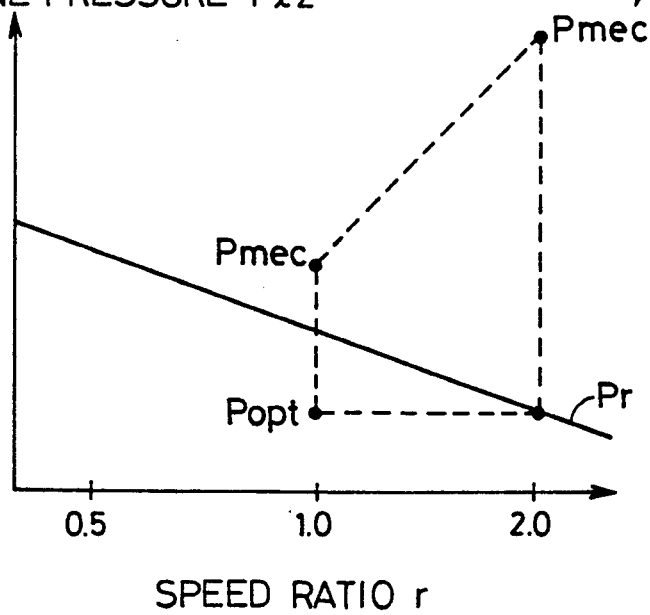
Figure 46:
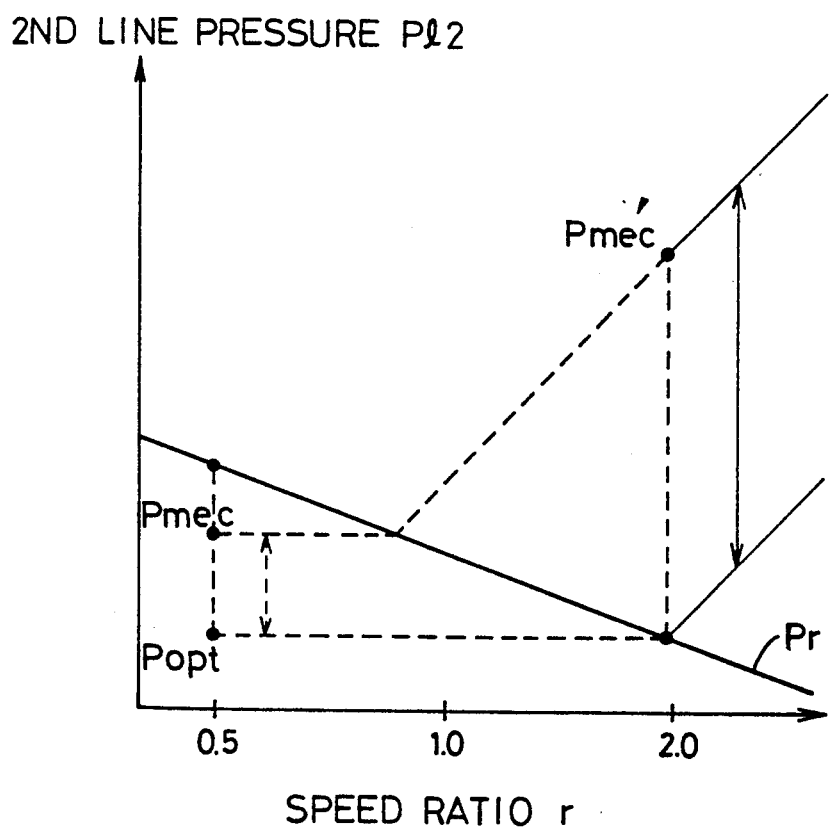

Step SS7 is followed by step SS8 to determine whether the optimum value Popt calculated in step SS6 is equal to or higher than the SPEED-RATIO pressure Pr calculated in step SS7, or not, that is, to determine whether the optimum value Popt is above the solid line Pr indicated in FIGS. 44, 45 and 46, or not.

If an affirmative decision (YES) is obtained in step SS8, the control flow goes to step SS9 in which the pressure Pr calculated in step SS7 is used for a variable Pr' included in an equation (24) described later with respect to step SS12. If a negative decision (NO) is obtained in step SS8, then the control flow goes to step SS10 in which the optimum value Popt calculated in step SS6 is used for the variable Pr' of the equation (24).

Steps SS9 and SS10 are followed by step SS11 to calculate the THROTTLE pressure Pth, based on the currently detected throttle opening angle $\theta$th, according to a predetermined stored relationship or data map as represented by the following equation (23). Step SS11 is followed by step SS12 to calculate a modified basic output pressure Pmec' of the second pressure regulating valve 102, based on the variable Pr' and the THROTTLE pressure Pth, according to a predetermined stored relationship as represented by the equation (24).

$$Pth = Map(\theta th) \tag{23}$$

$$Pmec' = C5 + C6 \cdot Pth - C7 \cdot Pr' \tag{24}$$

where, C5, C6 and C7 are constants.

Then, the control flow goes to step SS13 to determine the pilot pressure PsolL of the linear solenoid-operated valve 500, based on the modified basic optimum value Popt calculated in step SS6, according to a predetermined stored relationship as represented by the following equation (25):

$$PsolL = C8(Pmec' - Popt) \tag{25}$$

where, C8 is a constant.

Figure 40:
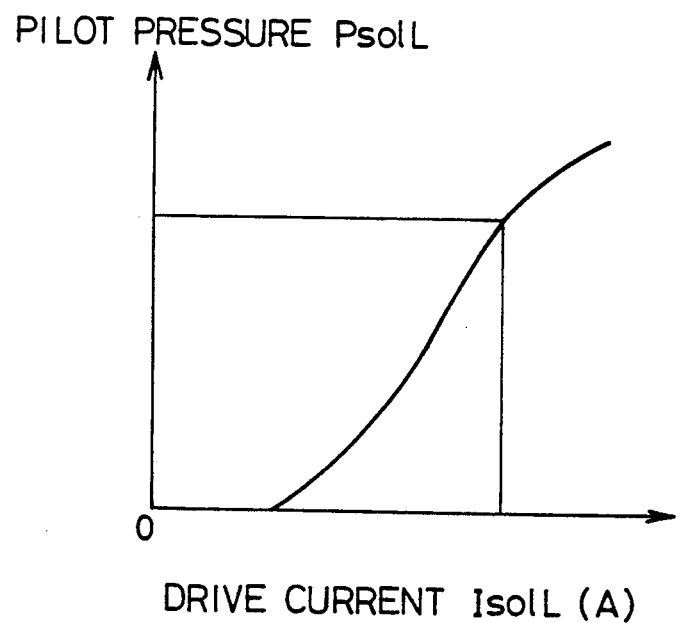
FIG. 40 is a graph indicating an operating characteristic of the linear solenoid valve of FIG. 39.

Step SS13 is followed by step SS14 to determine an analog drive signal in the form of the drive current IsolL to be applied to the solenoid coil 504 of the valve 500 for generating the determined pilot pressure PsolL. This determination is effected according to a predetermined stored relationship as represented by the curve of FIG. 40. In the following step SS15, the determined drive current IsolL is applied to the solenoid coil 504 of the linear solenoid-operated valve 500.

The above-indicated step SS8 is provided to determine whether the optimum value Popt calculated in step SS6 is above the inclined straight line of FIGS. 44-46 indicative of the SPEED-RATIO pressure Pr, or not. If the optimum value Popt is above the inclined straight line Pr, the variable Pr' of the right member of the equation (24) is replaced by the value Pr, whereby the modified basic output pressure Pmec' is obtained as indicated in FIG. 44. This value Pmec' is equal to the second line pressure Pl2 (Pmec) which is regulated by the second pressure regulating valve 102 according to the above equation (2) when the pilot pressure PsolL is not applied to the chamber 136 of the valve 102. Since the pilot pressure PsolL is determined in step SS13 so that the pilot pressure PsolL corresponds to a difference (Pmec'−Popt), the second line pressure P(2 is lowered from the value Pmec' down to the optimum value Popt, when the pilot pressure PsolL is applied to the chamber 136 of the valve 500.

If the optimum value Popt is below the inclined straight line Pr, the variable Pr' of the right member of the equation (24) is replaced by the value Popt, whereby the modified basic output pressure Pmec' is obtained as indicated in FIGS. 45 and 46. Unlike the optimum value Popt, this value Pmec' does not correspond to the current speed ratio "r". That is, the value Pmec' is not found on a straight line which passes the current speed ratio "r" and which is parallel to the axis of the pressure (Pl2). Instead, the value Pmec' lies on a straight line which is parallel to the axis of the pressure and which passes an intersection between the straight line Pr and a straight line which is parallel to the axis of the speed ratio "r" and which passes the optimum value Popt, as indicated in FIGS. 45 and 46. With the pilot pressure PsolL determined based on the thus determined value Pmec' and the optimum value Popt in step SS13, the second line pressure Pl2 is lowered to the optimum value Popt.

The pilot pressure PsolL thus determined also reflects an amount by which the basic output pressure Pmec is lowered to the optimum value Popt along a straight line which passes the current speed ratio "r". In the present embodiment, the amount of reduction of the basic output pressure Pmec of the valve 102 to the optimum value Popt lower than the SPEED-RATIO pressure Pr is converted by the amount of reduction of the modified basic output pressure Pmec' to the optimum value Popt as if the value Popt were higher than the value Pr. According to this arrangement, the required pilot pressure PsolL can be readily obtained even for the region above the straight line Pr, by simply calculating the difference (Pmec'−Popt), rather than using the rather complicated, different equations (15), (16) and (17) in the respective three cases in the first embodiment. The simplified calculation leads to reduction in the calculating error by the electronic device 460, and improved accuracy of regulation of the second line pressure Pl2.

In the present embodiment, the linear solenoid-operated valve 500 generates the pilot pressure PsolL which varies with a change in the analog drive signal applied thereto, for regulating the second and fourth line pressures Pl2, Pl4. This arrangement permits improved durability of the valve 500, reduced fuel consumption of the engine 10 and reduced operating noise of the CVT 14, and enhanced smoothness of shifting of the CVT, while at the same time eliminating the accumulator 372 which is used in the first embodiment for the purpose of preventing a pulsation which corresponds to the duty cycling frequency of the solenoid-operated value 346 used for generating the pilot pressure Pso14. Further, the present embodiment permits improved accuracy and response in regulating the fourth line pressure Pl4 used for controlling the back pressures of the accumulators 340, 342, as compared with the first embodiment using the solenoid-operated valve 346 which is turned on and off with a controlled duty cycle.

Further, the present embodiment is adapted such that a failure of the linear solenoid-operated valve 500 due to an electrical defect simply causes the second line pressure Pl2 to be equal to the value Pmec, permitting a normal continuing run of the vehicle with the CVT 14 operating without slipping of the belt 44.

Figure 47:
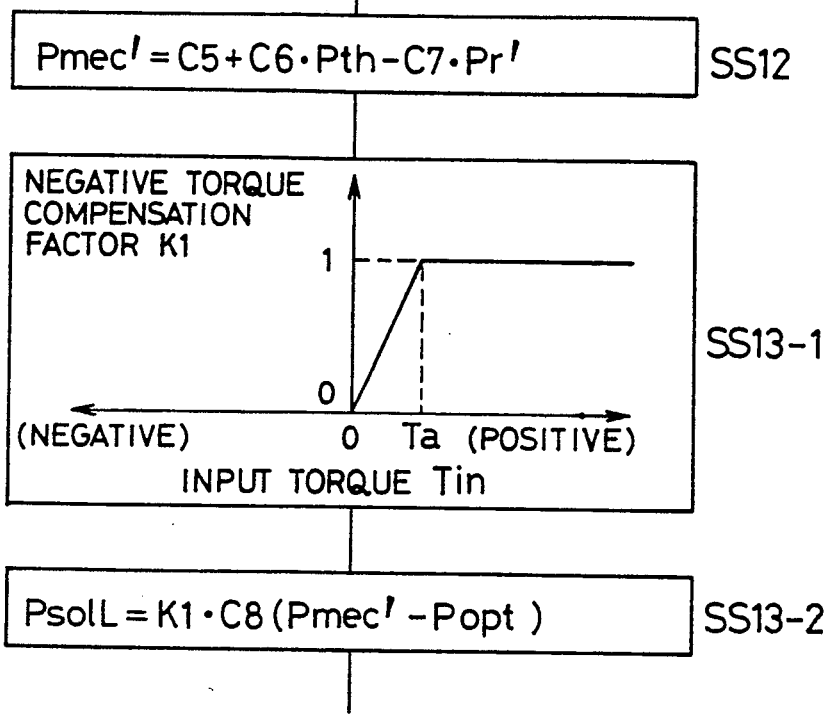
FIG. 47 is a portion of a flow chart showing another embodiment of the invention alternative to that of FIG. 41.

Referring to the flow chart of FIG. 47, there is illustrated a modification of step S13 of FIG. 41 of the preceding embodiment. Namely, the embodiment of FIG. 47 is adapted to execute steps SS13-1 and SS13-2. In step SS13-2, the pilot pressure PsolL is calculated according to the following equation (26):

$$PsolL = K1 \cdot C8 \, (Pmec' - Popt) \qquad (26)$$

The above equation (26) is different from the above equation (25) used in step SS13 of FIG. 41, in that the pressure PsolL according to the equation (26) is obtained by multiplying the right member of the equation 25) by a negative-torque compensation constant or factor K1.

Step SS13-2 is preceded by step SS13-1 to calculate the negative-torque compensation factor K1, based on the calculated input torque Tin, according to a predetermined stored relationship as indicated in the block of the step. According to this relationship, the factor K1 is "0" when the input torque Tin is negative, and "1" when the input torque Tin is larger than a predetermined positive value Ta. The factor K1 increases from "0" to "1" as the input torque Tin increases from "0" to the predetermined positive value Ta. Accordingly, the pilot pressure PsolL for reducing the second line pressure Pl2 is the same as calculated in step SS13 of the preceding embodiment of FIG. 41 if the input torque Tin is equal to or larger than the predetermined value Ta. If the input torque Tin is a negative value, the pilot pressure PsolL is zero whereby the second line pressure Pl2 is not lowered from and the same as the basic output torque Pmec indicated in solid lines in FIG. 21. If the input torque Tin is between "0" and the predetermined positive value Ta, the pilot pressure PsolL increases from zero with an increase in the input torque Tin.

Figure 48:
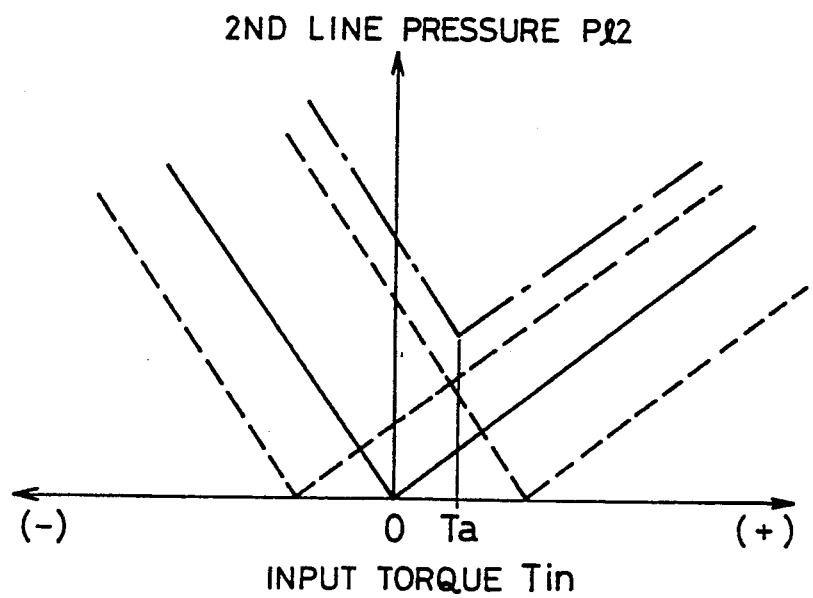
FIG. 48 is a view explaining an operation of the embodiment of FIG. 47.

In the present embodiment of FIG. 47, the second line pressure Pl2 is raised from the relatively low optimum value Popt to the relatively high basic output pressure Pmec, when the input torque Tin is a negative value, for example, when the vehicle is running with engine brake applied to the vehicle. Consequently, the present arrangement is effective to prevent slipping of the belt 44 which would otherwise tend to occur more easily during a negative-torque running of the vehicle. In this respect, it is noted that the thrust force W (Tin) necessary to prevent slipping of the belt 44 is constant irrespective of the positive or negative value of the input torque Tin, while the thrust ratio Wout/Win of the hydraulic cylinders 54, 56 to maintain the speed ratio "r" during the negative-torque running of the vehicle should be larger than in the positive-torque running and larger than "1". Accordingly, the thrust force Win of the first hydraulic cylinder 54 should be larger than the thrust force Wout of the second hydraulic cylinder 56 during the negative-torque running. Consequently, the thrust force Wout tends to be smaller than the above-indicated thrust force W (Tin) during the negative-torque running. This phenomenon requires the second line pressure Pl2 to be higher as indicated in solid lines in FIG. 48 when the input torque Tin is negative than when the input torque Tin is positive. However, the absolute value |Tin| tends to fluctuate as indicated in dashed lines in FIG. 48. To absorb this fluctuation, the second line pressure Pl2 (=Pmec) is regulated as indicated in one-dot chain lines in FIG. 48 according to the present arrangement. The minimum or lowest value indicated in the one-dot chain line corresponds to the predetermined positive value Ta of the input torque Tin. After the input torque Tin has been lowered to the predetermined positive value Ta, the negative-torque compensation factor K1 is reduced from "1" toward "0", to raise the second line pressure Pl2 from the optimum value Popt toward the basic output pressure Pmec.

Figure 49:
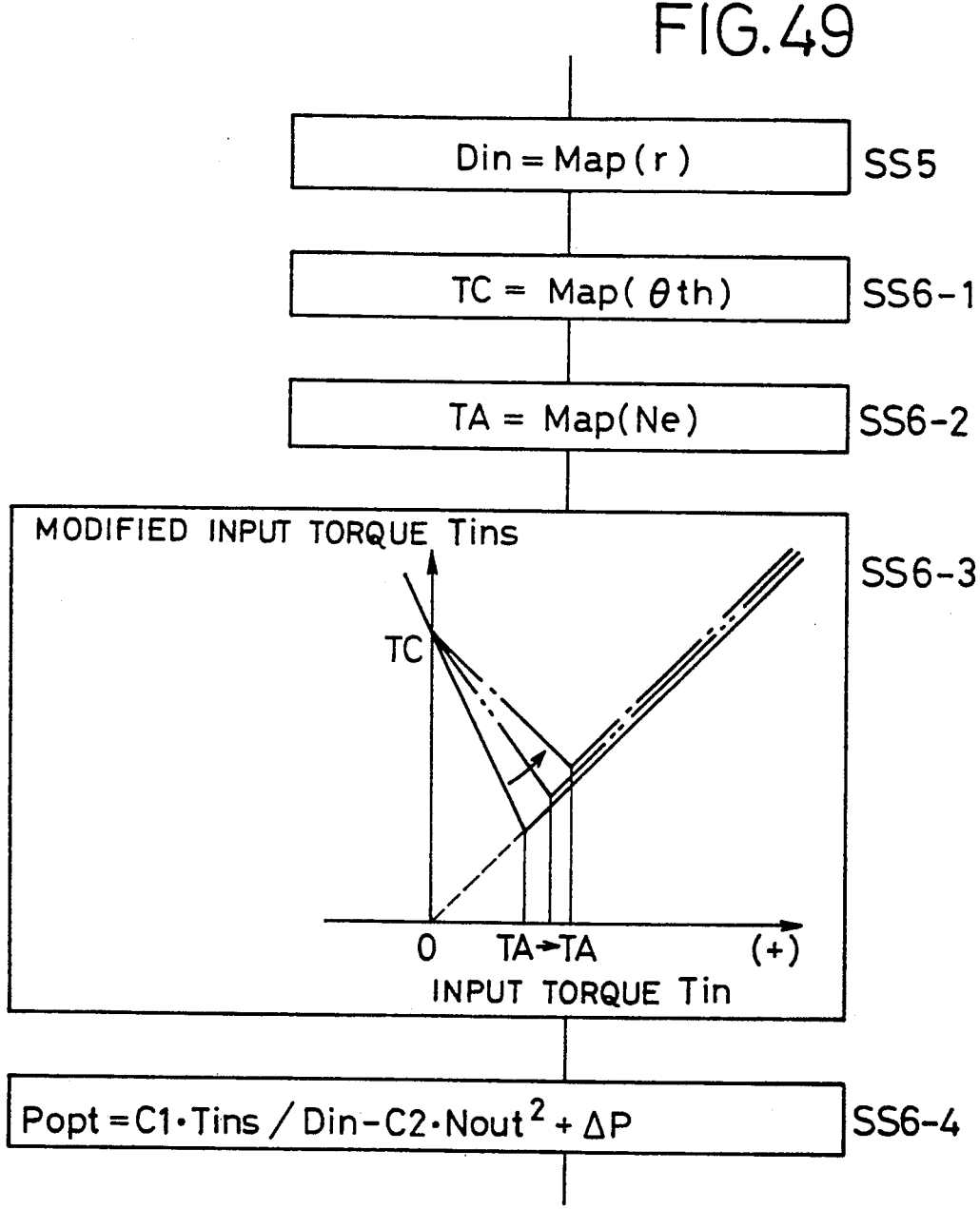
FIG. 49 is a portion of a flow chart showing a further embodiment of the invention alternative to that of FIG. 41.
Figure 50:
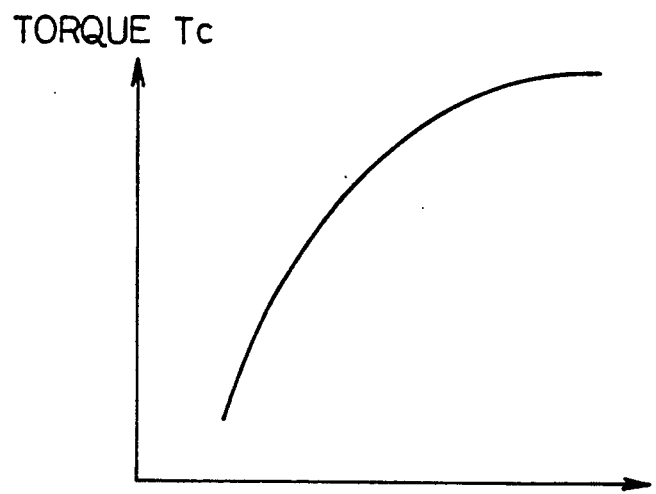
FIGS. 50 and 51 are views showing relationships used in the embodiment of FIG. 49.
Figure 51:
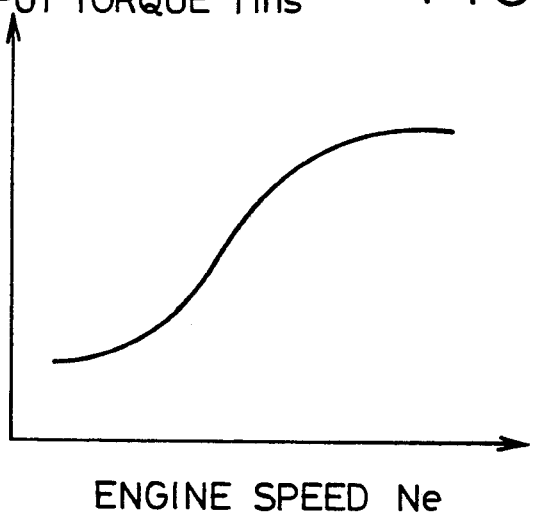

Referring to FIG. 49, there are shown steps SS6-1 through SS6-4 which are executed in place of step SS6 in the embodiment of FIG. 41. In this modified embodiment of FIG. 49, step SS6-1 is initially executed to calculate a modified torque value Tc (y-axis intercept torque value Tc) of the CVT 14 when the input torque value Tin is zero. This calculation of the modified torque value Tc is effected based on the throttle opening angle θth, according to a predetermined stored relationship as represented by a curve shown in FIG. 50. Step SS6-1 is followed by step SS6-2 to calculate a positive torque value $T_A$ corresponding to a minimum modified input torque Tins, based on the engine speed Ne, according to a predetermined stored relationship as represented by a curve shown in FIG. 51. While the positive torque value $T_A$ may be a constant value, it is desirable to calculate this value according to the curve of FIG. 51 so that the modified input torque value Tins to be obtained corresponds to the characteristic of the engine 10. Then, the control flow goes to step SS6-3 to determine a relationship as indicated in the block of the step, based on the calculated modified torque value or y-axis intercept torque value Tc and the calculated positive torque value $T_A$, and determine the modified input torque Tins based on the currently calculated input torque Tin. Step SS6-3 is followed by step SS6-4 to calculate the optimum value Popt according to the following equation (27), which includes the modified input torque Tins in place of the value Tin of the above equation (21).

$$Popt = C1 \cdot Tins/Din - C2 \cdot Nout^2 + \Delta P \quad (27)$$

In the present modified embodiment of FIG. 49, the optimum value Popt approaches the basic output pressure Pmec of the second pressure regulating valve 102 as the input torque Tin decreases toward zero, whereby the slipping of the belt 44 may be effectively prevented during the negative-torque running of the vehicle, as in the embodiment of FIG. 47.

The embodiment of FIG. 49 is also advantageous because it permits compensation of the second line pressure Pl2 for an increase in the pressure of the hydraulic cylinder 56 due to the centrifugal force even during the negative-torque running. In the embodiment of FIG. 47, the pilot pressure PsolL is zero according to the equation (26) when the negative-torque compensating factor K1 is "0" during the negative-torque running, whereby the compensation for the centrifugal pressure increase cannot be effected, although it is necessary during a high-speed running of the vehicle with an engine brake applied thereto.

Figure 52:
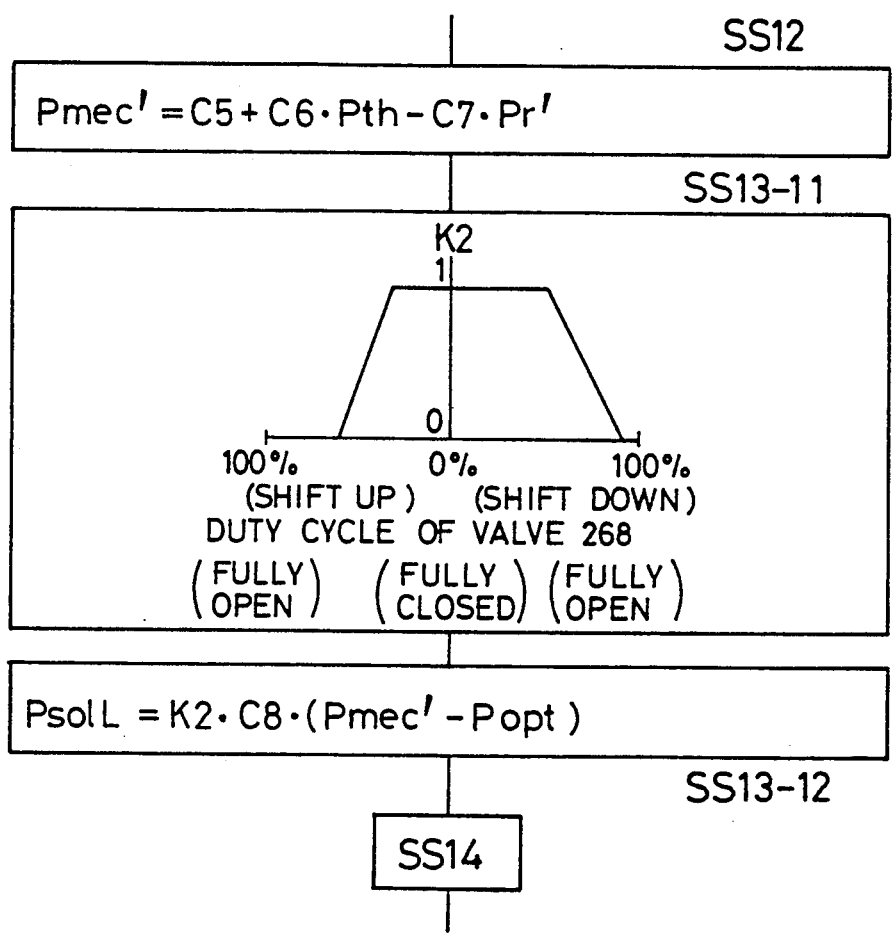
FIGS. 52, 57 and 58 are views showing other embodiments of the invention alternative to that of FIG. 41.

Referring next to FIG. 52, there are illustrated steps SS13-11 and SS13-12 which are executed in place of step SS13 of FIG. 41. In this embodiment, step SS13-11 is implemented to determine a factor based on the duty cycle of the second solenoid-operated valve 268, according to a predetermined stored relationship as indicated in solid line in the block of the step in FIG. 52. Then, the control flow goes to step SS13-12 to calculate the pilot pressure PsolL of the linear solenoid-valve 500 according to the following equation (28):

$$PsolL = K2 \cdot C8 \cdot (Pmec' - Popt) \quad (28)$$

where, C8 is a constant.

Since the duty cycle of the second solenoid-operated valve 268 determines the position of the valve spool of the flow control valve 264 between the fully open and fully closed positions, that is, the rate of flow of the fluid through the flow control valve 264, the above relationship used to determine the factor K2 changes the factor K2 with a change in the speed of shifting of the CVT 14. When the CVT 14 is shifted down or up at a relatively low rate, the factor K2 is determined to be "1". The factor K2 decreases from "1" toward "0" as the shifting speed of the CVT 14 increases.

Figure 53:
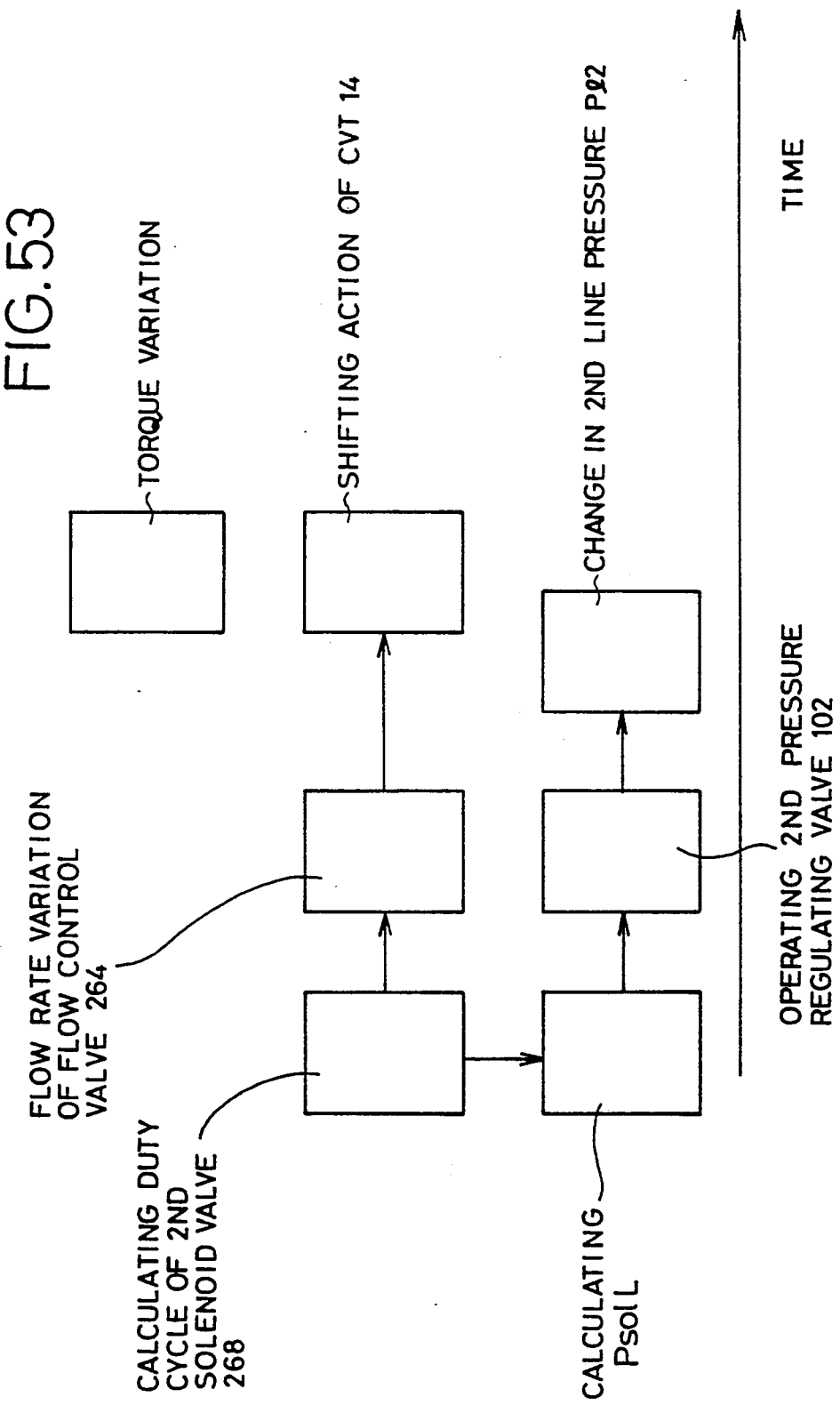
FIG. 53 is a timing chart illustrating events of operation in the embodiment of FIG. 52.
Figure 54:
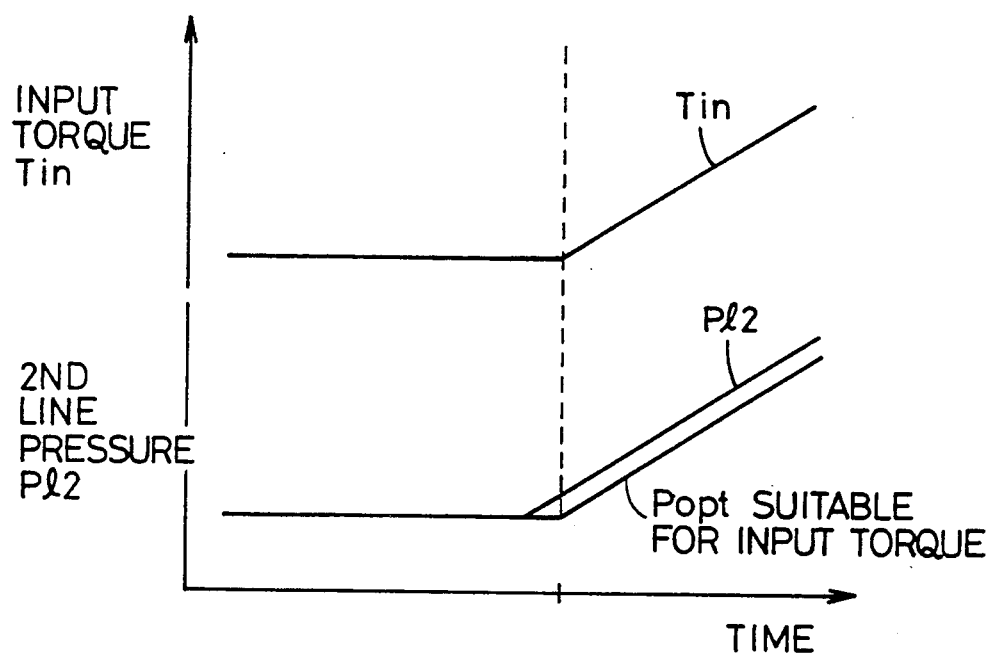
FIG. 54 is a timing chart showing changes in the input torque and second line pressure of the transmission.
Figure 56:
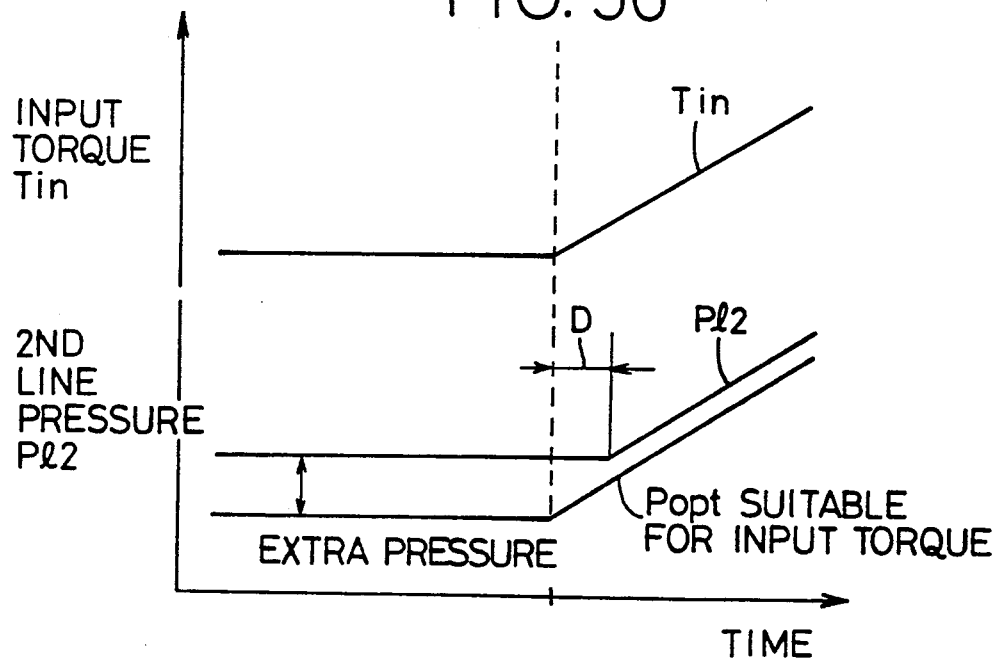
FIGS. 55 and 56 are views corresponding to those of FIGS. 53 and 54, showing the operation of the embodiment of FIG. 41.
Figure 55:
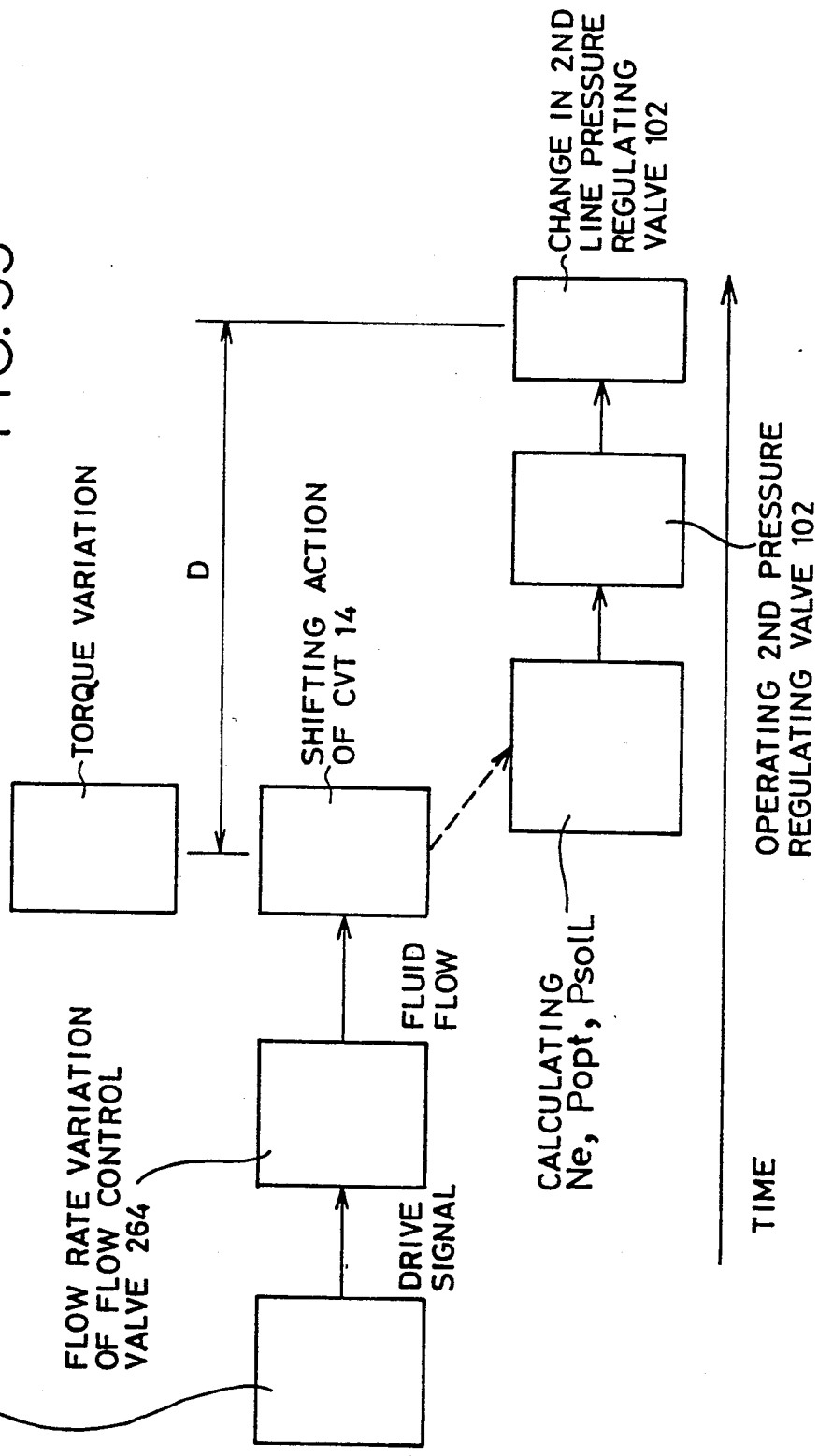

In the present embodiment of FIG. 52, the factor K2 is determined in step SS13-1 so that the factor K2 decreases with an increase in the shift-up or shift-down speed of the CVT 14. As a result, the pilot pressure PsolL (equivalent to an amount by which the basic output pressure Pmec is lowered to obtain the second line pressure Pl2) to be generated by the linear solenoid-operated valve 500 according to the above equation (28) is reduced as the shifting speed of the CVT 14 increases. Accordingly, the second line pressure Pl2 increases with an increase in the CVT shifting speed. If the factor K2 is "0", for example, the pilot pressure PsolL is zero, and the second line pressure Pl2 is equal to the basic output pressure Pmec and is not lowered to the optimum value Popt. In this respect, it is noted that during a shifting action of the CVT 14, the equilibrium of the thrust forces of the first and second hydraulic cylinders 54, 56 tends to be lost, making it difficult to suitably regulate the tension of the belt 44, whereby the regulation of the second line pressure P(2 so as to coincide with the calculated optimum pressure Popt is not significant. Rather, it is desirable to reduce the pilot pressure PsolL to increase the second line pressure Pl2 with respect to the optimum value Popt, so that the difference between the basic output pressure Pmec and the optimum value Popt is effectively utilized as an extra pressure for adding an extra tension to the belt 44 of the CVT 14 prior to the initiation of a shifting action of the CVT, for preventing slipping of the belt 44. The timing chart of FIG. 53 shows that the second line pressure Pl2 is increased prior to the shifting action of the CVT 14. Namely, the duty cycle of the second solenoid-operated valve 268 is initially determined to command the CVT 14 to be shifted and at the same time determine the factor K2 and calculate the pilot pressure PsolL of the linear solenoid-operated valve 500 (steps SS13-11 and SS13-12). The second pressure regulating valve 102 is operated according to the calculated PsolL so that the second line pressure P(2 has been increased before the CVT 14 is shifted with a change in the rate of flow of the fluid through the flow control valve 264. According to this arrangement, the second line pressure Pl2 is increased above the optimum value Popt suitable for the input torque Tin, as indicated in FIG. 54, even when the input torque Tin rapidly increases. The timing chart of FIG. 55 shows a conventional manner of regulating the second line pressure Pl when the CVT 14 is shifted. Described more specifically, the input torque Tin and the desired or optimum pressure Popt are successively calculated based on a change in the engine speed Ne which arises from an actual shifting action of the CVT 14. The second line pressure Pl2 is regulated by the second pressure regulating valve 102 so that the pressure Pl2 coincides with the optimum value Popt. This conventional arrangement inevitably suffers from a time delay between the change in the input torque Tin and the actual change or increase in the second line pressure Pl2, whereby the belt 44 tends to be slip due to an inertial torque. To solve this drawback, a relatively large extra pressure should be added to the second line pressure Pl2, as indicated in FIG. 56, leading to a power loss of the hydraulic power source.

Figure 57:
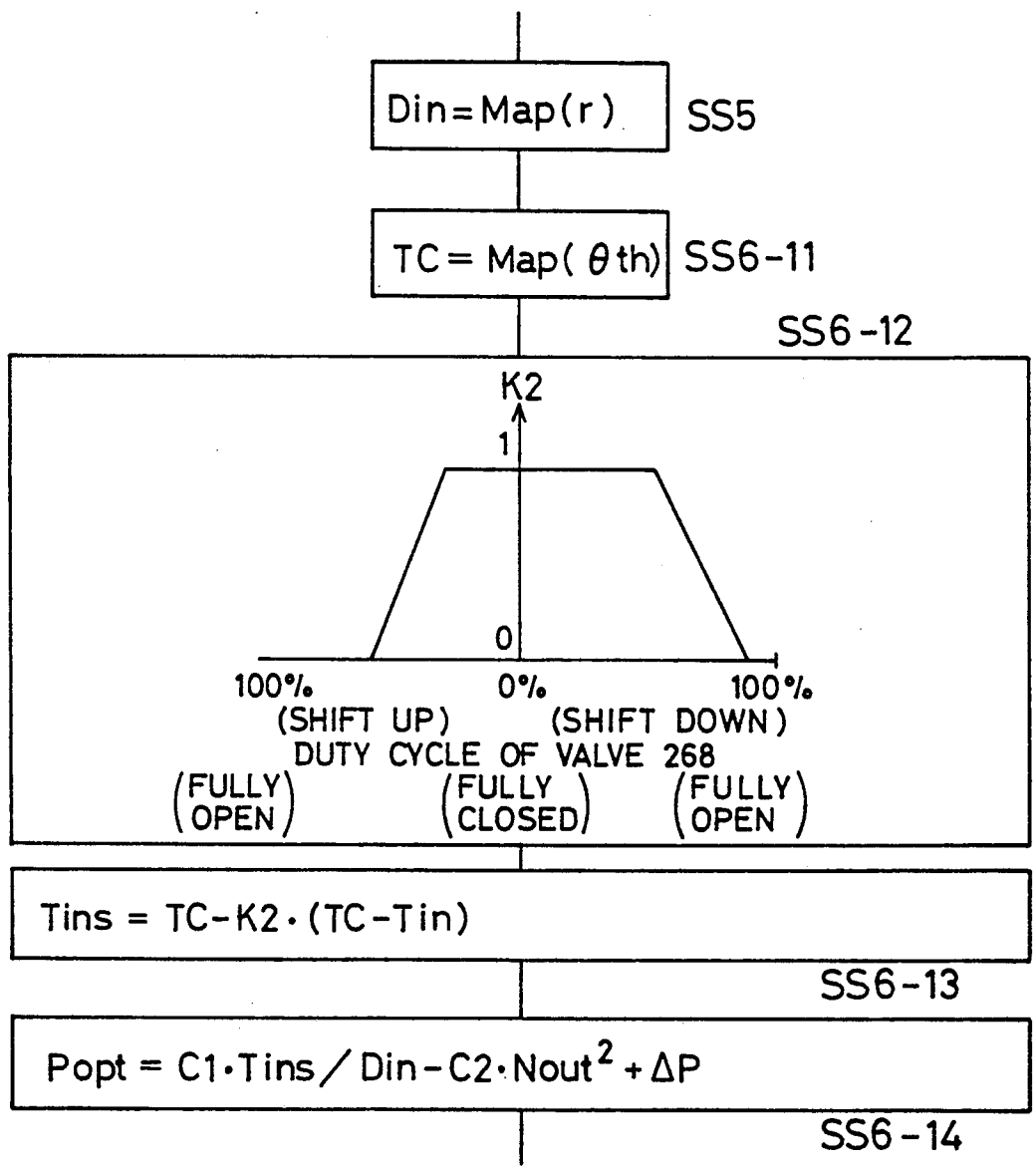

Referring to FIG. 57, there are shown steps SS6-11 through SS6-14 which are executed in place of step SS6 of the embodiment of FIG. 41. In this embodiment, step SS6-11 is implemented to determine an inertial torque value Tc of the CVT 14, based on the throttle opening angle $\theta$th, according to a predetermined relationship. This inertial torque value Tc is a sum of the nominal input torque Tin and an extra value due to the inertia upon rapid shifting of the CVT 14. Then, step SS6-12 is executed to determine a factor K2, based on the duty cycle of the second solenoid-operated valve 268, according to a predetermined stored relationship as indicated in solid line in the block of the step in FIG. 57. Then, the control flow goes to step SS6-13 to calculate a modified torque value Tins for calculating the optimum pressure Popt, according to the, following equation (29):

$$Tins = Tc - K2 \cdot (Tc - Tin) \quad (29)$$

Since the duty cycle of the second solenoid-operated valve 268 determines the position of the valve spool of the flow control valve 264 between the fully open and fully closed positions, that is, the rate of flow of the fluid through the flow control valve 264, the above relationship used to determine the factor K2 in step SS6-12 is formulated to change the factor K2 with a change in the speed of shifting of the CVT 14, like the factor K2 in step SS13-11 of the preceding embodiment. When the CVT 14 is shifted down or up at a relatively low rate, the factor K2 is determined to be "1". The factor K2 decreases from "1" toward "0" as the shifting speed of the CVT 14 increases.

The inertial torque value Tc is a tentatively determined input torque value corresponding to the second line pressure Pl2 suitable for tensioning the belt 44 when the input torque Tin rapidly changes. The right member of the above equation (29) is equal to the nominal input torque Tin when the factor K2 is "1" (when the shifting speed of the CVT 14 is relatively low), and is equal to the inertial torque value Tc when the factor K2 is "0" (when the shifting speed of the CVT 14 is relatively high). Step SS6-13 is followed by step SS6-14 to calculate the optimum pressure Popt according to the following equation (30):

$$Popt = C1 \cdot Tins/Din - C2 \cdot Nout^2 + \Delta P \quad (30)$$

In the present embodiment of FIG. 57, the optimum value Popt is adjusted depending upon the duty cycle of the second solenoid-operated valve 268 which controls the shifting speed of the CVT 14. As in the embodiment of FIG. 52, the second line pressure Pl2 is increased before the input torque of the CVT 14 is changed. It is also noted that only the first term of the right member of the above equation (30) is changed with the factor K2, while the second term is not changed with the factor K2. This arrangement permits suitable compensation of the second line pressure Pl2 for a centrifugal increase in the pressure in the hydraulic cylinder 56 during a running of the vehicle at a relatively high speed.

Figure 58:
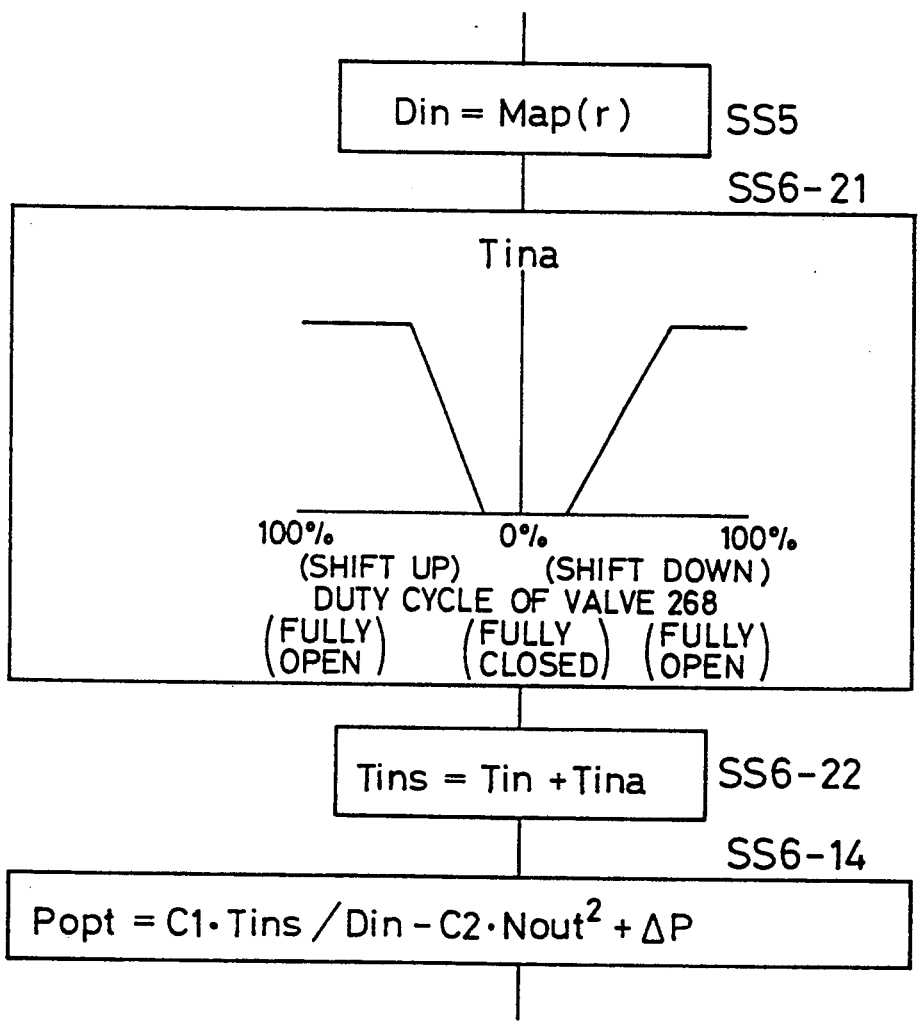

Referring to FIG. 58, there are shown steps SS6-21 and SS6-22 which are executed in place of steps SS6-11, SS6-12 and SS6-13 of the preceding embodiment of FIG. 57. In this embodiment, step SS6-21 is implemented to determine an extra torque value Tina based on the duty cycle of the second solenoid-operated valve 268, according to a predetermined stored relationship as indicated in the block of the step in FIG. 58. Then, step SS6-22 is implemented to calculate a modified torque value Tins, according to the following equation (31):

$$Tins = Tin + Tina \quad (31)$$

The relationship used in step SS6-21 is determined such that the extra torque value Tina changes with the shifting speed of the CVT 14 which is determined by the duty cycle of the second solenoid-operated valve 268. More particularly, the extra torque value Tina is equal to "0" when the shifting speed is lower than a predetermined value, and increases from "0" to a predetermined maximum with an increase in the shifting speed of the CVT 14 to the maximum value. The maximum of the extra torque value Tina is determined such that the optimum pressure Popt calculated according to the above equation (30) is equal to the basic output pressure Pmec when the maximum Tina is added to the calculated nominal input torque Tin according to the above equation (31). The determined extra torque value Tina is used in step SS6-22 for calculating the modified torque value Tins according to the equation (31). Step SS6-14 is then executed to calculate the optimum pressure Popt according to the equation (30).

In the present embodiment of FIG. 58, too, the optimum pressure Popt is adjusted depending upon the duty cycle of the second solenoid-operated value 268 which determines the shifting speed of the CVT 14. In the above equation (30), only the first term of the right member is changed with the determined extra torque value Tina. Thus, the present embodiment provides the same effect as the preceding embodiment of FIG. 57.

Figure 59:
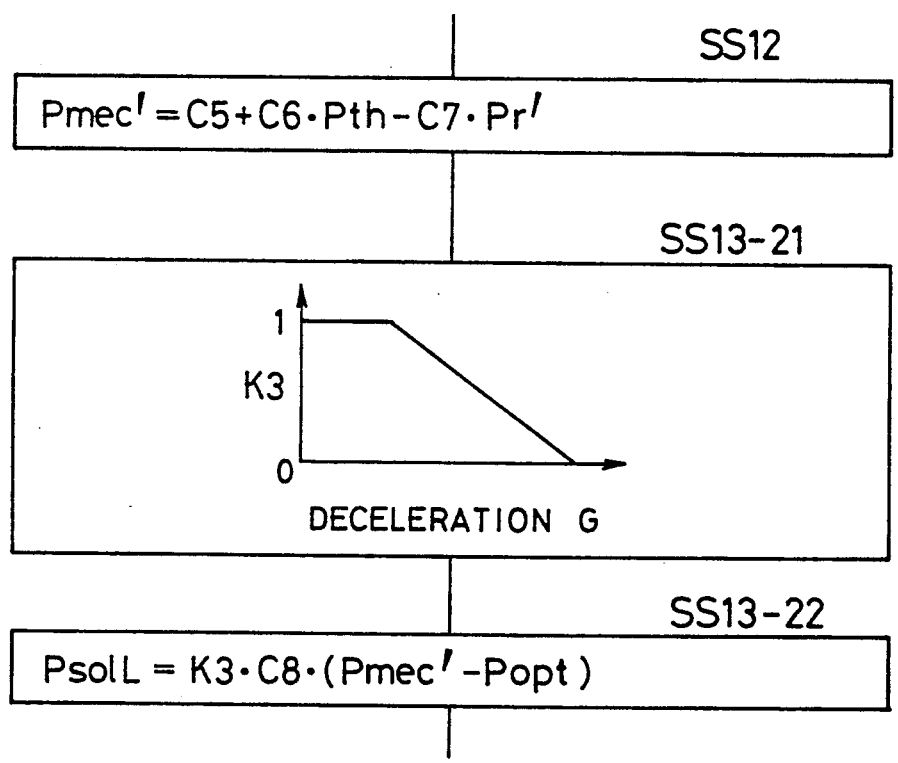
FIGS. 59, 60, 61 and 62 are portions of a flow chart of yet further embodiments of the invention.

Steps SS13-11 and SS13-12 may be replaced by steps SS13-21 and SS13-22 as shown in FIG. 59. In this modified embodiment of FIG. 59, step SS13-21 is executed to determine a factor K3 based on a deceleration value G of the vehicle, according to a predetermined stored relationship as indicated in the block of the step in FIG. 59. Step SS13-21 is followed by step SS13-22 to calculate the pilot pressure PsolL of the linear solenoid-operated valve 500 according to the following equation (32):

$$PsolL = K3 \cdot C8 \, (Pmec' - Popt) \qquad (32)$$

The above relationship used in step SS13-21 is determined to change the factor K3 depending upon the currently determined deceleration value G of the vehicle. More specifically, the factor K3 is "1" when the deceleration value G is lower than a predetermined value, and linearly decreases from "1" toward "0" as the deceleration value G increases.

In the present embodiment of FIG. 59, the factor K3 decreases with an increase in the vehicle deceleration value G, so that the pilot pressure PsolL (amount of reduction of the second line pressure Pl2 from the basic output pressure Pmec) of the linear solenoid-operated valve 500, whereby the second line pressure Pl2 is increased with an increase in the deceleration value G. This manner of increasing the second line pressure Pl2 is also effective in preventing slipping of the belt 44 even when the input torque Tin of the CVT 14 is rapidly increased due to an inertial torque in the event of an abrupt stop of the vehicle or locking of the vehicle wheels (24) on the road surface. It is noted that steps SS13-21 and SS13-22 may be executed in addition to steps SS13-11 and SS13-12. In this case, the pilot pressure PsolL is calculated according to the following equation (33):

$$PsolL = K2 \cdot K3 \cdot C8 \, (Pmec' - Popt) \qquad (33)$$

Figure 60:
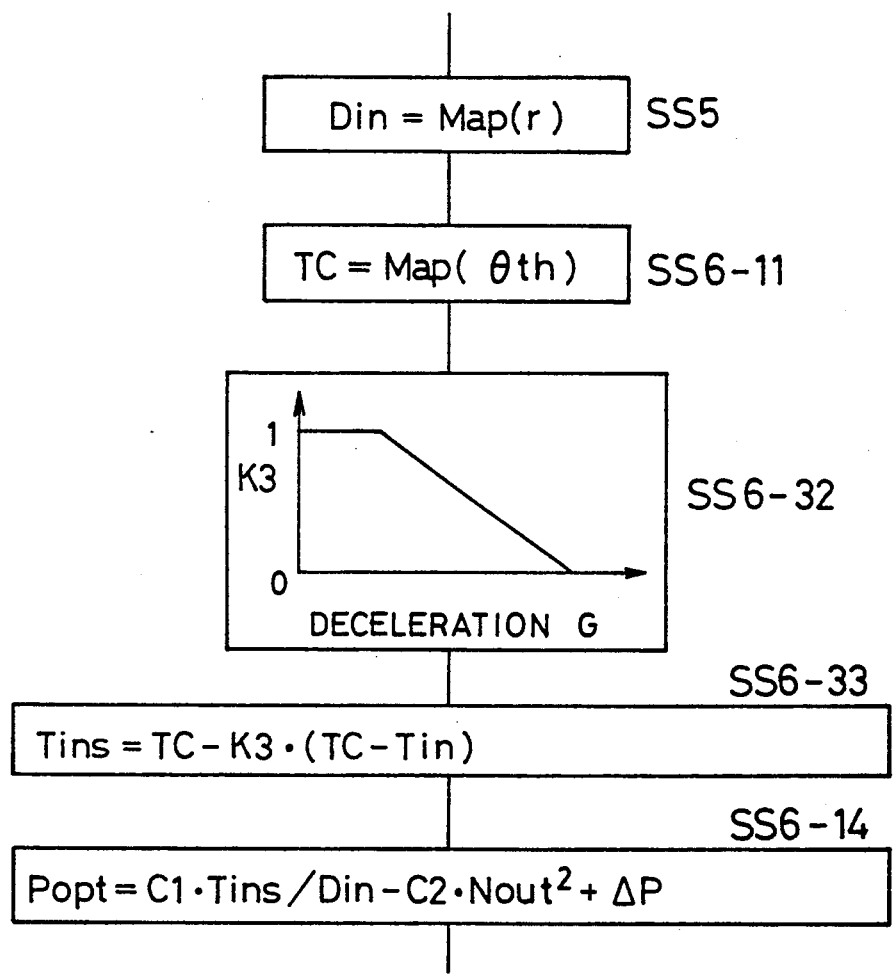

Referring to FIG. 60, there are shown steps SS6-32 and SS6-33 which are executed in place of steps SS6-12 and SS6-13 of the embodiment of FIG. 57. In this embodiment, step SS6-32 is implemented to determine a factor K3 based on a currently detected deceleration value G of the vehicle, according to a predetermined relationship. Then, step SS6-33 is executed to calculate a modified torque value Tins for calculating the optimum pressure Popt, according to the following equation (34):

$$Tins = Tc - K3 \cdot (Tc - Tin) \qquad (34)$$

The relationship used in step S6-32 is similar to that used in step SS13-21 of the embodiment of FIG. 59.

In the present embodiment of FIG. 60, the modified torque value Tins calculated in step SS6-33 and the optimum value Popt calculated in step SS6-14 are increased depending upon the deceleration value G of the vehicle. This arrangement provides the same advantage as the embodiment of FIG. 59. It is noted that steps SS6-32 and SS6-33 may be implemented in addition to steps SS6-12 and SS6-13 of FIG. 57. In this case, the modified torque value Tins is calculated according to the following equation (35):

$$Tins = Tc - K2 \cdot K3 \cdot (Tc - Tin) \qquad (35)$$

Figure 61:
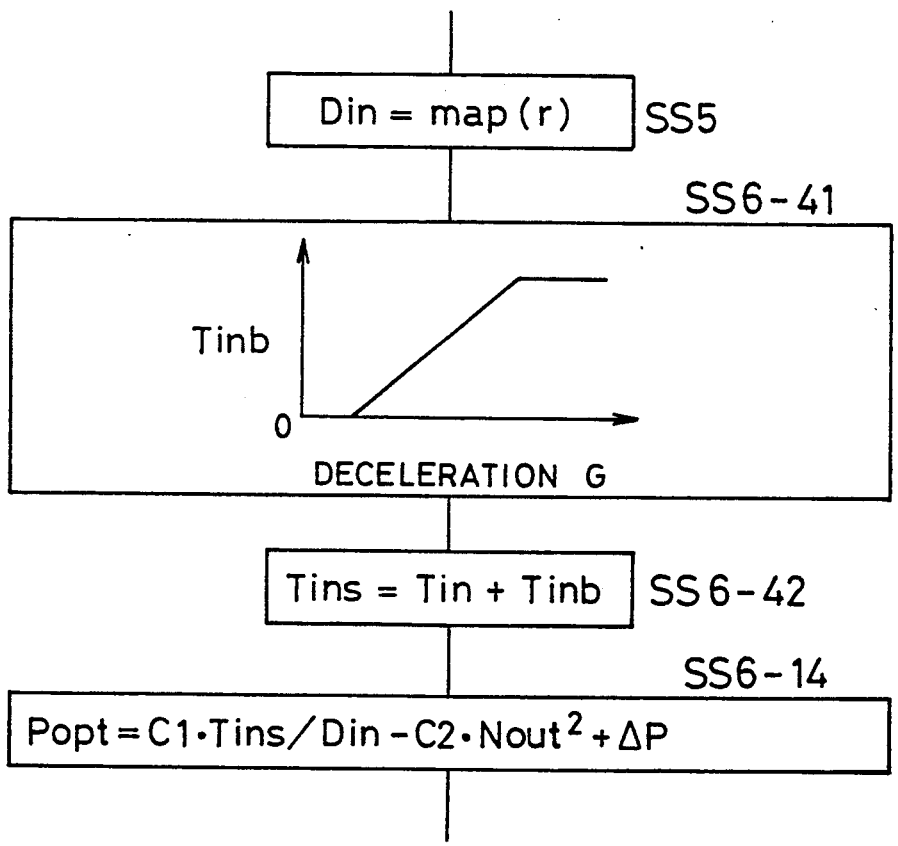

Referring to FIG. 61, there are shown steps SS6-41 and SS6-42 which are executed in place of steps SS6-21 and SS6-22 of the embodiment of FIG. 58. In this embodiment, step SS6-41 is implemented to determine an extra torque value Tinb based on the currently detected deceleration value G of the vehicle, according to a predetermined stored relationship as indicated in the block of the step in FIG. 61. Then, step SS6-42 is implemented to calculate a modified torque value Tins, according to the following equation (36):

$$Tins = Tin + Tinb \qquad (36)$$

The relationship used in step SS6-41 is determined such that the extra torque value Tinb changes with the shifting speed of the CVT 14 which is determined by the deceleration value G of the vehicle. More particularly, the extra torque value Tinb is equal to "0" when the deceleration value G is lower than a predetermined value, and increases from "0" to a predetermined maximum with an increase in the deceleration value G to the maximum value. The maximum of the extra torque value Tinb is determined such that the optimum pressure Popt calculated according to the above equation (30) is equal to the basic output pressure Pmec when the maximum Tinb is added to the calculated nominal input torque Tin according to the above equation (36). The determined extra torque value Tinb is used in step SS6-42 for calculating the modified torque value Tins according to the equation (36). Step SS6-14 is then executed to calculate the optimum pressure Popt according to the equation (30).

Like the embodiments of FIGS. 59 and 60, the present embodiment of FIG. 61 is adapted to adjust the optimum pressure Popt depending upon the deceleration value G of the vehicle. It is noted that steps SS6-41 and SS6-42 may be implemented in addition to steps SS6-21 and SS6-22 of FIG. 58. In this case, the modified torque value Tins is calculated according to the following equation (37):

$$Tins = Tin + Tina + Tinb \qquad (37)$$

While the present invention has been described in its presently preferred embodiments by reference to the accompanying drawings, it is to be understood that the invention may be otherwise embodied, without departing from the spirit of the invention.

Figure 62:
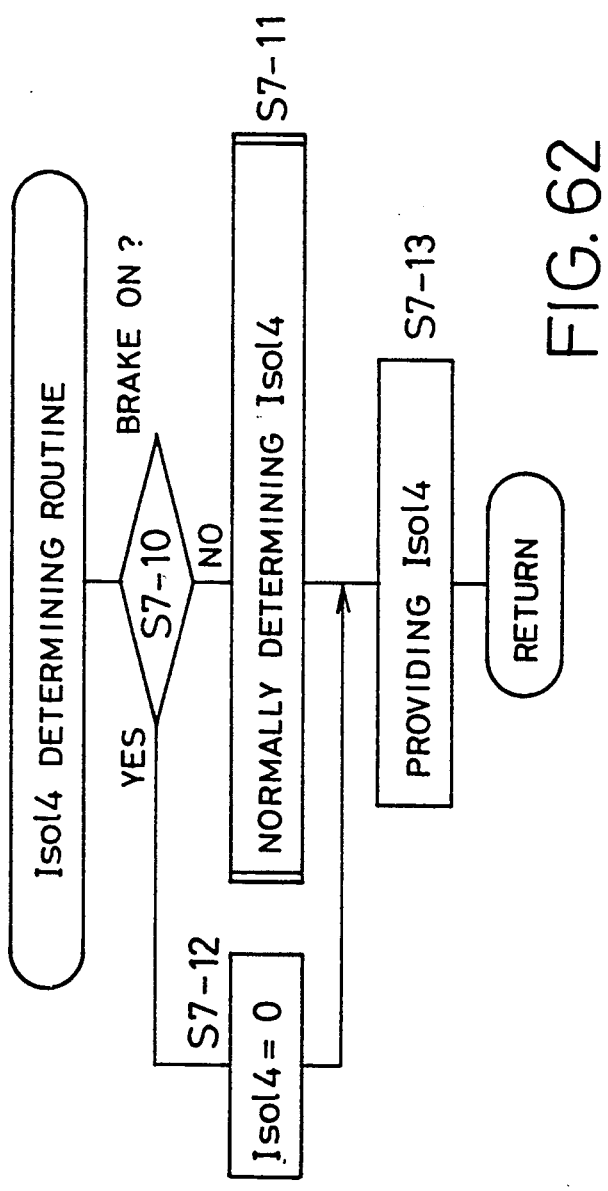

For example, the routine for determining the drive signal Iso14 applied to the fourth solenoid-operated valve 346 of FIG. 2 may be replaced by a routine as illustrated in FIG. 62. In this modified routine, step S7-10 is initially implemented to determine whether the BRAKE switch 472 is ON or not. If the switch 472 is not ON, step S7-11 is executed to implement steps S7-1 through S7-6 of the routine of FIG. 28 for determining the drive signal Iso14. Step S7-11 is followed by step S7-13 to apply the determined drive signal Iso14 to the solenoid-operated valve 346. If the BRAKE switch 472 is ON, step S7-10 is followed by step S7-12 to turn off the drive signal Iso14, namely, to zero the level of the drive signal Iso14, so that the duty cycle Ds4 of the valve 346 is zero. According to this arrangement, the pilot pressure Pso14 is zeroed with the drive signal Iso14 turned off, to regulate the second line pressure P(2 to be equal to the basic output pressure Pmec, when the BRAKE switch 472 is turned ON, viz., when brake is applied to the vehicle. Accordingly, the second line pressure Pl2 is increased to prevent slipping of the belt 44 when the vehicle is abruptly braked or when the wheels (24) of the vehicle are locked on the road surface.

In step S5-1 of the embodiment of FIG. 22, the speed ratio "r" of the CVT 14 is calculated based on the speeds Nin and Nout of the input and output shafts 30, 38 detected by the sensors 464, 466, the speed ratio "r"

may be determined based on output signals from sensors for detecting the axial position of the axially movable rotor 50 or 52.

In the illustrated embodiments, the THROTTLE pressure Pth produced by the throttle sensing valve 180 which detects the throttle opening angle $\theta$th is used as a pressure representative of the currently required output of the engine 10. Where the hydraulic control apparatus of the invention is used for a vehicle having a diesel engine without a throttle valve, the pressure Pth may be replaced by a pressure which represents an amount corresponding to an amount of operation of the accelerator pedal 478 of the vehicle. In this case, the cam 184 is mechanically linked with the accelerator pedal 478, so that the cam 184 is rotated as the pedal is depressed.

While the illustrated embodiments use the THROTTLE sensor 468 to detect the throttle opening angle $\theta$th as the output of the engine 10 currently required by the vehicle operator, the currently required output of the engine 10 may be represented by other variables such as the amount of operation of the accelerator pedal 478 and an amount of fuel injection into the engine 10, which replace the throttle opening angle $\theta$th.

Although the first embodiment of FIG. 1 uses the fourth solenoid-operated valve 346 and the flow restrictor 344 as means for generating the pilot pressure Pso14, this embodiment may also use a linear solenoid-operated valve like the valve 500 used in the embodiment of FIG. 36, which is controlled by the electronic control device 460 such that the pilot pressure is continuously changed by changing the magnitude of an analog drive signal applied to the solenoid coil.

In the embodiment of FIG. 18, step S3 is provided to compensate the second line pressure Pl2 for an increase in the pressure of the second hydraulic cylinder 56 due to the centrifugal force during rotation of the cylinder. However, this step S3 may be eliminated, particularly for the power transmitting system for a vehicle which is not designed for running at an extremely high speed.

Step S4 of the embodiment of FIG. 18 may be modified such that a suitable extra value is added to the optimum pressure Popt.

While the illustrated embodiments are adapted such that the speed ratio "r" of the CVT 14 is controlled so that the actually detected speed Nin of the input shaft 30 coincides with a determined desired or target speed Nin*, it is possible to control the speed ratio "r" so that the actually detected speed ratio "r" coincides with a determined desired ratio "r*", since the speed ratio "r" is equal to Nin/Nout.

It is to be understood that the present invention may be embodied with various other changes, modifications and improvements, which may occur to those skilled in the art, without departing from the scope of the invention defined in the following claims.

What is claimed is:

1. A hydraulic control apparatus for controlling a hydraulically operated continuously variable transmission of a motor vehicle having an engine, said transmission including a first and a second shaft, a pair of variable-diameter pulleys provided on said first and second shafts, respectively, a transmission belt connecting the pair of pulleys, and a pair of hydraulic actuators for changing effective diameters of said pulleys for continuously variably changing a speed ration of the transmission, said hydraulic control apparatus comprising:

speed-ratio determining means for determining a current speed ratio of said transmission;

engine-output detecting means for detecting a currently required output of said engine;

a pressure regulating valve including a valve spool which operates depending upon said current speed ratio and said currently required output, said pressure regulating valve generating a belt tensioning pressure for controlling a tension of said transmission belt at a required minimum level according to an operation of said valve spool;

pilot-pressure generating means responsive to an electric signal, for applying a pilot pressure to said pressure regulating valve to modify the position of said valve spool so as to regulate said belt tensioning pressure; and an electronic control device including a memory for storing a predetermined relationship among said current speed ratio, said currently required output and a basic output pressure of said pressure regulating valve, said electronic control device including means for calculating said basic output pressure, based on said current speed ratio and said currently required output, according to said predetermined relationship, and means for determining the electric signal to be applied to said pilot-pressure generating means to thereby regulate said belt tensioning pressure, based on the calculated basic output pressure and an optimum value of the belt tensioning pressure such that the belt tensioning pressure coincides with the optimum value.

2. A hydraulic control apparatus according to claim 1, wherein said pilot-pressure generating means comprises a solenoid-operated valve which is turned on and off with a controlled duty cycle, said electronic control device determining said electric signal such that the pilot pressure changes with the duty cycle of said solenoid-operated valve.

3. A hydraulic control apparatus according to claim 1, wherein said pressure regulating valve has a chamber which receives said pilot pressure and which is positioned such that said valve spool receives said pilot pressure so that said belt tensioning pressure decreases with an increase in said pilot pressure.

4. A hydraulic control apparatus according to claim 1, further comprising means for generating a speed-ratio pressure indicative of the speed ratio of said transmission, and means for generating an engine-output pressure indicative of the currently required output of the engine, said valve spool of said pressure regulating valve receiving said speed-ratio pressure and said engine-output pressure such that said belt tensioning pressure increases with an increase in said engine-output pressure and decreases with an increase in said speed-ratio pressure.

5. A hydraulic control apparatus according to claim 4, wherein said electronic control device further includes means for determining an output torque of said engine based on a speed of said engine and said currently required output, and means for calculating said optimum value of said belt tensioning pressure based on the determined engine output torque and said speed ratio determined by said speed-ratio determining means.

6. A hydraulic control apparatus according to claim 5, wherein said means for calculating said optimum value includes means for calculating an amount of centrifugal increase in the pressure in one of said pair of hydraulic actuators to which said output torque is transmitted from the other hydraulic actuator, said centrifugal increase occurring due to a centrifugal force produced during rotation of said one hydraulic actuator, said means for calculating said optimum value further based on the calculated amount of centrifugal increase.

7. A hydraulic control apparatus according to claim 5, wherein said electronic control device further includes means for calculating an amount of reduction by which said basic output pressure is lowered to said optimum value of said belt tensioning pressure, by subtracting said optimum value from said basic output pressure, said means for determining said electric signal determining said electric signal based on said amount of reduction.

8. A hydraulic control apparatus according to claim 7, wherein said means for generating said speed-ratio pressure includes a speed-ratio sensing valve which releases said belt tensioning pressure as said speed ratio of said transmission varies.

9. A hydraulic control apparatus according to claim 8, wherein said means for determining said electric signal comprises mean for selecting one of a plurality of equations depending upon a relationship of said speed-ratio pressure with said basic output pressure and said optimum value, each of said plurality of equations including said amount of reduction as a term, said means for determining said electric signal determining said electric signal according to the selected equation.

10. A hydraulic control apparatus according to claim 5, wherein said means for calculating said optimum value includes means for determining whether the determined engine output torque is negative or not, and selecting one of two equations depending upon whether the determined engine output torque is negative or not, said means for calculating said optimum value calculating said optimum value according to the selected equation.

11. A hydraulic control apparatus according to claim 5, wherein said electronic control device further includes means for adding a predetermined compensation value to said optimum value calculated by said means for calculating said optimum value, when the vehicle is in the process of starting.

12. A hydraulic control apparatus according to claim 11, further comprising means for detecting a running speed of the vehicle, and wherein said means for adding a predetermined compensation value determines whether said running speed is between zero to a predetermined positive reference value, or not, to determine whether the vehicle is in the process of starting.

13. A hydraulic control apparatus according to claim 11, wherein said means for adding a predetermined compensation value determines whether said speed ratio determined by said speed-ratio determining means is between a maximum value to a predetermined reference value, or not, to determine whether the vehicle is in the process of starting.

14. A hydraulic control apparatus according to claim 1, wherein said pilot-pressure generating means comprises a linear solenoid-operated valve which is activated with an analog drive signal as said electric signal, said electronic control device determining said analog drive signal such that said pilot pressure changes with a magnitude of said analog drive signal.

15. A hydraulic control apparatus according to claim 14, wherein said pressure regulating valve has a chamber which receives said pilot pressure and which is positioned such that said valve spool receives said pilot pressure so that said belt tensioning pressure decreases with an increase in said pilot pressure.

16. A hydraulic control apparatus according to claim 4, wherein said electronic control device further includes means for determining an input torque of said transmission based on a speed of said engine and said currently required output, and means for calculating said optimum value of said belt tensioning pressure based on the determined input torque and said speed ratio determined by said speed-ratio determining means.

17. A hydraulic control apparatus according to claim 16, wherein said means for calculating said optimum value comprises means for calculating based on said currently required output an intercept torque value when said currently determined input torque is zero, means for calculating a positive torque value corresponding to a minimum value of a modified input torque, based on said speed of said engine, means for calculating said modified input torque based on the currently determined input torque, according to a predetermined relationship between said intercept torque value and said positive torque value, and means for calculating said optimum value of said belt tensioning pressure by using on the calculated modified input torque as said currently determined input torque.

18. A hydraulic control apparatus according to claim 16, wherein said means for calculating said optimum value comprises means for determining a factor based on a shifting speed of said transmission such that said factor is equal to "0" when said shifting speed is higher than a predetermined value, and is equal to a positive value not larger than "1" when said shifting speed is equal to or lower than said predetermined value, and further comprises means for determining said optimum value based on the determined factor as well as said determined input torque and said determined speed ratio.

19. A hydraulic control apparatus according to claim 18, wherein said means for determining a factor determines said factor such that said factor increases from "0" to "1" as said shifting speed decreases from said predetermined value toward "0".

20. A hydraulic control apparatus according to claim 16, wherein said means for calculating said optimum value comprises means for determining an extra torque value based on a shifting speed of said transmission such that said extra torque value increases from "0" to a predetermined maximum with an increase in said shifting speed from a predetermined value, and is equal to "0" when said shifting speed is equal to or lower than said predetermined value, and further comprises means for determining said optimum value based on the determined extra torque value as well as said determined input torque and said determined speed ratio.

21. A hydraulic control apparatus according to claim 20, wherein said predetermined maximum of said extra torque value is determined such that said extra optimum value is equal to said basic output pressure.

22. A hydraulic control apparatus according to claim 16, wherein said means for calculating said optimum value comprises means for determining a factor based on a deceleration value of the vehicle such that said factor is equal to "1" when said shifting speed is lower than a predetermined value, and decreases with an increase in said deceleration value, and further comprises means for determining said optimum value based on the determined factor as well as said determined input torque and said determined speed ratio.

23. A hydraulic control apparatus according to claim 16, wherein said means for calculating said optimum value comprises means for determining an extra torque value based on a deceleration value of the vehicle such that said extra torque value is equal to "0" when said deceleration value is lower than a predetermined value, and increases from "0" to a predetermined maximum with an increase in said deceleration value from said predetermined value, and further comprises means for determining said optimum value based on the determined extra torque value as well as said determined input torque and said determined speed ratio.

24. A hydraulic control apparatus according to claim 23, wherein said predetermined maximum of said extra torque value is determined such that said extra optimum value is equal to said basic output pressure.

25. A hydraulic control apparatus according to claim 9, wherein said means for determining said electric signal further comprises means for determining whether a brake is applied to the vehicle or not, and means for turning off said electric signal when the brake is applied to the vehicle.

26. A hydraulic control apparatus according to claim 14, wherein said means for generating said speed-ratio pressure includes a speed-ratio sensing valve which releases said belt tensioning pressure as said speed ratio of said transmission varies.

27. A hydraulic control apparatus according to claim 16, wherein said electronic control device further includes means for determining a modified basic output pressure of said pressure regulating valve as a function of a variable which is determined such that said variable is equal to said optimum value if said optimum value is lower than said speed-ratio pressure, and such that said variable is equal to said speed-ratio pressure if said optimum value is equal to or higher than said speed-ratio pressure.

28. A hydraulic control apparatus according to claim 27, wherein said electronic control device further includes means for determining an analog drive signal based on a difference between said modified basic output pressure and said optimum value.

29. A hydraulic control apparatus according to claim 28, wherein said means for determining said analog drive signal comprises means for calculating said pilot pressure based on said difference, and means for calculating said analog drive signal based on the calculated pilot pressure.

30. A hydraulic control apparatus according to claim 29, wherein said means for calculating said pilot pressure comprises means for determining a negative-torque compensation factor depending upon said input torque such that said compensation factor is equal to "0" when said input torque is a negative value, and is equal to a positive value not larger than "1" when said input torque is a positive value, and further comprises means for determining said pilot pressure based on the determined compensation factor as well as said difference.

31. A hydraulic control apparatus according to claim 30, wherein said means for determining a negative-torque compensation factor determines said compensation factor such that said compensation factor increases from "0" to "1" with an increase in said input torque from "0" to a predetermined positive value.

32. A hydraulic control apparatus according to claim 30, wherein said means for calculating said pilot pressure comprises means for determining a factor based on a shifting speed of said transmission such that said factor is equal to "0" when said shifting speed is higher than a predetermined value, and is equal to a positive value not larger than "1" when said shifting speed is equal to or lower than said predetermined value, and further comprises means for determining said pilot pressure based on the determined factor as well as said difference.

33. A hydraulic control apparatus according to claim 32, wherein said means for determining a factor determines said factor such that said factor increases from "0" to "1" as said shifting speed decreases from said predetermined value toward "0".

34. A hydraulic control apparatus according to claim 30, wherein said means for calculating said pilot pressure comprises means for determining a factor depending upon a deceleration value of the vehicle such that said factor is equal to "1" when said deceleration value is lower than a predetermined value, and decreases from "1" to "0" with an increase in said deceleration value.

35. A hydraulic control apparatus according to claim 1, wherein said valve spool of said pressure regulating valve operates depending upon a speed ratio pressure varying with said current speed ratio and said currently required output, and wherein said basic output pressure decreases with increasing values of said speed ratio pressure when said basic output pressure is greater than said speed ratio pressure and remains substantially constant when said speed ratio pressure at least equals said basic output pressure.

* * * * *

UNITED STATES PATENT AND TRADEMARK OFFICE
CERTIFICATE OF CORRECTION

PATENT NO. : 5,157,992

DATED : October 27, 1992

INVENTOR(S) : Takashi Hayashi et al.

It is certified that error appears in the above-identified patent and that said Letters Patent is hereby corrected as shown below:

On the title page, Item [30],

The Foreign Application Priority Data is incorrect, should be,

--Feb. 1, 1990   [JP]   Japan....................2-23579

May 24, 1990   [JP]   Japan....................2-134489

Sep. 12, 1990   [JP]   Japan....................2-241764

Oct. 29, 1990   [JP]   Japan....................2-291288--.

Signed and Sealed this

Thirtieth Day of November, 1993

Attest:

BRUCE LEHMAN

*Attesting Officer*    *Commissioner of Patents and Trademarks*